Figure 1:
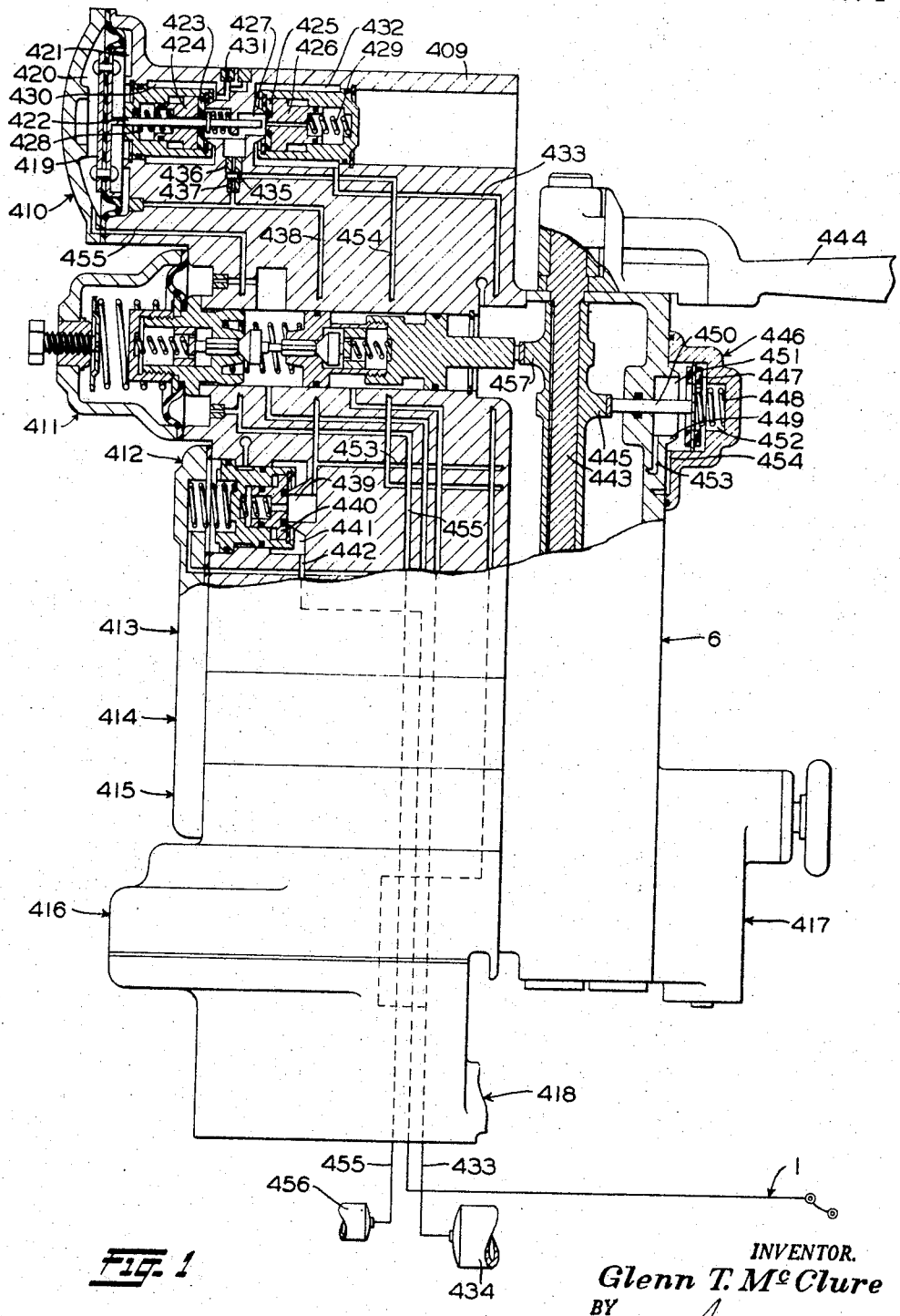

Sept. 28, 1965  G. T. McCLURE  3,208,801
RAILWAY BRAKE CONTROL SYSTEM WITH OPTIONAL
DIRECT OR GRADUATED RELEASE FEATURE
Filed July 13, 1962  4 Sheets-Sheet 1

INVENTOR.
Glenn T. McClure
BY
Attorney

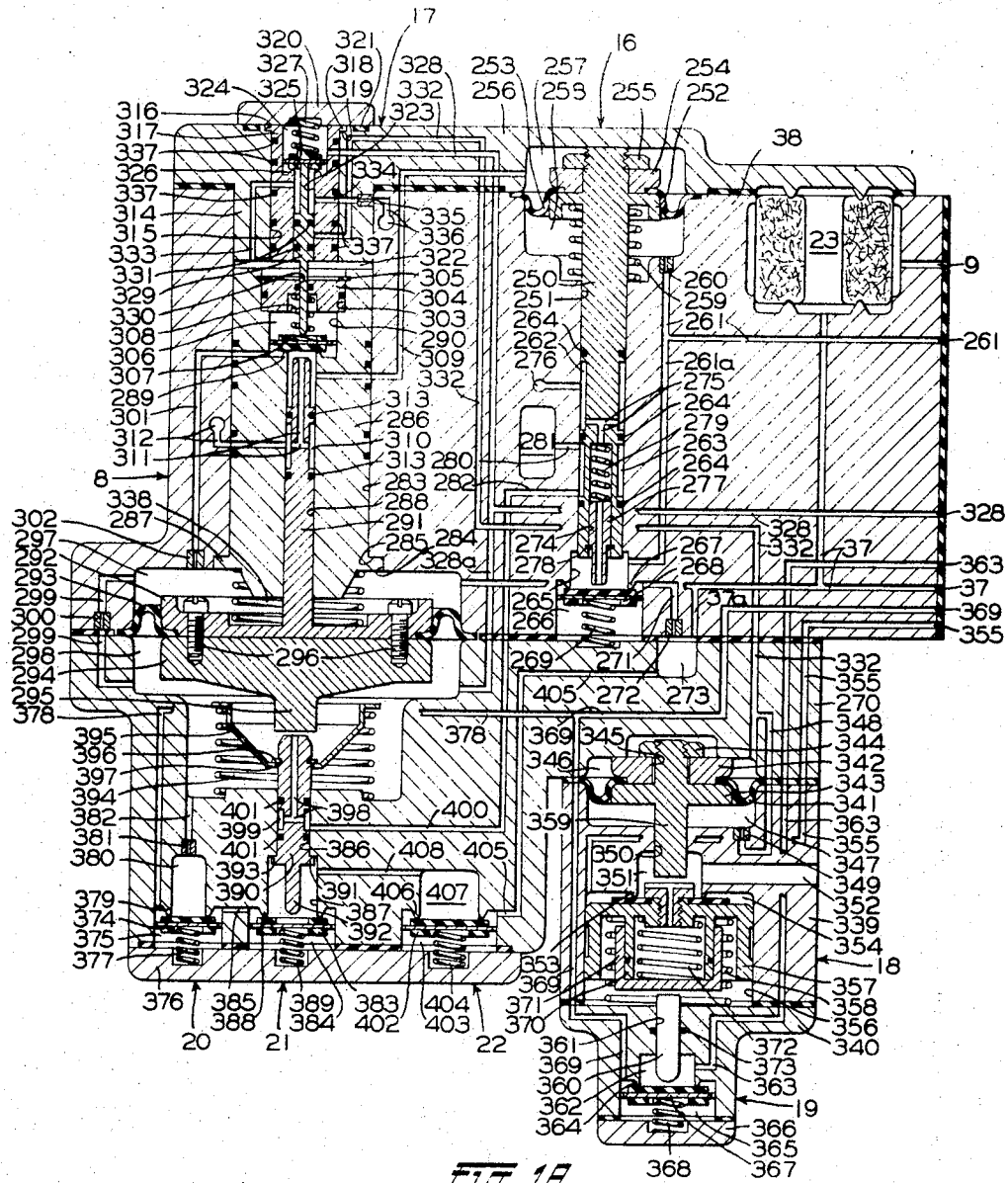

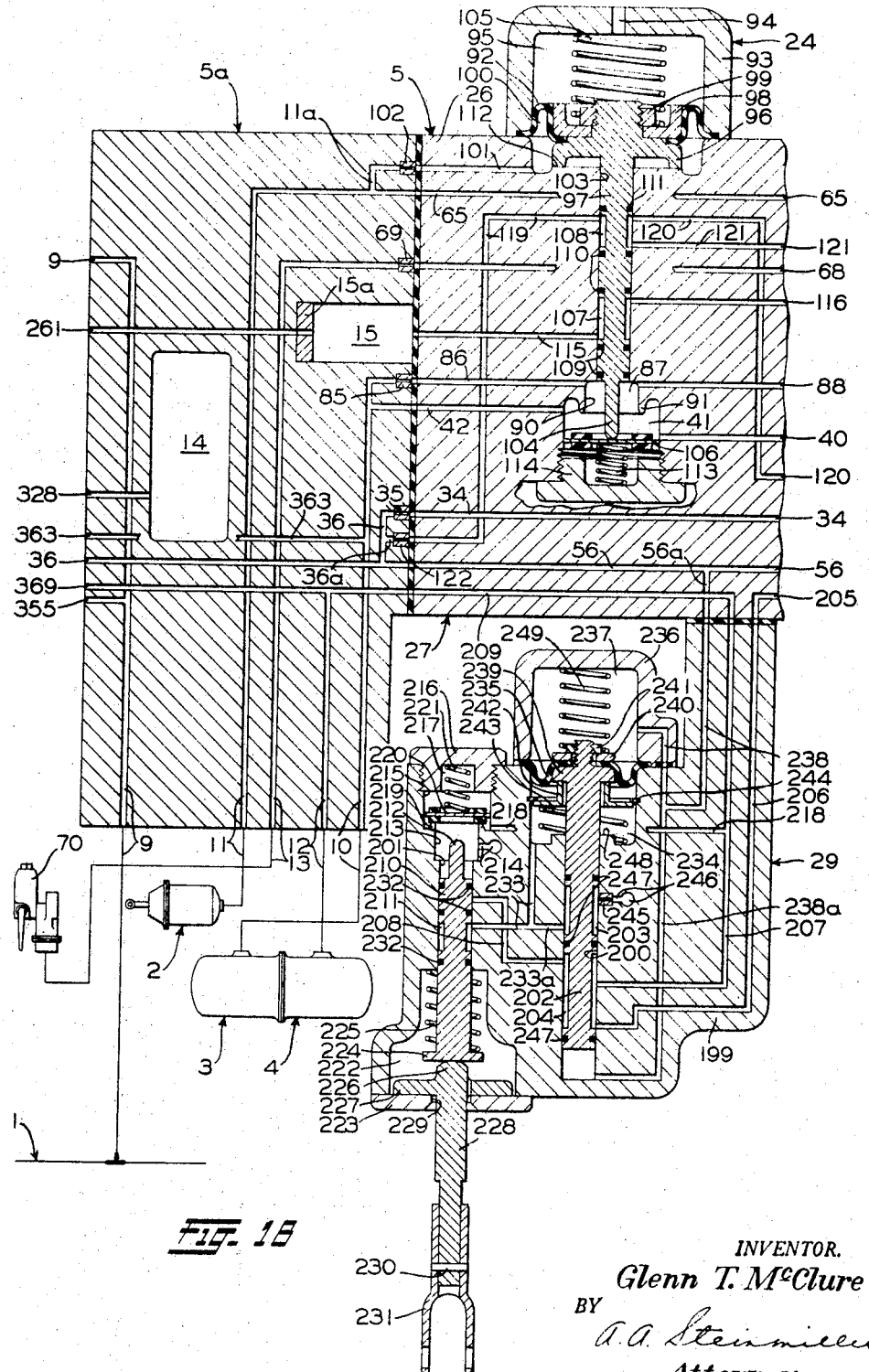

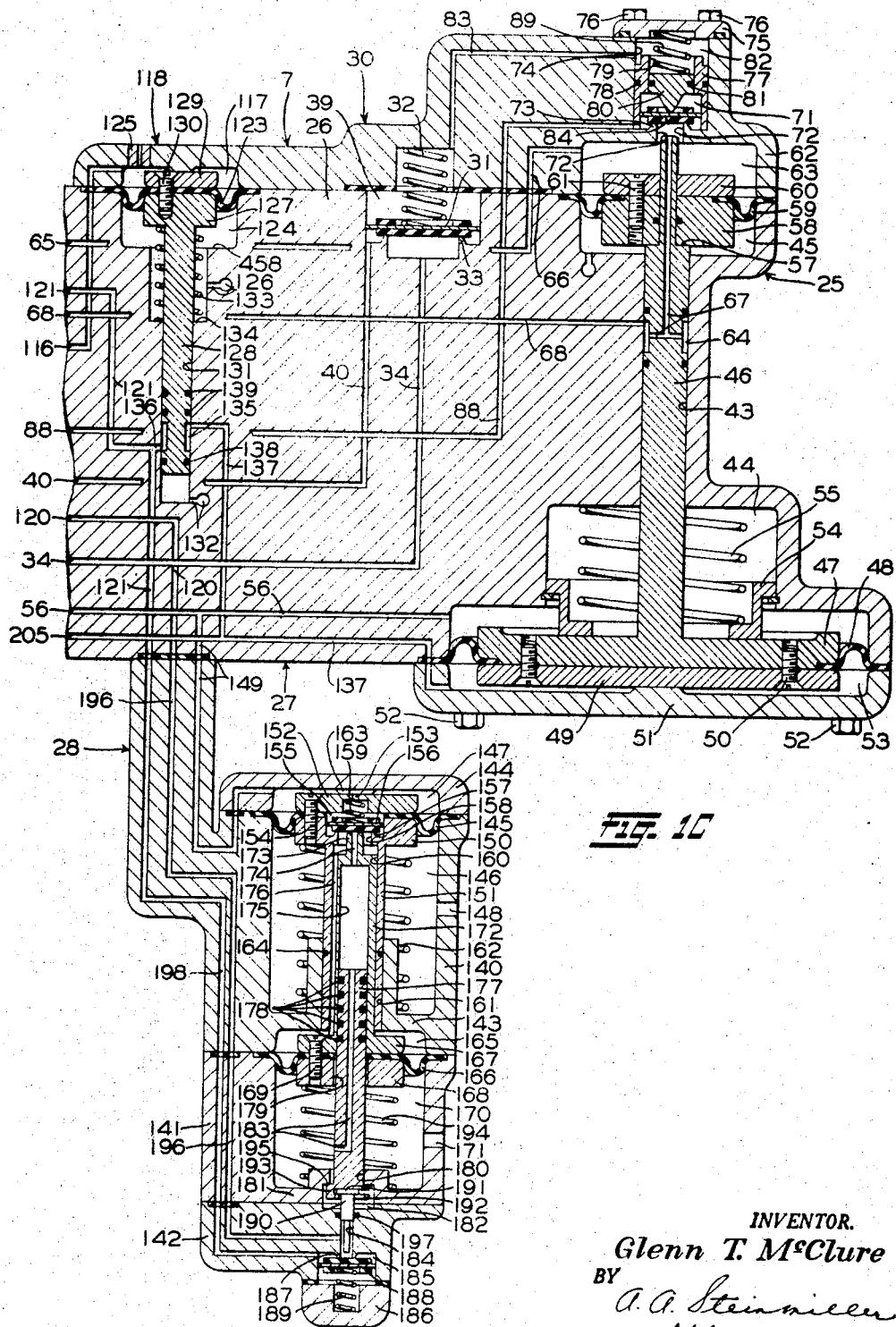

United States Patent Office 3,208,801
Patented Sept. 28, 1965

3,208,801
RAILWAY BRAKE CONTROL SYSTEM WITH OPTIONAL DIRECT OR GRADUATED RELEASE FEATURE
Glenn T. McClure, McKeesport, Pa., assignor to Westinghouse Air Brake Company, Wilmerding, Pa., a corporation of Pennsylvania
Filed July 13, 1962, Ser. No. 209,581
19 Claims. (Cl. 303—36)

This invention relates to railway brake control systems, and more particularly to such a brake control system in which a novel brake control valve device for each car of a train may be controlled by a novel brake valve device located on the locomotive and operable by the engineer to optionally effect either a direct release of the brakes or a graduated release of the brakes on the cars of the train.

Present day freight cars are conventionally equipped with the familiar AB air brake control valve device, a direct release type of valve device, which operates responsively to initiation of a small increase in brake pipe pressure following a brake application to a brake release position, thus effecting promptly a complete release of the brakes on the train.

Under certain service conditions, for example, when a freight train having cars equipped with the conventional AB control valve device must descend one or more long grades, it is necessary to stop the train prior to descending each grade and to manually adjust a retaining valve device on each car in the train to continuously retain during the descent at least a chosen pressure in the brake cylinder device associated with the AB air brake control valve device on each car in the train to prevent loss of control of the train by the engineer when he effects a brake release and recharge of the brake equipment and a subsequent reapplication of the brakes, which is necessary to replenish the brake equipment with fluid under pressure lost by leakage during the descent. Furthermore, upon completing the descent of the grade, it is again necessary to stop the train and manually adjust the retaining valve device on each car to effect a complete release of fluid under pressure from the corresponding brake cylinder device to prevent dragging of the brake shoes against the wheels of the freight cars and thereby causing undue brake shoe wear, until the train reaches the next descending grade.

Since each stop is time consuming and therefore expensive, it would be most desirable, where a train may be required to descend a number of long grades while passing through mountainous territory and also pass over considerable length of track in substantially level terrain, that each car in the train be provided with a brake control valve device that would not require a retaining valve and that would enable the engineer, at his discretion, to effect a graduated application and a graduated release of the brakes to a degree in accordance with the descending grade when in transit through the mountainous region, and to effect a less time consuming direct release of the brakes upon reaching the end of the descending grade and also when effecting a brake release while traveling through the substantially level territory.

It is the general purpose of this invention to provide a railway train brake control system including the combination with a novel, lightweight, and inexpensive car brake control valve device of a novel brake valve device located on the locomotive for controlling the aforesaid brake control valve devices on the cars via the usual brake pipe to cause operation thereof to effect optionally a direct release or a graduated release of the brakes on the cars.

In United States Patent 3,160,446 issued Demember 8, 1964, to Glenn T. McClure and assigned to the assignee of this application, there is disclosed and claimed a brake control valve device which may be converted readily from a direct release type valve device operable compatibly with cars equipped with direct release type control valves to a valve device of the graduated application and graduated release type suitable for use on either freight or passenger cars.

According to this invention, the novel brake control valve device represents an improvement over the brake control valve device described in United States Patent 3,160,446 issued December 8, 1964 to Glenn T. McClure and includes a fluid pressure operated direct release valve mechanism that controls a communication between the usual brake pipe and emergency reservoir, and an interlock valve device that cuts off communication between the brake pipe and emergency reservoir upon initiating an application of the brakes and is operable by fluid under pressure vented from the brake pipe in response to an initial quick service reduction in the pressure in the brake pipe to close the above-mentioned communication without inhibiting further quick service activity. Furthermore, the fluid pressure operated direct release valve mechanism is operable upon a slight increase in brake pipe pressure, subsequent to a brake application, to open this communication to effect equalization of emergency reservoir pressure and brake pipe pressure to provide a direct release of a brake application. The graduated release operation is restorable by removal of the fluid pressure operated direct release valve mechanism and by adding a cover plate blanking pad in its place to the brake control valve device.

More particularly, according to the present invention, a railway car fluid pressure operated brake control valve device of the graduated application and release type is provided which embodies therein a fluid pressure operated interlock valve device that cuts off communication between the brake pipe and the emergency reservoir upon initiating an application of the brakes, and a fluid pressure operated direct release valve mechanism. The fluid pressure operated interlock valve is under the control of the inshot valve of the usual railway car fluid pressure operated brake control valve device which inshot valve controls a communication between the quick service volume of the quick service valve of the brake control valve device and the fluid pressure operated interlock valve whereby the interlock valve is operated by air vented from the brake pipe to the quick service volume to close the communication between the usual brake pipe and emergency reservoir. The fluid pressure operated direct release valve mechanism includes a pilot valve, and a power piston supplied with fluid under pressure from the brake pipe by operation of the pilot valve. The power piston is operatively connected to an on-off type supply valve device including a flat disc type valve and a friction clutch, which valve device is operable to supply fluid under pressure from the brake pipe to the fluid pressure operated interlock valve, prior to overcoming the friction of the clutch, whereby the communication between the emergency reservoir and the brake pipe is immediately opened to effect an equalization of pressures therebetween and on the opposite sides of an operating piston of a service valve portion of the brake control valve device subject opposingly to these pressures, whereupon the service valve portion instantaneously effects a direct and complete release of the brakes on the freight car upon which the respective brake control valve device constituting the present invention is installed.

The novel brake valve device of the railway brake control system constituting the present invention includes essentially the combination in a No. 26 type brake valve device, such as is described and claimed in Patent No. 2,958,561, issued November 1, 1960, to Harry C. May and assigned to the assignee of the present invention, of two serially related chokes disposed in a communication through which fluid under pressure is supplied to charge the brake pipe and a valve controlled by the position of the handle of the brake valve device so as to establish an unrestricted by-pass communication around one of the chokes in only the running (i.e., release) position of the brake valve handle. Thus, while the brake valve handle occupies its running position, the usual normal rate of brake pipe charging is effected, and while the brake valve handle traverses its application zone in the direction of its running position and prior to reaching this position a less than normal or a restricted rate of brake pipe charging is effected.

When some cars in a train are provided with the familiar AB brake control valve device and the remaining cars are provided with the aforesaid novel brake control valve device, the above-mentioned novel brake valve device (with its selector valve device set in one position to condition the brake valve device for direct release operation of the brake control valve device on each of the cars) may be operated in the conventional manner for controlling the operation of the brakes on the train. When each car in a train is provided with the aforesaid novel brake control valve device converted for graduated application and graduated release operation, this brake valve device (with its selector valve device set in another position to condition the brake valve device for graduated application and graduated release operation of the brake control device on each of the cars) is operable, upon movement of the handle in the service zone toward full service position to cause graduated application of the brakes on the cars and upon movement of the handle reversely toward running position to effect operation of the brake control valve device on each of the cars in the train to cause a graduated release of the brakes on all of the cars.

In the accompanying drawings:

FIG. 1, FIG. 1A, FIG. 1B and FIG. 1C, when taken together such that the right-hand edge of FIG. 1 is matched with the left-hand edge of FIG. 1A, the right-hand edge of FIG. 1A is matched with the left-hand edge of FIG. 1B, and the right-hand edge of FIG. 1B is matched with the left-hand edge of FIG. 1C, constitute a diagrammatic view of a railway train fluid pressure brake system embodying the invention and comprising a novel locomotive brake valve device connected by the usual brake pipe to a novel direct release type of railway car fluid pressure operated brake control valve device.

FIG. 2 is a partial cross-sectional view showing a fragment of the fluid pressure operated brake control valve device shown in FIGS. 1A, 1B, and 1C with the direct release mechanism removed and replaced by a cover plate or blanking pad.

DESCRIPTION

Referring to the drawings, the railway train fluid pressure brake system embodying the invention comprises a brake pipe 1 that extends from the locomotive back through each car in the train on each of which cars is provided a brake cylinder device 2, an auxiliary reservoir 3, an emergency reservoir 4, and a car brake control valve device 5 connected to the brake pipe 1, the brake cylinder device 2, the auxiliary reservoir 3, and the emergency reservoir 4 on the respective car, and an engineer's brake valve device 6 located on the locomotive and connected to the brake pipe 1 extending from car to car through the train for controlling the pressure therein.

The brake control valve device 5 shown in FIGS. 1A, 1B and 1C comprises a pipe bracket portion 5a to the opposite faces of which is secured in sealed relation therewith, a service application valve portion 7 and an emergency application portion 8, respectively.

The pipe bracket portion 5a is provided with passageways 9, 10, 11, 12 and 13 therein, which passageways are connected respectively to the brake pipe 1, the auxiliary reservoir 3, the brake cylinder device 2, the emergency reservoir 4, and to atmosphere or to a retaining valve. Formed in the lower portion of the pipe bracket portion 5a and open to the left-hand face thereof through a passageway therein, as viewed in FIG. 1B, is a quick action chamber 14 for storing fluid under pressure supplied thereto from the brake pipe 1 through the emergency application portion 8 in a manner hereinafter described in detail. Formed in the pipe bracket portion 5a and opening to the right-hand face thereof is a quick service volume 15 to which fluid under pressure is supplied from the brake pipe 1 by operation of a quick service valve mechanism hereinafter described in detail. The capacity of the quick service volume 15 can be varied in accordance with the length of the brake pipe 1 on the car by the insertion of a plug 15a, the thickness of which corresponds to the length of the brake pipe 1 on the particular car.

The emergency application portion 8 comprises a continual quick service valve device 16, a quick service and emergency pilot valve device 17, a vent valve device 18, a high pressure valve device 19, a spill-over check valve device 20, a back-dump check valve device 21, a back-flow check valve device 22, and a brake pipe strainer 23.

The service application valve portion 7 comprises an inshot valve device 24 and a service valve device 25. The service valve device 25 has a casing section 26 provided on its lower end with a bolting face 27. Secured in spaced-apart relation to the bolting face 27 of the casing section 26 by any suitable means (not shown) is a direct release valve mechanism 28 and a manually operated brake cylinder release valve device 29 which also includes means for effecting a manual release of fluid under pressure from the emergency reservoir 4 to atmosphere as will be hereinafter explained in detail.

The service application valve portion 7 is further provided with an auxiliary reservoir charging check valve device 30 through which the auxiliary reservoir 3 is charged with fluid under pressure from the brake pipe 1. The auxiliary reservoir charging valve device 30 comprises a flat disc-type valve 31 that is urged by a light biasing spring 32 into seated contact with an annular valve seat 33 formed adjacent one end of a passageway 34 in the casing section 26, the opposite end of which passageway 34 is connected through an auxiliary charging choke 35 to a first branch of a passageway 36 in the pipe bracket portion 5a. The passageway 36 extends through the pipe bracket portion 5a and at its left-hand end is connected to a passageway 37 in a casing section 38 of the emergency application portion 8. The passageway 37 opens into the interior of the brake pipe strainer 23 carried in the casing section 38. Upon brake pipe pressure in the passageway 34 building up sufficiently to overcome the biasing force of the spring 32, the flat disc-type valve 31 is moved against the yielding resistance of the spring 32 away the annular valve seat 33 to permit a one-way flow of fluid under pressure from the passageway 34 to an outlet chamber 39. The outlet chamber 39 is in constant communication with the auxiliary reservoir 3 by way of a passageway 40 and a chamber 41 in the casing section 26, a passageway 42 extending from the chamber 41 through the casing section 26, and communicating with the passageway 10 in the pipe bracket portion 5a and the corresponding pipe 10 connected to the auxiliary reservoir 3.

During initial charging of the auxiliary reservoir 3 and during recharging of this reservoir after a brake application, whenever the pressure of fluid in the brake pipe 1 exceeds the pressure of fluid in the auxiliary reservoir 3 by an amount in excess of the biasing force of the spring 32, the flat disc-type valve 31 will be unseated from the annular valve seat 33 against the yielding resistance of the spring 32 whereupon fluid under pressure will flow from the brake pipe 1 to the auxiliary reservoir 3 via pipe and passageway 9, brake pipe strainer 23, passageway 37, passageway 36, auxiliary reservoir charging choke 35, passageway 34, past the unseated flat disc valve 31 to the outlet chamber 39 and thence through the passageway 40, chamber 41, passageway 42, and passageway and corresponding pipe 10, until the auxiliary reservoir 3 is charged to substantially the pressure normally carried in the brake pipe 1.

The service valve device 25 serves to control the supply of fluid under pressure from the auxiliary reservoir 3 to the brake cylinder device 2, when a brake application is effected, and from the brake cylinder to atmosphere upon effecting a release of the brakes, and is constructed to be responsive to variations in brake pipe pressure to be movable to a service position, a lap position, and a brake release position.

The casing section 26 of the service valve device 25 is provided with a bore 43 which opens at one end into a chamber 44 adjacent the end of the casing section 26 upon which the bolting face 27 is formed and opens at the other end into an atmospheric chamber 45 also formed in the casing section 26 and at the end thereof opposite the end upon which the bolting face 27 is formed. Slidably mounted in the bore 43 is a valve stem 46 which has formed integral therewith at the end thereof that extends into the chamber 44 a diaphragm follower 47. The diaphragm follower 47 is operatively connected to the center of a diaphragm 48 by means such as diaphragm follower plate 49 and a plurality of cap screws 50 that pass through corresponding smooth bores in the diaphragm follower plate 49 and have screw-threaded engagement with coaxial threaded bores in the diaphragm follower 47. The outer periphery of the diaphragm 48 is clamped between the bolting face 27 of the casing section 26 and a cover 51. The cover 51 is secured to the casing section 26 by a plurality of cap screws 52.

The diaphragm 48 cooperates with the casing section 26 and the cover 51 to form within the service valve device 25 and on opposite sides of the diaphragm the chamber 44 and a chamber 53. Disposed within the chamber 44 between the casing section 26 and a hollow spring seat 54, and in surrounding relation to the valve stem 46, is a spring 55 for biasing the spring seat 54 against the diaphragm follower 47 and thereby biasing the rod 46 and the diaphragm 48 in a downward direction. The chamber 44 above the diaphragm 48 is connected by a passageway 56 formed in the casing section 26 to the passageway 36 in the pipe bracket portion 5a so that the chamber 44 is charged with fluid under pressure from the brake pipe 1 via pipe and passageway 9, brake pipe strainer 23, passageways 37, 36 and 56.

The end of the stem 46 that extends into the chamber 45 is provided with a portion of reduced diameter to form a shoulder 57 on the stem against which rests an annular diaphragm follower 58. The diaphragm follower 58 is operatively connected to the center of a diaphragm 59 by means such as a diaphragm follower plate 60 and a plurality of cap screws 61, only one of which is shown, which extend through smooth bores in the diaphragm follower plate 60 and have screw-threaded engagement with coaxial screw-threaded bores in the diaphragm follower 58. The outer periphery of the diaphragm 59 is clamped between the upper side of the casing section 26 and a second casing section 62 of the service valve device 25 that is secured thereto by any suitable means (not shown).

The diaphragm 59 cooperates with the casing sections 26 and 62 to form within the service valve device 25 and on opposite sides of the diaphragm the hereinbefore-mentioned chamber 45 and a chamber 63.

The valve stem 46 is formed intermediate its ends with a peripheral annular groove 64 which, as shown in FIG. 1C illustrating the relative positions of the parts of the service valve device 25 in the brake release position, is so located and arranged that the brake cylinder device 2 is open to atmosphere via the pipe and corresponding passageway 11 in the pipe bracket portion 5a, a passageway 65 in the casing section 26 which registers with a passageway 66 extending through the casing section 62 and opening into the chamber 63 which in turn is connected through a passageway 67 extending from the upper end of the valve stem 46 longitudinally therethrough to the location thereon at which the peripheral annular groove 64 is formed and thence crosswise the stem 46 so as to open into the groove 64, thence via a passageway 68 in the casing section 26, a brake cylinder exhaust control choke 69 in the pipe bracket portion 5a, and the passageway and corresponding pipe 13 to atmosphere via a retaining valve 70.

The chamber 63 is connected to a chamber 71 formed in the casing section 62 by a bore 72 at the upper end of which is formed an annular valve seat 73. The casing section 62 is provided with a counterbore 74 that is coaxial with the annular valve seat 73 and coextensive with the chamber 71. Disposed in the counterbore 74, the outer end of which is closed by a cover 75 secured to the casing section 62 by a plurality of cap screws 76, is a bushing 77 having a groove in the periphery thereof, in which groove is carried an O-ring seal 78 to prevent leakage of fluid under pressure along the bore 74 between the bushing 77 and the wall of the bore 74 in the casing section 62. The bushing 77 is provided with a bore 79 in which is slidably mounted a piston 80 that is provided with a peripheral annular groove in which is disposed an O-ring seal 81 to prevent leakage of fluid under pressure from the chamber 71 below the piston 80 to a chamber 82 above the piston 80, which chamber 82 is connected by a passageway 83 in the casing section 62 to the outlet chamber 39 of the auxiliary reservoir charging check valve device 30 in order that fluid under pressure supplied from the brake pipe 1 to the auxiliary reservoir 3 past the disc-type check valve 31 may flow to the chamber 82 and act on top of the piston 80 to balance the pressure acting on a flat disc-type valve 84 disposed in the chamber 81 when the flat disc-type valve 84 is unseated from the valve seat 73 since the chamber 71 is constantly supplied with fluid under pressure from the auxiliary reservoir 3 via the pipe and corresponding passageway 10, a service choke 85 carried by the pipe bracket portion 5a, a passageway 86 in the casing section 26 extending from the service choke 85 to a chamber 87 which chamber is connected by another passageway 88 extending through the casing section 26 and the casing section 62 to the chamber 71. A spring 89 is disposed between the cover 75 and the upper side of the piston 80 to bias this piston and the flat disc-type valve 84 downward so that the flat disc-type valve 84 is moved into contact with the annular valve seat 73 except when unseated therefrom in a manner hereinafter described.

The chamber 87 is connected to the chamber 41 by a bore 90 at the lower end of which is formed a valve seat 91 (see FIG. 1B) that constitutes a part of the inshot valve device 24. The inshot valve device 24 further comprises a diaphragm 92, the outer periphery of which is clamped between the casing section 26 and a cover 93 secured thereto by any suitable means (not shown). The cover 93 is provided with a port 94 through which a chamber 95 formed between the upper side of the diaphragm 92 and the cover is open to atmosphere. The center of the diaphragm 92 is secured to a diaphragm follower 96 formed integral with the upper end of an inshot valve stem 97 by means such as a diaphragm follower plate 98 and a nut 99. The diaphragm 92 cooperates with the casing section 26 to form on the lower side of the diaphragm a chamber 100 that is connected to the brake cylinder pipe and passageway 11 via a passageway 101 in the casing section 26, a choke 102 carried in the pipe bracket portion 5a, and a branch passageway 11a also in the pipe bracket portion 5a.

The chambers 100 and 87 in the casing section 26 are connected by a bore 103 therein, which bore 103 is coaxial with the bore 90. The inshot valve stem 97 is slidably mounted in the bore 103 and has on its lower end a portion 104 of reduced diameter. In the absence of fluid under pressure in the chamber 100, a spring 105 disposed in the chamber 95 and interposed between the diaphragm follower plate 98 and the cover 93 biases the inhot valve stem 97 to the position in which it is shown in FIG. 1B, in which position portion 104 of reduced diameter extends through the bore 90 and is effective to unseat a flat disc-type valve 106 disposed in the chamber 41 from the valve seat 91 to thereby open a communication between the chambers 87 and 41.

Intermediate the diaphragm follower 96 and the portion 104 of reduced diameter, the valve stem 97 is provided with two spaced-apart peripheral annular grooves 107 and 108, the peripheral annular groove 107 being nearest the chamber 87. In order to prevent leakage of fluid under pressure along the bore 103 from the chamber 87 to the peripheral annular groove 107, the stem 97 is provided with two spaced-apart peripheral annular grooves in each of which is carried on O-ring seal 109. In order to prevent leakage of fluid under pressure from the peripheral annular groove 107 to the peripheral annular groove 108 and vice versa, the inshot valve stem 97 is provided with a second pair of spaced-apart peripheral annular grooves in each of which is disposed an O-ring seal 110. Furthermore, in order to prevent leakage of fluid under pressure between the annular groove 108 and the chamber 100, the inshot valve stem 97 is provided along its length intermediate the annular groove 108 and the chamber 100 with a peripheral annular groove in which is carried an O-ring seal 111.

In the absence of fluid under pressure in the chamber 100, the spring 105 is effective to bias the inshot valve stem 97 downward to the position shown in FIG. 1B, in which position the diaphragm follower 96 abuts a stop 112 formed integral with the casing section 26 and disposed in the chamber 100. In this position of the inshot valve stem 97, the reduced portion 104 thereof is effective to maintain the disc-type valve 106 unseated from the valve seat 91 against the biasing force of a spring 113 interposed between the disc-type valve 106 and a plug 114 that has screw-threaded engagement with a threaded bore in the casing section 26 to close the open end of the chamber 41.

Also, while the inshot valve stem 97 is maintained in the position shown in FIG. 1B by the spring 105, the peripheral annular groove 107 formed on the periphery of the valve stem 97 is effective to establish a communication between that end of a passageway 115 that opens at the wall surface of the bore 103 and that end of a passageway 116 that also opens at the wall surface of the bore 103 above the opening of the passageway 115 at this wall surface a distance equal to the length of the peripheral annular groove 107. The opposite end of the passageway 115 opens into the quick service volume 15 and the opposite end of the passageway 116 opens into a chamber 117 in an interlock valve device 118 which will be hereinafter described in detail.

Furthermore, while the inshot valve stem 97 occupies the position in which it is shown in FIG. 1B of the drawings, the peripheral annular groove 108 thereon is effective to establish a communication between that end of a passageway 119 that opens at the wall surface of the bore 103 and the respective ends of two passageways 120 and 121 that also open at the wall surface of the bore 103. The end of the passageway 120 opening at the wall surface of the bore 103 is located diametrically opposite the opening of the passageway 119, and the end of the passageway 121 opening at the wall surface of this bore is located below the opening of the passageway 119 at this wall surface a distance equal to the length of the peripheral annular groove 108. Therefore, when the inshot valve stem 97 is moved upward from the position shown in FIG. 1B to a second position in response to upward deflection of the diaphragm 92 as a result of the supply of fluid under pressure to the chamber 100 in a manner hereinafter described, the peripheral annular groove 108 will maintain communication between the passageways 119 and 120 and close communication between the passageway 119 and the passageway 121.

The passageway 119 extends from the end thereof opening at the wall surface of the bore 103 through the casing section 26 to one end of a choke 122 carried in the pipe bracket portion 5a. The opposite end of the choke 122 is connected by a branch passageway 36a to the passageway 36 in the pipe bracket portion 5a. Likewise, the passageways 120 and 121 each extend from their respective end opening at the wall surface of the bore 103 through the casing section 26 to a corresponding opposite end opening at the surface of the bolting face 27 on the lower side of this casing section where they register respectively with corresponding passageways hereinafter described in detail in the direct release valve mechanism 28.

The hereinbefore-mentioned interlock valve device 118 comprises a diaphragm 123, the outer periphery of which is clamped between the casing sections 26 and 62. The diaphragm 123 cooperates with the respective casing sections 26 and 62 to form on opposite sides of the diaphragm the above-mentioned chamber 117 and a chamber 124. The chambers 117 and 124 are always open respectively via a choke 125 carried by the casing section 62 and a passageway and port 126 formed in the casing section 26 to atmosphere. The center of the diaphragm 123 is secured to a diaphragm follower 127 formed integral with the upper end of an interlock valve stem 128 by means such as a diphragm follower plate 129 and a plurality of cap screws 130 that pass through corresponding smooth bores in the diaphragm follower plate 129 and have screw-threaded engagement with coaxial threaded bores in the diaphragm follower 127. Only one of the cap screws 130 appears in FIG. 1C of the drawings.

The casing section 26 is provided with a bottomed bore 131, the upper end of which opens into the chamber 124 and the lower end of which is open via a passageway and port 132 in the casing section 26 to atmosphere. The interlock valve stem 128 is slidably mounted in the bottomed bore 131, and, in the absence of fluid under pressure in the chamber 117, is biased to the position shown in FIG. 1C of the drawings by a spring 133 disposed in the chamber 124 in surrounding relation to the interlock valve stem 128 and interposed between the diaphragm follower 127 and a shoulder 134 formed on the casing section 26 at the upper end of the bottomed bore 131.

The interlock valve stem 128 adjacent its lower end is provided with a peripheral annular groove 135 which, while the interlock valve stem 128 occupies the position shown in FIG. 1C, is effective to establish a communication between one end of a passageway 136 that opens at the wall surface of the bottomed bore 131 and one end of a passageway 137 that also opens at the wall surface of the bottomed bore 131 above the opening of the passageway 136 at the wall surface of the bottomed bore 131 a distance equal to the length of the peripheral annular groove 135. The opposite end of the passageway 136 opens into the hereinbefore-mentioned passageway 121 in the casing section 26 and the opposite end of the passageway 137 opens into the chamber 53 below the diaphragm 48 of the service valve device 25.

In order to prevent leakage of fluid under pressure from the peripheral annular groove 135 to the lower end of the bottomed bore 131 and thence via passageway and port 132 to atmosphere, the interlock valve stem 128 is provided below the peripheral annular groove 135 with another peripheral annular groove in which is carried an O-ring seal 138 that has sealing and sliding contact with the wall of the bottomed bore 131. Furthermore, to insure closing of the communication between the passageways 136 and 137, upon movement of the interlock valve stem 128 downward from the position shown in FIG. 1C to a second position in response to the supply of fluid under pressure to the chamber 117 above the diaphragm 123 in a manner hereinafter described, the interlock valve stem 128 is provided above the upper end of the peripheral annular groove 135 with two spaced-apart peripheral annular grooves in each of which is carried an O-ring seal 139.

The direct release valve mechanism 28, shown in FIG. 1C of the drawings, is preferably built up of a first casing section 140 which has its upper end secured to the bolting face 27 of the casing section 26 by any suitable means (not shown), a second casing section 141 which is secured to the lower end of the first casing section 140 by any suitable means (not shown), and a third casing section 142 secured to the lower end of the second casing section 141 by any suitable means (not shown). As shown in FIG. 1C, the casing section 140 of the direct release valve 28 is provided with a horizontal wall 143 that divides the casing section 140 into two oppositely extending cup-shaped portions. Clamped between the upper end of the upper cup-shaped portion of the casing section 140 and a cover 144 is the outer periphery of a diaphragm 145 that cooperates respectively with the casing section 140 and the cover 144 to form on opposite sides of the diaphragm two chambers 146 and 147. The chamber 146 is constantly open via an opening 148 in the casing section 140 to atmosphere, and the chamber 147 is connected via a passageway 149 extending through the cover 144 and casing sections 140 and 26 to the passageway 56 in the casing section 26, which passageway 56 is connected to the brake pipe 1, as hereinbefore described. Therefore, fluid under pressure supplied from the brake pipe 1 to the passageway 56 flows through the passageway 149 to the chamber 147 so that the pressure therein increases simultaneously as the pressure in the brake pipe 1 is increased.

The center of the diaphragm 145 is operatively connected to a diaphragm follower 150 formed at the upper end of a cylindrical member 151 by a diaphragm follower plate 152 having a port 153 therein and a plurality of cap screws 154, only one of which appears in FIG. 1C of the drawings, these cap screws extending through smooth bores in the diaphragm follower plate 152 and having screw-threaded engagement with corresponding screw-threaded bores in the diaphragm follower 150.

The diaphragm follower 150 and diaphragm follower plate 152 are provided with oppositely disposed cavities which cooperate to form a chamber 155 that is always open to the chamber 147 through the port 153 in the diaphragm follower plate 152. Contained in the chamber 155 is a disc-type valve 156 which cooperates with an annular valve seat 157 formed on the cylindrical member 151 surrounding the upper end of a bore 158 therein and projecting into the chamber 155. Interposed between the upper face of the disc-type valve 156 and the diaphragm follower plate 152 is a spring 159 for resiliently seating disc-type valve 156 on the annular valve seat 157 to close communication between the chamber 155 and the interior of the bore 158 which is coaxial with a counterbore 160 also in the cylindrical member 151, the lower end of which is slidably mounted in a bore 161 extending through the horizontal wall 143.

Disposed within the chamber 146 between the horizontal wall 143 and the diaphragm follower 150 and in surrounding relation to the cylindrical member 151 is a spring 162 for biasing the diaphragm follower plate 152 in an upward direction to the position shown in FIG. 1C in which the diaphragm follower plate 152 rests against a stop 163 formed on the interior of the cover 144. In the position shown, the spring 162 is not compressed or, in other words, is expanded to its free height.

As shown in FIG. 1C, that portion of the cylindrical member 151 that extends into the bore 161 in the horizontal wall 143 is provided with a peripheral annular groove in which is inserted an O-ring seal 164, the purpose of which is to prevent leakage of fluid under pressure to the atmospheric chamber 146 from a chamber 165 formed by the cooperative relationship between the lower cup-shaped portion of the casing section 140 and a diaphragm 166, the outer periphery of which is clamped between the casing sections 140 and 141 by any suitable means (not shown).

The center of the diaphragm 166 is operatively connected to a diaphragm follower 167 by a diaphragm follower plate 168 and a plurality of cap screws 169, only one of which is shown in FIG. 1C, these cap screws extending through smooth bores in the diaphragm follower 167 and having screw-threaded engagement with corresponding screw-threaded bores in the diaphragm follower plate 168.

The diaphragm 166 cooperates with the casing sections 140 and 141 to form above the diaphragm the hereinbefore-mentioned chamber 165 and below the diaphragm a chamber 170 that is always open to atmosphere through a port 171 formed in the casing section 141.

Formed integral with and extending upward from the upper side of the diaphragm follower 167 and slidably mounted in the counterbore 160 is a piston-like member 172 having at its upper end a portion of reduced diameter upon which is formed an annular valve seat 173 that surrounds the upper end of a bore 174 therein. The piston-like member 172 is provided with a counterbore 175 that is coaxial with the bore 174 and has on its periphery a longitudinal slot or groove 176 through which fluid under pressure may flow, while the disc-type valve 156 is unseated from annular valve seat 157, from the chamber 155 to the chamber 165, and, while the disc-type valve 156 is unseated from annular valve seat 173, from the chamber 165 to atmosphere in a manner hereinafter described in detail.

Slidably mounted in the counterbore 175 is the upper end of a valve operating cylinder 177 which is provided with five spaced-apart peripheral annular grooves in each of which is carried an O-ring seal 178 that has sealing and sliding contact with the wall surface of the counterbore 175. The friction between the outer periphery of the five O-ring seals 178 and the wall surface of the counterbore 175 constitutes a friction clutch, the operation of which is hereinafter explained in detail. The valve operating cylinder 177 extends downward through a bore 179 in the diaphragm follower plate 168 and an opening 180 in a horizontal wall 181 that closes the lower end of casing section 141 and into a chamber 182 constituted by the cooperative relation of two oppositely arranged cavities formed in the abutting faces of the casing sections 141 and 142. The valve operating cylinder 177 has a passageway 183 therein, one end of which opens at the top of the cylinder and the opposite end of which opens at the peripheral surface of the cylinder substantially below the diaphragm follower plate 168 so as to provide a communication from the chamber 165 via slot 176, counterbore 160, bores 158 and 174, counterbore 175, said passageway 183, chamber 170 and port 171 to atmosphere while the members 151 and 172 occupy relative positions in which the annular valve seat 173 is disposed below and out of contact with the disc-type valve 155 as hereinafter described.

The chamber 182 is connected by a bore 184 to a chamber 185 formed by the cooperative relationship between the casing section 142 and a cover 186 secured thereto by any suitable means (not shown). Formed at the lower end of the bore 184 is an annular valve seat 187 against which is normally biased a flat disc-type valve 188 by a spring 189 disposed in the chamber 185 and interposed between the lower side of the flat disc-type valve 188 and the cover 186. The flat disc-type valve 188 is adapted to be moved downward away from the annular valve seat 187 against the yielding resistance of the spring 189 by a valve operating stem 190 slidably mounted in the bore 184 and extending into the chamber 182. The upper end of the valve operating stem 184 is provided with a collar 191 which is linked to the lower end of the valve operating cylinder 177 by means of a forked connection 192 that is formed, as by machining, in an enlarged head 193 that is integral with the lower end of the valve operating cylinder 177.

Disposed in the chamber 170 in surrounding relation to the valve operating cylinder 177 and interposed between the diaphragm follower plate 168 and the horizontal wall 181 is a spring 194 which is effective, through the friction provided between the O-ring seals 178 and the wall of the counterbore 175, to normally bias the enlarged head 193 formed on the lower end of the valve operating cylinder 177 against a shoulder 195 formed by the horizontal wall 181 at the lower end of the opening 180.

Opening at the wall surface of the bore 184 intermediate the ends thereof is one end of a passageway 196 that extends through the casing sections 142, 141 and 140 to the bolting face 27 formed on the lower side of the casing section 26 where the other end of this passageway registers with that end of the passageway 120 in the casing section 26 that opens at the surface of bolting face 27. In order to prevent leakage of fluid under pressure from the interior of the bore 184 to the chamber 182, the wall of the bore 184, above the location at which one end of the passageway 196 opens at the wall surface of this bore, is provided with an internal annular groove in which is disposed an O-ring seal 197 that surrounds the valve operating stem 190 to provide a seal therewith.

Opening into the chamber 185 is one end of a passageway 198 that extends through the casing sections 142, 141 and 140 to the bolting face 27 where the other end of this passageway registers with that end of the passageway 121 in the casing section 26 that opens at the surface of bolting face 27. The passageways 196 and 198 cooperate to provide a communication through which fluid under pressure may flow from the emergency reservoir 4 to the brake pipe 1 while the flat disc-type valve 188 is held unseated from the annular valve seat 187 upon effecting a release of the brakes subsequent to a brake application in a manner hereinafter described in detail.

The manually operated brake cylinder release valve device 29 shown in FIG. 1B of the drawings comprises a casing section 199 which is secured to the bolting face 27 of the casing section 26 by any suitable means (not shown) and in parallel spaced-apart relation to the first casing section 140 of the direct release valve mechanism 28. The casing section 199 of the manually operated brake cylinder release valve device 29 is provided with a counterbore 200 and a bore 201 arranged in parallel spaced-apart relation. Slidably mounted in the counterbore 200 is a spool-type valve 202 which is provided intermediate its ends with a first peripheral annular groove 203 and a second peripheral annular groove 204 spaced along the spool-type valve 202 below the first peripheral annular groove 203.

One end of a passageway 205 in the casing section 26 of the service valve device 25 opens into the hereinbefore-mentioned passageway 137 in this casing section and the opposite end opens at the surface of the bolting face 27 on the lower side of the casing section 26 and there registers with one end of a passageway 206 in the casing section 199 of the manually operated brake cylinder release valve device 29. The opposite end of the passageway 206 opens at the wall surface of the counterbore 200 at a loction intermediate the ends thereof such that while the spool-type valve 202 occupies the intermediate one of three positions in which intermediate position it is shown in FIG. 1B of the drawings, the peripheral annular groove 204 on the spool-type valve 202 establishes a communication between the passageway 206 and two passageways 207 and 208 in the casing section 199, one end of each of which passageways opens at the wall surface of the counterbore 200, above the opening of the passageway 206 at the wall surface of this counterbore. The other end of the passageway 207 registers at the surface of the bolting face 27 of the casing section 26 with one end of a passageway 209 in the casing section 26 of the service valve device 25. The other end of the passageway 209 registers with the passageway 12 in the pipe bracket portion 5a of the brake control valve device 5, which passageway 12 is connected by the pipe bearing the same numeral to the emergency reservoir 4.

The other end of the passageway 208 opens at the wall surface of the bore 201 in which is slidably mounted a spool-type valve 210 that is provided intermediate its ends with a peripheral annular groove 211. The upper end of the spool-type valve 210 has formed integral therewith a portion 212 of reduced diameter that extends into a counterbore 213 that is coaxial with the bore 201, the upper end of which opens into this counterbore. The counterbore 213 is open to atmosphere via a port and passageway 214 in the casing section 199.

The upper end of the counterbore 213 opens into a coaxial counterbore 215 of larger diameter, the upper end of which is closed by a screw-threaded cap 216 so as to form in the casing section 199 a chamber 217 which is connected to the passageway 207 by a passageway 218. The upper end of the counterbore 213 has formed thereon an annular valve seat 219 against which a flat disc-type valve 220 disposed in the chamber 217 is normally biased by a spring 221 interposed between the flat disc-type valve 220 and the cap 216.

The lower end of the spool-type valve 210 extends into a chamber 222 formed in the casing section 199, the open end of which chamber is closed by a bottom cover 223 secured to the casing section 199 by any suitable means (not shown). The lower end of the spool-type valve 210 has formed integral therewith a collar 224 between which and the casing section 199 is disposed in surrounding relation to the spool-type valve 210 a spring 225 that is effective to normally bias the spool-type valve 210 to the position in which it is shown in FIG. 1B of the drawings in which position the collar 224 abuts a central boss 226 formed on the upper side of a flange 227 that is integral with the upper end of a manually operated release valve stem 228 that extends through a bore 229 in the bottom cover 223. The lower end of the manually operated release valve stem 228 has secured thereto, as by a pin 230, a clevis 231 the jaws of which may be operatively connected to pull rods (not shown) which extend to each side of the freight car. As viewed in FIG. 1B of the drawings, the spool-type valve 210 is provided on the upper side of the peripheral annular groove 211 thereon with two spaced-apart peripheral annular grooves in each of which is carried an O-ring seal 232. On the lower side of the peripheral annular groove 211 the spool-type valve 210 is provided with a third peripheral annular groove in which is also carried an O-ring seal 232, it being understood that all three of the O-ring seals 232 are identical in construction.

While the spool-type valve 210 occupies the position in which it is shown in FIG. 1B of the drawings, the two upper O-ring seals 232 are disposed on opposite sides of that end of the passageway 208 that opens at the wall surface of the bore 201. Therefore, these two O-ring seals 232 cooperate to prevent leakage of fluid under pressure from the passageway 208 along the periphery of the spool-type valve 210 to respectively the upper end of the bore 201 and the peripheral annular groove 211 formed on the periphery of this spool-type valve.

Formed in the casing section 199 is a passageway 233, one end of which opens at the wall surface of the bore 201 intermediate the ends thereof and below the opening of the passageway 208 at the wall surface of this bore. This opening is so located as to be in registry with the peripheral annular groove 211 formed on the spool-type valve 210 while the spool-type valve occupies the position in which it is shown in FIG. 1B and also while the spool-type valve occupies a second position to which it may be moved by a trainman exerting a pull on one of the pull rods attached to the clevis 231 secured to the manually operated release valve stem 228 by the pin 230.

The other end of the passageway 233 opens into a chamber 234 below a diaphragm 235, hereinafter referred to as a lock-up diaphragm, that has its outer periphery clamped between the casing section 199 and a cover 236 which is secured to the casing section 199 by any suitable means (not shown). The diaphragm 235 and cover 236 cooperate to form a chamber 237 above the diaphragm 235 into which chamber 235 opens one end of a passageway 238 that extends through the cover 236 and the casing 199 to the bolting face 27 on the lower side of the casing section 26 where it registers with a branch passageway 56a of the passageway 56 in the casing section 26 so that the chamber 237 is charged with fluid under pressure from the brake pipe 1 via pipe and passageway 9, brake pipe strainer 23, passageways 37, 36, 56, 56a and 238. The passageway 238 has a branch passageway 238a that opens at the wall surface of the counterbore 200 adjacent the lower end thereof in order that both ends of the spool-type valve 202 slidably mounted in the counterbore 200 are subject to brake pipe pressure to thereby balance the spool-type valve by subjecting both ends thereof to brake pipe pressure.

Formed integral with and near the upper end of the spool-type valve 202 is a diaphragm follower 239. The diaphragm follower 239 is operatively connected to the center of the diaphragm 235 by such as a diaphragm follower plate 240 and a nut 241 having screw-threaded engagement with a threaded portion of the spool-type valve 202 located at the upper end thereof. Disposed within the chamber 234 and in surrounding relation to the spool-type valve 202 is a flanged-type annular spring seat 242. A spring 243 disposed between the spring seat 242 and the casing section 199 is effective, in the absence of fluid under pressure in the chamber 237, to bias the spring seat 242 into contact with a snap ring 244 that is inserted in a groove formed in the wall of the chamber 234. The passageway 233 has a branch passageway 233a that opens at the wall surface of the counterbore 200 intermediate the ends thereof and above the opening of the passageway 208 at the wall surface of this counterbore. This opening is so located as to be always in registry with the peripheral annular groove 203 on the spool-type valve 202. While the spool-type valve 202 occupies the position in which it is shown in FIG. 1B, the peripheral annular groove 203 thereon establishes a communication between the branch passageway 233a and a choke 245, the outlet of which is open to the atmosphere via a passageway and port 246 in the casing section 199. Since the branch passageway 233a is connected via passageway 233 to the chamber 234, this chamber is also vented to atmosphere while the spool-type valve 202 occupies the position in which it is shown in FIG. 1B.

An O-ring seal 247 is carried by the spool-type valve 202 in each of three spaced-apart peripheral annular grooves thereon which are spaced along the length of the spool valve 202 so that, while it occupies the position in which it is shown in FIG. 1B, the O-ring seal 247 adjacent the upper end of the peripheral annular groove 204 prevents leakage of fluid under pressure from the emergency reservoir 4 via pipe and passageway 12, passageways 209 and 207, and peripheral annular groove 204, to the peripheral annular groove 203 and thence, via choke 245 and passageway and port 246, to atmosphere, and the O-ring seal 247 adjacent the lower end of the peripheral annular groove 204 prevents leakage from the emergency reservoir 4 to the bottom of counterbore 200 into which opens the branch passageway 238a that is normally charged to brake pipe pressure.

Upon brake pipe pressure in the chamber 237 increasing above thirty pounds per square inch, the diaphragm 235 will be deflected downward against the yielding resistance of the spring 243 to move the spool-type valve 202 downward to the lowermost of its three positions in which the flange on the spring seat 242 abuts a stop 248 formed integral with the casing section 199 at the upper end of counterbore 200. While the spool-type valve 202 occupies this lowermost position, the O-ring seal 247, located between the upper end of the peripheral annular groove 204 and the lower end of the peripheral annular groove 203, is disposed below the opening of the passageway 208 at the wall surface of the counterbore 200 and above the opening of the passageway 207 at the wall surface of this counterbore to prevent the flow of fluid under pressure from the emergency reservoir 4 via pipe and passageway 12, passageways 209 and 207, and peripheral annular groove 204 to the passageway 208 to thereby insure that fluid under pressure cannot be supplied to the chamber 234 if a malicious person, subsequent to the pressure in the brake pipe 1 being reduced to some value in excess of thirty pounds per square inch to effect a brake application, by exerting a pull on either one of the pull rods connected to the clevis 231, moves the spool-type valve 210 upward from the position in which it is shown in FIG. 1B to a position in which the peripheral annular groove 211 on the periphery of this spool-type valve establishes a communication between the passageways 208 and 233. If the passageway 208 were not thus cut off from the passageway 207, then, upon the malicious person moving the spool valve 210 to the position in which the peripheral annular groove 211 thereon establishes a communication between the passageways 208 and 233, fluid under pressure would flow from the emergency reservoir 4 to the chamber 234. Since the emergency reservoir pressure would be higher than the reduced brake pipe pressure present in the chamber 237, as the result of having previously reduced brake pipe pressure to effect a brake application, this higher pressure supplied to the chamber 234 would be effective to deflect the diaphragm 235 upward to move the spool-type valve 202 to the uppermost of its three positions, in which position the lower O-ring seal 247 carried by the spool-type valve 202 would be disposed above the opening of the passageway 206 at the wall surface of the counterbore 200. If the spool-type valve 202 were thus moved to the uppermost of its three positions, a communication would be established via counterbore 200 between the passageway 206, which is connected via passageways 205 and 137, to the chamber 53 below the diaphragm 48 of the service valve device 25, and the branch passageway 238a, which is connected via passageways 238 and 56 to the chamber 44 above the diaphragm 48. Consequently, the pressures on opposite sides of the diaphragm 48 would become equalized which would cause an undesired direct release of the brakes on the car in a manner hereinafter described in detail.

In humping operations, it is often desirable that a trainman effect a release of the brakes. Since the chamber 237 is void of fluid under pressure, as a result of the venting of the brake pipe at the time the car was cut out of the train for humping, the trainman can effect a release of the brakes by exerting a pull on one of the push rods connected to the clevis 231 to effect movement of the spool type valve 210 to its upper position in which the peripheral annular groove 211 on this spool-type valve establishes a communication between the passageways 208 and 233 whereupon fluid under pressure flows from the emergency reservoir 4 to the chamber 234. Fluid under pressure thus supplied to the chamber 234 deflects the diaphragm 235 upward to move the spool-type valve 202 upward against the yielding resistance of a spring 249 interposed between the diaphragm follower plate 240 and the cover 236 to the uppermost of its three positions. In this uppermost position of the spool-type valve 202, the O-ring seal 247 carried thereon between the upper end of peripheral annular groove 204 and the lower end of the peripheral annular groove 203 is disposed above the opening of the branch passageway 233a at the wall surface of the counterbore 200 and below the choke 245, and the O-ring seal 247 carried adjacent the lower end of the spool-type valve 202 is disposed below the opening of the passageway 207 at the wall surface of the counterbore 200. Therefore, the peripheral annular groove 204 establishes a communication between the passageway 207 and the branch passageway 233a so that the chamber 234 will remain charged with fluid under pressure from the emergency reservoir 4 upon the trainman releasing the pull rod connected to the clevis 231 to render the spring 225 effective to move the spool-type valve 210 downward to the position in which it is shown in FIG. 1B of the drawings, in which position communication is closed between the passageways 208 and 233.

While the spool-type valve 202 occupies its uppermost position, the O-ring seal 247 carried thereon above the upper end of the peripheral annular groove 203 prevents leakage of fluid under pressure from the chamber 234 along the periphery of the spool-type valve 202 to the peripheral annular groove 203 and thence, via choke 245 and passageway and port 246, to atmosphere. Therefore, the spool-type valve 202 will remain in its uppermost position until the chamber 237 is subsequently charged from the brake pipe 1 to a pressure that is substantially equal to the emergency reservoir pressure present in the chamber 234, whereupon the spring 249 is rendered effective to deflect the diaphragm 235 downward and move the spool-type valve 202 from its uppermost position to its intermediate position in which it is shown in FIG. 1B.

Referring now to the emergency application portion 8 of the brake control valve device 5, it will be seen from FIG. 1A of the drawings that the continual quick service valve device 16 of the emergency application portion 8 comprises a valve stem 250 that is slidably mounted in a bore 251 formed in the casing section 38. Near the upper end of the valve stem 250 there is formed integral therewith a diaphragm follower 252 which is operatively connected to the center of a diaphragm 253 by means such as a diaphragm follower plate 254 and a nut 255 that has screw-threaded engagement with a threaded upper end of the valve stem 250. The outer periphery of the diaphragm 253 is clamped between the upper end of the casing section 38 and a cover member 256 which also constitutes a part of the quick service and emergency pilot valve device 17 hereinafter described in detail. The cover member 256 is secured to the casing section 38 by any suitable means (not shown).

The diaphragm 253 cooperates with the casing section 38 and the cover member 256 to form within the continual quick service valve device 16 and on opposite sides of the diaphragm two chambers 257 and 258. Disposed within the chamber 258 between the casing section 38 and the diaphragm follower 252 and in surrounding relation to the valve stem 250 is a spring 259 which is effective to normally bias the upper end of the valve stem 250 against the cover member 256, as shown in FIG. 1A of the drawings. The chamber 258 on the lower side of the diaphragm 253 is conected by a choke 260 and a passageway 261 extending through the casing section 38, the pipe bracket portion 5a, and the plug 15a, to the hereinbefore-mentioned quick service volume 15 which is also in the pipe bracket portion 5a.

Formed on the valve stem 250 intermediate the ends thereof are two spaced-apart peripheral annular grooves 262 and 263. Formed between the adjacent ends of the peripheral annular grooves 262 and 263 and adjacent each of the opposite ends of these grooves is a peripheral annular groove in each of which is carried an O-ring seal 264. These O-ring seals 264 prevent leakage of fluid under pressure from one to the other of the peripheral annular grooves 262 and 263 and from these grooves to the respective opposite ends of the bore 251.

The lower end of the valve stem 250 extends into a counterbore 265 coaxial with the bore 251. The lower end of the counterbore 265 opens into a chamber 266 and has formed thereon an annular valve seat 267. Contained in the chamber 266 is a flat disc-type valve 268 which is normally resiliently biased into contact with the annular valve seat 267 by a spring 269 interposed between the lower face of this flat disc valve 268 and a casing section 270 secured to the lower side of the casing section 38 by any suitable means (not shown) and closing the open end of the chamber 266. The chamber 266 is connected by a passageway 271 in the casing section 38 and a choke 272 carried by this casing section to a chamber 273 formed by the cooperative relationship between the casing section 38 and the casing section 270. A branch passageway 37a connects the chamber 273 to the passageway 37 in the casing section 38. Therefore, the chamber 266 is constantly supplied with fluid under pressure from the brake pipe 1 via the pipe and passageway 9 in the pipe bracket portion 5a, the brake pipe strainer 23, passageway 37, and branch passageway 37a in the casing section 38, chamber 273, choke 272, and passageway 271, also in the casing section 38.

The lower end of the valve stem 250 is provided with a counterbore 274, the upper end of which is open to the peripheral annular groove 262 by a passageway 275 in the valve stem 250. While the valve stem 250 occupies the position in which it is shown in FIG. 1A of the drawings, the peripheral annular groove 262 on the valve stem is in a position to establish communication between the passageway 275 in the valve stem and an exhaust passageway and port 276 in the casing section 38. Slidably mounted in the counterbore 274 is a hollow cylindrical exhaust valve member 277 having on its lower end a portion of reduced diameter that extends downward below the end of the valve stem 250 and into the counterbore 265. The upper end of the reduced portion of the cylindrical exhaust valve member 277 forms a shoulder that is biased against a snap ring 278 that is inserted in a groove formed in the counterbore 274 by a spring 279 that is interposed between the upper end of the hollow cylindrical exhaust valve member 277 and a shoulder formed by the upper end of the counterbore 274. A branch passageway 261a of the hereinbefore-mentioned passageway 261 in the casing section 38 has one end connected to the passageway 261 and the other end opening at the wall surface of the counterbore 265. Therefore, while the valve stem 250 occupies the position in which it is shown in FIG. 1A of the drawings, the quick service volume 15 is open via passageway 261, branch passageway 261a, counterbore 265, hollow cylindrical exhaust valve member 277, the counterbore 274, the passageway 275 in valve stem 250, the peripheral annular groove 262, and the exhaust passageway and port 276 to atmosphere.

Also, while the valve stem 250 occupies the position in which it is shown in FIG. 1A of the drawings, the peripheral annular groove 263 thereon is in a position to establish a communication between a passageway 280 leading to a volume chamber 281 formed in the casing section 38 and a passageway 282 which leads to the quick service and emergency pilot valve device 17 which will now be described in detail.

The casing section 38 of the emergency application portion 8 is provided with a bore 283 that is arranged in spaced-apart parallel relation to the bore 251. The casing section 38 is also provided with a counterbore 284 coaxial with the bore 283 and forming at the upper end thereof a shoulder 285. Press-fitted into the lower end of the bore 283 is a bushing 286 having near its lower end a collar 287 that rests against the shoulder 285. Extending vertically through the bushing 286 and coaxial with the bore 283 is a bore 288 that has formed at the upper end thereof an annular valve seat 289 that extends into a counterbore 290 that is coaxial with the bore 288. Slidably mounted in the bore 288 is a valve stem 291 having formed integral therewith at the lower end thereof a diaphragm follower 292. The diaphragm follower 292 is operatively connected to the center of a diaphragm 293 by means such as a diaphragm follower plate 294 that has formed thereon opposite the side adjacent the diaphragm 293 a central boss 295 having a smooth, flat surface on the bottom side thereof, and a plurality of cap screws 296, two of which appear in FIG. 1A of the drawings. These cap screws 296 pass through smooth bores in the diaphragm follower 292 and have screw-threaded engagement with coaxial threaded bores in the diaphragm follower plate 294. The outer periphery of the diaphragm 293 is clamped between the bottom face of the casing section 38 and the upper face of the casing section 270.

The diaphragm 293 cooperates with the casing section 38 and the casing section 270 to form within the quick service and emergency pilot valve device 17 and on opposite sides of the diaphragm a chamber 297 into which opens the passageway 37 in the casing section 38 and a chamber 298. The chambers 297 and 298 are connected by a passageway 299 that extends through the casing sections 38 and 270. The passageway 299 has therein a choke 300 carried by the casing section 38, the purpose of the choke being to control the rate of charging the chamber 298 from the chamber 297 which is supplied with fluid under pressure from the brake pipe 1 via the pipe and passageway 9 in the pipe bracket portion 6, the brake pipe strainer 23, and the passageway 37 in the casing section 38.

The casing section 38 is provided with a passageway 301, one end of which opens through a choke 302 carried by the casing section 38 to the chamber 297 and the opposite end of which opens at the wall surface of the counterbore 290 in the bushing 286. Coaxial with the counterbore 290 is a second counterbore 303 in the bushing 286 in which counterbore 303 is disposed a second bushing 304 that is retained against a shoulder formed by the lower end of the counterbore 303 by a snap ring 305 that is inserted in a groove formed in the wall of the counterbore 303. The bushings 286 and 303 together with the wall surface of the counterbore 290 cooperate to form a chamber 306 in which is disposed a flat disc-type valve 307. A spring 308 is interposed between the upper side of the flat disc-type valve 307 and the bushing 304 to yieldingly bias the flat disc valve 307 into contact with the annular valve seat 289 formed at the upper end of the bore 288 in the bushing 286.

Opening at the wall surface of the bore 288 a short distance below the annular valve seat 289 is one end of a passageway 309 that extends through the bushing 286, the casing section 38, and the cover member 256 to the chamber 257 above the diaphragm 253 of the continual quick service valve device 16. Intermediate its ends the valve stem 291 is provided with a peripheral annular groove 310 which is open by a passageway 311 in the valve stem 291 to the upper end thereof. While the valve stem 291 occupies the position in which it is shown in FIG. 1A, the chamber 257 above the diaphragm 253 of the continual quick service valve device 16 is open to atmosphere via the passageway 309, the upper end of the bore 288, the passageway 311 in the valve stem 291, the peripheral annular groove 310 formed on the periphery of the valve stem 291, and an atmospheric passageway and port 312 extending through the bushing 286 and the casing section 38.

As viewed in FIG. 1A of the drawings, the valve stem 291 is provided adjacent the upper and lower ends respectively of the peripheral annular groove 311 with a peripheral annular groove in each of which is inserted an O-ring seal 313, each of which is effective to prevent the leakage of fluid under pressure between the outer periphery of the stem 291 and the wall of the bore 288.

The cover member 256 is provided with a boss 314 that is arranged to extend into the upper end of the bore 283 in the casing section 38 so that the lower end of this boss is disposed somewhat above the end of the bushing 286. The boss 314 is provided with a bore 315 and a counterbore 316 that are coaxial with the bore 283. Disposed in the bore 315 is a bushing 317 that has formed on its upper end a collar 318 that rests against a shoulder 319 formed at the lower end of the counterbore 316. The bushing 317 and the collar 318 are retained, respectively, in the bore 315 and the counterbore 316 by a cover 320 secured to the cover member 256 by any suitable means (not shown), there being a gasket 321 interposed between the cover 320 and the cover member 256 to provide a seal to prevent leakage of fluid under pressure between the cover member 256 and the cover 320.

The upper end of the bushing 286 and the lower end of the boss 314 cooperate to form a chamber 322 therebetween. The chamber 322 is connected by a bore 323 coaxial with the bore 288 and extending through the bushing 317 to a chamber 324 formed in the upper end of the bushing 317 by the cooperative relationship between the upper end of this bushing and the cover 320. Contained in the chamber 324 is a flat disc-type valve 325 which cooperates with an annular valve seat 326 that is formed on the bushing 317 so as to surround the upper end of the bore 323 and project into the chamber 324. Interposed between the upper face of the flat disc-type valve 325 and the cover 320 closing the open end of the chamber 324 is a spring 327 for resiliently seating the flat disc-type valve 325 on the annular valve seat 326 to close communication between the chamber 324 and the interior of the bore 323. Opening into the chamber 324 is one end of a passageway 328 that extends through the bushing 317, the cover member 256, casing section 38, and the pipe bracket portion 5a to the quick action chamber 14 therein. A branch passageway 328a is connected at one end to the passageway 328 in the casing section 38 and extends through the casing section 38 and the casing section 270 to chamber 298 below the diaphragm 293. Therefore, the fluid under pressure which is supplied from the brake pipe 1 to the chamber 297 and thence through the passageway 299 and choke 300 to the chamber 298, flows therefrom through the passageway 328a and passageway 328 to the quick action chamber 14 and to the chamber 324 so that the quick action chamber 14 and the chamber 324 are charged to the pressure normally carried in the brake pipe 1.

Slidably mounted in the bore 323 is a piston valve 329 that has a portion of reduced diameter at each end thereof. The portion of reduced diameter at the lower end of the piston valve 329, as viewed in FIG. 1A, extends through the chamber 322 and through a bore 330 in the bushing 304 into the chamber 306. As shown in FIG. 1A, this portion of reduced diameter at the lower end of piston valve 329 is disposed slightly above the flat disc-type valve 307. Also, as shown in FIG. 1A, the portion of reduced diameter at the upper end of the piston valve 329 has its upper end disposed just beneath the flat disc valve 325. In other words, the overall length of the piston valve 329 is slightly less than the distance between the bottom of flat disc-type valve 325 and the top of flat disc-type valve 307. The piston valve 329 carries in each of a pair of spaced-apart peripheral annular grooves thereon an O-ring seal 33 to prevent leakage of fluid under pressure along the spool valve 329 between the periphery thereof and the wall of bore 323. While the piston valve 329 occupies the position in which it is shown in FIG. 1A, the two O-ring seals 331 carried thereby are so disposed that one is above and the other below that end of a passageway 332 that opens at the wall surface of the bore 323. The passageway 332 extends through the bushing 317, the boss 314, the cover member 256, the casing sections 38 and 270 to the vent valve device 18 hereinafter described in detail. As can be seen from FIG. 1A, a passageway 333 extends from the chamber 322 through the boss 314 and the bushing 317 and opens at the wall surface of the bore 323 just beneath the annular valve seat 326 near the upper end of the bore 323. Also opening at the wall surface of bore 323, but at a distance further downward from the annular valve seat 326 than the opening of the passageway 333 into the bore 323, is one end of another passageway 334 which extends through the bushing 317 and boss 314 to one end of a choke 335 carried by the boss 314. The opposite end of the choke 335 is connected to atmosphere by an atmospheric passageway and port 336 in the casing section 38.

An O-ring seal 337 is carried respectively in each of five spaced-apart peripheral annular grooves formed in the bushing 317 to prevent leakage of fluid under pressure from chamber 322 along the bushing to the passageway 332 when a service brake application is made to prevent an undesired operation of the vent valve device 18, to prevent leakage of fluid under pressure to the passageway 334 when an emergency brake application is effected, and also to prevent leakage of fluid under pressure from the passageway 328 along the periphery of the bushing 317.

A spring 338 is disposed between the collar 287 and the diaphragm follower 292 in the chamber 297 and in surrounding relation to the valve stem 291 to bias this stem to the position in which it is shown in FIG. 1A, in which the upper end of the stem is disposed below the lower side of the flat disc valve 307 whereby the chamber 257 in the continual quick service valve device 16 may be open via passageway 309, the upper end of the bore 288, the passageway 311 in the valve stem 306, the peripheral annular groove 310 on the valve stem 291, and the passageway and port 312 to atmosphere.

The vent valve device 18 is preferably built up of two casing sections 339 and 340 secured together by any suitable means (not shown). The vent valve device 18 further comprises a diaphragm 341, the outer periphery of which is clamped between the upper end of the casing section 339 and the casing section 270 to which the casing section 339 is secured by any suitable means (not shown). The diaphragm 341 is of the annular type and has its inner edges clamped between two diaphragm follower plates 342 and 343 by a nut 344 that has screw-threaded engagement with the threaded portion of a stem that extends upward from the upper side of the diaphragm follower plate 343 and through a bore 345 in the diaphragm follower plate 343. The diaphragm 341 cooperates with the casing sections 270 and 339 to form within the vent valve device 18 and on opposite sides of the diaphragm two chambers 346 and 347. The hereinbefore-mentioned passageway 332 in the casing section 38 extends through the casing section 270 and opens into the chamber 346 above the diaphragm 341. A passageway 348 that extends through the casing sections 270 and 339 is open at one end into the passageway 332 and opens at its opposite end through a choke 349 carried by the casing section 339 into the chamber 347 below the diaphragm 341. The chamber 347 is connected by a bore 350 in the casing section 339 to a chamber 351 therein which is constantly open to the atmosphere by a large capacity passageway 352. The chamber 351 is open through an annular valve seat 353 to a chamber 354 also in the casing section 339. The chamber 354 is connected by a passageway 355 that extends through the casing sections 339, 270 and 38 and the pipe bracket portion 5a to the passageway 9 in the pipe bracket portion 5a, which passageway 9 is connected by the corresponding pipe to the brake pipe 1. Therefore, the chamber 354 is constantly charged to the same pressure as is normally carried in the brake pipe 1.

The chamber 354 in the casing section 339 is open to the lower end of this casing section by a counterbore 356 that is coaxial with the bore 350. Slidably mounted in the counterbore 356 is a cup-shaped vent valve piston 357 that is yieldingly biased into seating contact with the annular valve seat 353 by a spring 358 that is interposed between the vent valve piston 357 and the casing section 340. While the vent valve piston 347 is thus biased into seating contact with the annular valve seat 353, communication is closed between the chamber 354 and atmosphere via the chamber 351 and the large capacity passageway 352. The vent valve piston 357 may be moved away from the annular valve seat 353 against the yielding resistance of the spring 358 by a stem 359 that is integral with and extends downward from the lower side of the diaphragm follower plate 343 through the bore 350 into the chamber 351 when fluid under pressure is supplied to the chamber 346 in a manner hereinafter described to effect downward deflection of the diaphragm 341.

The high pressure valve device 19 comprises, in addition to the casing section 340 which is also a part of the vent valve device 18, a plunger 360 that is slidably mounted within a bore 361 that is coaxial with the counterbore 356 and extends from the lower end of this counterbore through the casing section 340 to a chamber 362 therein. The chamber 362 is connected to the auxiliary reservoir 3 by a passageway 363 that extends through the casing sections 340, 339, 270 and 38, and thence through the pipe bracket portion 5a to the passageway 10 therein which is connected by the pipe bearing the same numeral to the auxiliary reservoir 3. Therefore, the chamber 362 is always charged to the same pressure as is present in the auxiliary reservoir 3. The chamber 362 is open through an annular valve seat 364 to a chamber 365 formed by the cooperative relationship between the casing section 340 and a cover 366. Contained in the chamber 365 is a flat disc-type valve 367 which cooperates with the annular valve seat 364 to control communication between the chambers 362 and 365. Interposed between the lower face of the flat disc-type valve 367 and the cover 366 is a spring 368 for resiliently seating the flat disc-type valve 367 on the annular valve seat 364 to normally close communication between the chamber 365 and the chamber 362. The chamber 365 is connected by a passageway 369 that extends through the casing sections 340, 339, 270 and 38, and through the pipe bracket portions 5a to the passageway 12 therein, which passageway is connected by a pipe bearing the same numeral to the emergency reservoir 4. Therefore, while the flat disc-type valve 367 is seated against the annular valve seat 364 by the spring 368, the chamber 365 is charged to the pressure carried in the emergency reservoir 4.

It will be noted from FIG. 1A that the vent valve piston 357 is in the form of an inverted cup having therein a sleeve-like portion 370 that is formed integrally therewith. Mounted over the sleeve-like portion 370 is a cup-like, high pressure piston 371. A spring 372 is interposed between the vent valve piston 357 and the cup-like, high pressure piston 371 as shown in FIG. 1A. It will be noted that no O-ring seals are carried by the vent valve piston 357. Consequently, brake pipe pressure that is present in the chamber 354 will flow along the outer periphery of the vent valve piston 357 to the lower end of the counterbore 356 where it will be effective on the cup-like, high pressure piston 371 to compress the spring 372 until the cup-like, high pressure piston is moved to the position in which it is shown in FIG. 1A in which the bottom thereof contacts the lower end of the sleeve-like portion 370. When fluid under pressure is vented to atmosphere by unseating of the vent valve piston 357 from the annular valve seat 353, the fluid under pressure acting on the cup-like, high pressure piston 371 will be reduced, whereupon the spring 372 will expand and move the cup-like, high pressure piston 371 into contact with the upper end of the plunger 360 and thereafter move the plunger downward to unseat the flat disc-type valve 367 from the annular valve seat 364 to connect the emergency reservoir 4 to the auxiliary reservoir 3 to effect an emergency application of the brakes in a manner hereinafter described in detail.

In order to prevent leakage of fluid under pressure from the chamber 362 to the counterbore 356 and vice versa, an O-ring seal 373 is carried in surrounding relation to the plunger 360 and in a peripheral annular groove formed in the wall of the bore 361.

The spill-over check valve device 20 comprises a flat disc-type valve 374 that is disposed in a chamber 375 formed by the cooperative relationship between the casing section 270 and a cover 376 secured to the bottom thereof by any suitable means (not shown). A spring 377 is interposed between the flat disc-type check valve 374 and the cover 376 in the chamber 375 into which opens a passageway 378 that is connected to the passageway 369 in the casing section 270. The spring 377 is effective to normally bias the flat disc-type check valve 374 into contact with an annular valve seat 379 to close communication between the chamber 375 and a chamber 380 formed in the casing section 270. Chamber 380 is connected to the hereinbefore-mentioned chamber 298 through a choke 381 and a passageway 382 in the casing section 270. Since the chamber 298 is connected by the passageway 328a and passageway 328 to the quick action chamber 14, the chamber 380 is always charged to quick action chamber pressure. Therefore, if at any time the pressure in the quick action chamber 14 exceeds the pressure in the emergency reservoir 4, the higher quick action chamber pressure present in the chamber 380 will unseat the flat disc-type check valve 374 from the annular valve seat 379 whereupon fluid under pressure will flow from the quick action chamber 14 to the emergency reservoir 4 until these pressures are substantially equalized.

The back-dump valve device 21 comprises a flat disc-type valve 383 that is disposed in a chamber 384 formed by the cooperative relationship between the casing section 270 and the cover 376. The chamber 384 is connected to the chamber 375 by a passageway 385 in the casing section 270 so that the chamber 384 is constantly charged with fluid under pressure at the same pressure existing in the emergency reservoir 4. The hereinbefore-mentioned chamber 298 is connected to the chamber 384 by a bore 386 and a coaxial counterbore 387 extending through the casing section 270. Formed at the lower end of the counterbore 387 and extending into the chamber 384 is an annular valve seat 388. A spring 389 is disposed between the flat disc-type valve 383 and the cover 376 in the chamber 384 and is effective to normally bias the flat disc-type valve 383 into seating contact with the annular valve seat 388 to close communication between the chamber 384 and the interior of the counterbore 387.

Slidably mounted in the bore 386 is a piston valve 390 that has at its lower end a collar 391 from which extends in the direction of the flat disc valve 383 a stem 392. The upper end of the piston valve 390 extends into the chamber 298. The collar 391 is normally biased against a shoulder 393 formed at the upper end of the counterbore 387 by a spring 394 that is disposed between the casing section 270 and a spring seat 395 that is secured to the piston valve 390 by a snap ring 396 that is inserted in a groove formed in the outer periphery of that portion of the piston valve 390 that extends into the chamber 298. It will be seen from FIG. 1A that the spring seat 395 is in the form of a saucer having a bottom 397 in which is provided an aperture through which the piston valve 390 extends. As can be seen from FIG. 1A, the spring 394 normally biases the saucer-like spring seat 395 to a position in which the bottom 397 thereof is in contact with the lower side of the snap ring 396 through which the force of the spring is transmitted to the piston valve 390 to move it upward to the position in which it is shown in FIG. 1A in which the collar 391 thereon is in contact with the shoulder 393. As shown in FIG. 1A, the piston valve 390 is provided with a passageway 398 which extends downward from the upper end thereof and is open to a peripheral annular groove 399 formed on the piston valve 390. While the piston valve 390 occupies the position in which it is biased into FIG. 1A in which the collar 391 thereon is biased into contact with the shoulder 393 by the spring 394, the peripheral annular groove 399 establishes a communication between the passageway 398 in the piston valve 390 and one end of a passageway 400 in the casing section 270. The opposite end of the passageway 400 registers with the passageway 282 in the casing section 38. Consequently, when the fluid under pressure that is supplied to the chamber 298 from the chamber 297 through the choke 300 and passageway 299 is substantially equal to the pressure in the chamber 297, the central boss 295 formed on the diaphragm follower plate 294 will be disposed slightly above the upper end of the piston valve 390 whereupon fluid under pressure will flow unrestricted from the chamber 298 through the passageway 398, peripheral annular groove 399, passageway 400, passageway 282, peripheral annular groove 263 on the valve stem 250, and thence through the passageway 280 to the volume chamber 281 so that this chamber is charged to the same pressure as is present in the quick action chamber 14.

An O-ring seal 401 is carried in each of a pair of peripheral annular grooves formed in the piston valve 390 adjacent the respective opposite ends of the peripheral annular groove 399 to prevent leakage of fluid under pressure from this peripheral annular groove along the periphery of the piston valve 390 to the chamber 298 and to the interior of the counterbore 387.

The back-flow check valve device 22 comprises a flat disc-type valve 402 that is disposed in a chamber 403 that is formed by the cooperative relationship between the casing section 270 and the cover 376. A spring 404 is disposed between the lower side of the flat disc-type valve 402 and the cover 376 in the chamber 403 into which opens a passageway 405 that extends through the casing section 270 to the chamber 273 which, as has been hereinbefore explained, is supplied with fluid under pressure from the brake pipe 1. Therefore, fluid under pressure flows from the chamber 273 via the passageway 405 to the chamber 403 so that the pressure therein is always the same as that present in the brake pipe 1. The spring 404 is effective to bias the flat disc-type valve 402 into contact with an annular valve seat 406 to close communication between the chamber 403 and a chamber 407 formed in the casing section 270. A passageway 408 in the casing section 270 opens at one end into the chamber 407 and at the other end at the wall surface of the counterbore 387.

The brake pipe strainer 23 may be the same as that described in Patent No. 2,014,895, issued September 17, 1935, to Ellis E. Hewitt and assigned to the assignee of the present application. Since reference may be had to the Hewitt patent for a detailed description of the brake pipe strainer 23, it is not deemed necessary to give a detailed description herein of this brake pipe strainer.

The brake valve device 6 is substantially similar in construction to the brake valve device shown and described in Patent No. 2,958,561, issued November 1, 1960, to Harry C. May, and assigned to the assignee of the present application, except for modification as hereinafter described. The brake valve device 6 comprises a sectionalized casing 409 containing a relay valve device 410, a self-lapping control valve device 411, a brake pipe cut-off valve device 412, a vent valve device 413, an emergency valve device 414, a suppression valve device 415, an equalizing reservoir cut-off valve device 416, and a manually positionable selector valve device 417 for selectively conditioning the brake valve device 6 for effecting either direct release operation of the brake control valve devices on each car in a train of cars, if each car is provided with a direct release type brake control valve device, or a graduated application and graduated release operation of the brake control valve devices on each car if each car is provided with a brake control valve device 5 converted for graduated release operation in a manner hereinafter described in detail, for cutting out control of brake pipe pressure by the brake valve device 6 for multiple unit or trailing (pusher) unit operation, or for conducting a brake pipe leakage test. The self-lapping control valve device 411, the brake pipe cut-off valve device 412, the vent valve device 413, the emergency valve device 414, the suppression valve device 415, the equalizing reservoir cut-off valve device 416, and the manually positionable selector valve device 417 may be identical in construction to the corresponding devices shown in the above-mentioned Patent No. 2,958,561 and, therefore, will not be described in detail herein. Secured to the sectionalized casing 409 by any suitable means (not shown) is an independent brake valve device 418, only a portion of which is shown in the drawings, for permitting the fluid pressure brakes on the locomotive to be applied and released independently of those on the connected cars.

The relay valve device 410 comprises a diaphragm-type piston 419, which is subject opposingly to fluid pressures in a chamber 420 and a chamber 421 and is adapted through the medium of a coaxially arranged operating stem 422 to effect unseating of a disc-shaped exhaust valve 423 carried by an annular valve member 424 or to effect unseating of a disc-shaped supply valve 425 carried by a coaxially arranged annular valve member 426, according to whether the pressure in chamber 420 is less than or exceeds the pressure in chamber 421. The operating stem 422 is coaxially connected to the chamber 421 side of the diaphragm-type piston 419 and projects centrally through the annular valve member 424 and through a chamber 427 and is adapted to abut the left-hand face of the disc-shaped supply valve 425. Helical springs 428 and 429 respectively urge the valve members 424 and 426 towards each other for normally concurrently seating the disc-shaped exhaust valve 423 and the disc-shaped supply valve 425. The disc-shaped exhaust valve 423 controls communication between the chamber 427 and a chamber 430 which is open to atmosphere via an exhaust choke 431, whereas supply valve 425 controls communication between the chamber 427 and a chamber 432 that is always open via a passageway and corresponding pipe 433 to a main reservoir 434.

The chamber 427 is connected to a chamber 435 via a choke 436 press-fitted into a bore connecting these chambers. The size of the choke 436 is such as to provide for the usual normal rate of brake pipe charging. The chamber 435 is connected via a choke 437 and a passageway 438 to a chamber 439 in the brake pipe cut-off valve device 412. As is fully described in the herein before-mentioned Patent No. 2,958,561, the brake pipe cut-off valve device 412 comprises a valve 440 that controls communication from the chamber 439 to a chamber 441 which is connected via a passageway 442 to the brake pipe 1.

According to the present invention, a cam shaft 443 that is rotatably mounted in the casing section 409 and has secured to its upper end a manually movable brake valve handle 444, carries thereon, in addition to the four spaced-apart cams shown and described in the above-mentioned patent, a fifth cam 445 for controlling the operation of a valve device 446 that is operable to establish an unrestricted by-pass communication around the choke 437 in a manner now to be described in detail.

The valve device 446 comprises a flat disc-type valve 447 that is biased by a spring 448 in the direction of an annular valve seat 449. The flat disc-type valve 447 is held unseated by the cam 445 and a pusher stem 450 while the brake valve handle 444 occupies its running (i. e., release) position. Whenever the brake valve handle 444 is moved out of its running position, the cam 445 allows the spring 448 to move the flat disc-type valve 447 into contact with the annular valve seat 449 to close communication between a chamber 451 and a chamber 452. Thus, while the brake valve handle 444 occupies its running position, the flat disc-type check valve 447 is held open to provide for the usual normal rate of brake pipe charging since the chamber 451 is connected to the passageway 438 by a passageway 453 and the chamber 452 is connected by a passageway 454 to the chamber 435 thereby effecting a by-pass communication around the choke 437. When the brake valve handle 444 is moved out of its running position, the cam 445 renders the spring 448 effective to seat the flat disc-type valve 447 on the annular valve seat 449 so that subsequently, while the brake valve handle 444 transverses its application zone in the direction of its running position and prior to reaching this position, a less than normal or a restricted rate of brake pipe charging is effected by the serially related chokes 436 and 437.

The chamber 420 at the left-hand face of the diaphragm-type piston 419 is connected by a passageway 455 and corresponding pipe to an equalizing reservoir 456 that is charged with fluid under pressure by operation of the self-lapping control valve device 411 under the control of the equalizing reservoir cut-off valve device 416 and a brake application valve device (not shown) but which may be substantially the same in construction and operation as the brake application valve device shown and described in the above-mentioned patent.

The operation of the equalizing reservoir cut-off valve device 416 and the manually positionable selector valve device 417 are the same as is described for these corresponding devices in the hereinbefore-mentioned Patent No. 2,958,561. Therefore, a detailed description of the operation of these valve devices is not deemed necessary. Briefly, however, when a locomotive provided with the brake valve device 6 is used to haul a train, some of the cars of which are provided with the familiar AB direct release-type brake control valve device and the remaining cars provided with the hereinbefore-described brake control valve device 5, in order to provide for a direct release of the brakes on all cars in the train, it is necessary that the manually positionable selector valve device 417 be set in one position, which is referred to as freight position in the above-mentioned patent, to cause the equalizing reservoir cut-off valve device 416 to be held open only in the running position of the brake valve handle 444, as is described in detail in this patent. When the manually positionable selector valve device 417 is thus so set, the engineer on the locomotive, by proper manipulation of the brake valve handle 444, can effect a brake application on all cars in the train and then subsequently can effect only a direct release of the brakes on all these cars.

When each car in a train is provided with the novel brake control valve device 5 converted for optional graduated application and graduated release operation, or accelerated direct release operation, as will be hereinafter-described in detail, it is necessary that the manually positionable selector valve device 417 be set in another position, which is referred to in the hereinbefore-mentioned patent as passenger positions, in order that the engineer, at his discretion, may manipulate the brake valve device 6 to cause either a graduated application and subsequently a graduated release operation or, subsequent to a graduated application, an accelerated direct release operation of the converted brake control valve device 5 on each of the cars in the train. As explained in detail in the hereinbefore-mentioned Patent No. 2,958,561, when the manually positionable selector valve device 417 is moved to the position referred to in this patent as passenger position, the equalizing reservoir cut-off valve device 416 is held open in all positions of the brake valve handle 444. Therefore, upon movement of the handle 444 from the running position into the service zone toward full service position, the engineer can cause a graduated application of the brakes in steps, and also a full service application of the brakes upon moving the brake valve handle to its full service position. Subsequently, upon movement of the handle 444 reversely toward running position, the engineer can effect operation of the converted brake control valve device 5 on each of the cars in the train to cause a graduated release of the brakes on all of the cars, or, if the engineer desires to effect an accelerated direct release of the brakes on all cars of the train, he may move the brake valve handle 444 immediately to running position whereupon, as will hereinafter be described in detail, an accelerated direct release of the brakes on all cars in the train occurs.

Except as pointed out above, the brake valve device 6 is substantially similar in construction and operation to the brake valve device shown and described in detail in the hereinbefore-mentioned patent No. 2,958,561.

OPERATION

(A) *Direct release operation*

With the direct release valve mechanism 28 secured to the bolting face 27 provided on the lower end of casing section 26, as shown in FIG. 1C of the drawings, the brake control valve device 5 is conditioned for direct release operation.

With the manually positionable selector valve device 417 of the brake valve device 6 located on a locomotive set in that one of its positions referred to in the hereinbefore-mentioned Patent No. 2,958,561 as freight position, this brake valve device is conditioned to so control the brakes on the cars in a train hauled by the locomotive, when some cars are equiped with a brake control valve device 5 conditioned for direct release operation and the remaining cars are equipped with the well-known AB brake control valve device, as to provide for only a direct release of the brakes on all the cars.

*Initial charging*

Assume initially that all the passageways and chambers in the brake control valve device 5 shown in FIGS. 1A, 1B and 1C of the drawings are devoid of fluid under pressure, that the various parts of the brake control valve device 5 are in the respective positions in which they are shown in the drawings, that one or more of the cars in a train are equipped with the brake control valve device 5, and that the remaining cars are equipped with the well-known AB control valve device which is of the direct release type, that the main reservoir 434 is charged with fluid under pressure to a chosen pressure, which, for example, may be one hundred and forty pounds per square inch, and that it is desired to initially charge the brake equipment on all the cars in the train.

To effect initial charging of the brake equipment on all the cars in the train, the engineer will move the handle 444 of the brake valve device 6 to its running (i.e., release) position to cause the cam 445 carried by the cam shaft 443 to move, through the intermediary of the pusher stem 450, the flat disc-type valve 447 away from the annular valve seat 449 against the yielding resistance of the spring 448 and to the unseated position in which it is sohwn in FIG. 1 of the drawings.

Upon the engineer effecting movement of the handle 444 to its running (i.e., release) position, a cam 457, also carried by the cam shaft 443, is moved to a position in which it is effective to cause operation of the self-lapping control valve device 411 in the manner described in detail in the hereinbefore-mentioned Patent No. 2,958,561 to supply fluid under pressure from the main reservoir 434 through the equalizing reservoir cut-off valve device 416 and the hereinbefore-mentioned brake application valve device (not shown) to the chamber 420 in the relay valve device 410. The fluid under pressure thus supplied to the chamber 420 causes operation of the relay valve device 410 in the manner described in the aforesaid Patent No. 2,958,561 to supply fluid under pressure from the main reservoir 434 to the chamber 427. The fluid under pressure thus supplied to the chamber 427 flows therefrom along the periphery of the operating stem 422 to the chamber 421 and also through the choke 436 to the chamber 435. Since the flat disc-type valve 447 is now unseated, as explained above, fluid under pressure will rapidly flow from the chamber 435 via passageway 454, chambers 452 and 451, and passageways 453 and 438 to the chamber 439 in the brake pipe cut-off valve device 412 in bypass of the choke 437 at the usual normal rate for effecting charging of the train brake pipe. The fluid under pressure thus supplied to the chamber 439 will effect unseating of the valve 440 whereupon fluid under pressure will flow from the chamber 439 to the chamber 441 and thence through the passageway 442 in the sectionalized casing 409 to the train brake pipe 1 that extends from car to car through the train. On each car in the train that is equipped with a brake control valve device 5, fluid under pressure flows from the brake pipe 1 to the pipe and passageway 9, which passageway leads through the pipe brake portion 5a of the respective brake control valve device 5 to the brake pipe strainer 23. The fluid under pressure, after passing through the brake pipe strainer 23 to remove any contaminants therein, flows to the passageway 37 in the casing section 38. One branch of the passageway 37 registers with the passageway 36 in the pipe bracket portion 5a, which passageway 36 is connected through the choke 35 to the passageway 34 in the casing section 26. Fluid under pressure thus supplied from the brake pipe 1 to the passageway 34 is effective on the lower side of the flat disc-type valve 31 of the auxiliary reservoir charging check valve device 30 to unseat the flat disc-type valve 31 from its annular seat 33 against the yielding resistance of the biasing spring 32. When the flat disc-type valve 31 is thus unseated from the annular seat 33, fluid under pressure will flow from the passageway 34 to outlet chamber 39 and thence at an unrestricted rate through the passageway 40, chamber 41 and passageway 42 in the casing section 26 to the passageway 10 in the pipe bracket portion 5a, which passageway is connected by the corresponding pipe to the auxiliary reservoir 3. Fluid under pressure is thus supplied from the main reservoir 434 to the chamber 421 in the relay valve device 410 of the brake valve device 6 and via the brake pipe 1 and brake control valve device on each car in the train to the corresponding auxiliary reservoir until the pressure therein is substantially the same as the normal full charged pressure carried in the brake pipe 1, which, for example, may be seventy pounds per square inch.

The fluid under pressure supplied to the outlet chamber 39 also flows through the passageway 83 in the casing section 62 to the chamber 82 above the piston 80. At the same time, fluid under pressure flows from the chamber 41 past the annular valve seat 91, through the bore 90 to the chamber 87 and thence through the passageway 88 to the chamber 71 below the piston 80 so that the pressures acting on the opposite sides of this piston are equal. Therefore, the flat disc-type valve 84 is only biased into contact with the annular valve seat 73 by the force of the comparatively light spring 89 and the fluid under pressure acting on the upper side of the flat disc-type valve 84 over an area equal to the area of the annular valve seat 73.

Fluid under pressure supplied from the brake pipe 1 to the passageway 36 in the pipe bracket portion 5a will also flow to the passageway 56 in the casing section 26, which passageway 56 opens into the chamber 44 above the diaphragm 48 so the pressure in the chamber 44 is increased to the normal value of the pressure carried in the brake pipe 1 when fully charged.

Fluid under pressure supplied to the passageway 56 also flows through the branch passageway 56a and the passageway 238 in the casing section 199 of the manually operated brake cylinder release valve device 29 to the chamber 237 above the diaphragm 235, and through the branch passageway 238a to the bottom of the counterbore 200. The strength of spring 243 is such that diaphragm 235 and the spool-type valve 202 connected thereto remain in the position in which they are shown in FIG. 1B until the pressure in the chamber 237 exceeds thirty pounds per square inch at which time diaphragm 235 and spool-type valve 202 are moved downward to a position in which the peripheral annular groove 204 closes communication between passageway 208 and passageway 208 to prevent a malicious person from effecting a direct release of the brakes by momentarily exerting a pull on one of the rods secured to the clevis 231 so long as brake pipe pressure exceeds thirty pounds per square inch.

The fluid under pressure that is supplied from the brake pipe 1 to the passageway 36 in the pipe bracket portion 5a also flows through the choke 122, the passageway 119 in the casing section 26, the peripheral annular groove 108 on the inshot valve stem 97 while this stem occupies the position shown in FIG. 1B, and hence through the passageways 121 and 136 in the casing section 26, peripheral annular groove 135 on interlock valve stem 128, to passageways 137 in the casing section 26. Fluid under pressure thus supplied to the passageway 137 flows therefrom to the chamber 53 below diaphragm 48 of the service valve device 25. Fluid under pressure also flows from the passageway 137 via passageway 205 in the casing section 26, passageway 206 in the casing section 199, peripheral annular groove 204 on the periphery of the spool-type valve 202, passageway 207 also in the casing section 199, passageway 209 in the casing section 26, and passageway 12 in the pipe bracket portion 5a, which passageway 12 is connected by the pipe bearing the same numeral to the emergency reservoir 4. Thus while the inshot valve stem 97 and the interlock valve stem 128 remain in the position in which they are shown in FIGS. 1B and 1C of the drawings, fluid under pressure flows from the brake pipe 1 to the emergency reservoir 4 to effect the charging thereof, at a rate controlled by the size of the choke 122, until the pressure therein is the same as the normal full charged pressure carried in the brake pipe 1.

Referring to FIG. 1B of the drawings, it will be seen that the passageway 207 in the casing section 199 is connected by the passageway 218 in this casing section to the chamber 217 above the flat disc-type valve 220. Consequently, the chamber 217 is simultaneously charged with the emergency reservoir 4.

Since the emergency reservoir 4 and chamber 53 below the diaphragm 48 are charged from the brake pipe 1 via the peripheral annular groove on inshot valve stem 97 and interlock valve stem 128 while they occupy the respective positions in which they are shown in FIGS. 1B and 1C of the drawings, and the chamber 44 is simultaneously supplied with fluid under pressure from the brake pipe 1 via the passageway 56, it will be understood that the pressures in the chambers 44 and 53 increase concurrently so that the diaphragm 48 and valve stem 46 of the service valve device 25 remain in the release position shown in FIG. 1C during initial charging of the equipment.

Fluid under pressure that is supplied from the brake pipe 1 to the passageway 56 in the casing section 26 of the service valve device 25 also flows via passageway 149 that extends through the casing sections 26 and 140 and the cover 144 to the chamber 147 above the diaphragm 145 and from the chamber 147 via port 153 in diaphragm follower plate 152 to the chamber 155 so that these chambers are simultaneously charged from the brake pipe 1 to the normal pressure carried therein.

Furthermore, fluid under pressure supplied from the brake pipe 1 via choke 122 to the passageway 119, in the manner hereinbefore explained, also flows via the peripheral annular groove 108 on the inshot valve stem 97 in all positions of this stem, the passageway 120 in the casing section 26 of the service valve device 25, and the passageway 196 in the casing sections 140, 141 and 142 of the direct release valve mechanism 28 to the interior of the bore 184 in the casing section 142.

As fluid under pressure is supplied from the brake pipe 1 to the chamber 147, as explained above, the resulting increase in pressure in this chamber is immediately effective to deflect the diaphragm 145 downward against the yielding resistance of the spring 162. Since the center of the diaphragm 145 is clamped between the diaphragm follower plate 152 and diaphragm follower 150 which is integral with the cylindrical member 151 upon which the annular valve seat 157 is formed, downward deflection of the diaphragm 145 is effective to move the cylindrical member 151 and annular valve seat 157 downward so that the annular valve seat 157 is moved away from the disc-type valve 156 which rests on the annular valve seat 173 which is stationary at this time. Upon movement of the annular valve seat 157 downward away from the disc-type valve 156, fluid under pressure supplied from the brake pipe 1 to the chamber 155 in the manner hereinbefore explained will flow from the chamber 155 past the annular valve seat 157 and through the bore 158 to the upper end of the counterbore 160 and thence via slot 176 in the periphery of piston-like member 172 to the chamber 165 above the diaphragm 166.

Fluid under pressure thus supplied to the chamber 165 is effective to deflect the diaphragm 166 downward against the yielding resistance of the spring 194 to thereby move the diaphragm follower 167 and the piston-like member 172 integral therewith downward. The friction between the five O-ring seals 178 carried by the valve operating cylinder 177 and the wall surface of the counterbore 175 in the piston-like member 172 is sufficient to insure that the valve operating cylinder 177 and valve operating stem 190 carried thereby are moved downward with the piston-like member 172 until the lower end of the valve operating stem 190 is brought into contact with the upper side of the flat disc-type valve 188. As the piston-like member 172, valve operating cylinder 177, and valve operating stem 190 carried thereby continue to move downward in response to the continuing supply of fluid under pressure to the chamber 165, the lower end of the valve operating stem 190 is effective to move the flat disc-type valve 188 against the yielding resistance of the spring 189 downward away from the annular valve seat 187 until the bottom of the enlarged head 193 is brought into contact with the bottom of the chamber 182 to prevent further downward movement of the valve operating cylinder 177. After the valve operating cylinder 177 is thus brought to a stop, fluid under pressure will continue to flow to the chamber 165 until the pressure therein is increased sufficiently to overcome the friction between the five O-ring seals 178 carried by the valve operating cylinder 177 and the wall surface of the counterbore 175 in the piston-like member 172 whereupon the diaphragm 166 will be deflected downward against the yielding resistance of the spring 194 to move the piston-like member 172 downward relative to the now stationary valve operating cylinder 177 until the annular valve seat 173 formed at the upper end of the piston-like member 172 has moved down far enough for the spring 159 to bias the disc-type valve 156 into contact with the annular valve seat 157 formed on the cylindrical member 151 to cut off flow of fluid under pressure from chamber 155 to chamber 165.

When the flat disc-type valve 188 is moved away from the annular valve seat 187, as explained above, a second emergency reservoir charging communication is established since fluid under pressure supplied from the brake pipe 1 to the interior of the bore 184 will now flow therefrom past the annular valve seat 187 to the chamber 185 and thence via the passageway 198 in the casing sections 142, 141 and 140 of the direct release valve mechanism 28, the passageways 121 and 136 in the casing section 26 of the service valve device 25, peripheral annular groove 135 on the interlock valve stem 128, passageways 137 and 205 in the casing section 26, passageway 206 in the casing section 199 of the brake cylinder release valve device 29, peripheral annular groove 204 on the spool-type valve 202, passageway 207 in the casing section 199, passageway 209 in the casing section 26, and passageway and corresponding pipe 12 to the emergency reservoir 4.

From the foregoing it is apparent that during initial charging of the brake equipment on a car provided with a brake control valve device 5, the fluid under pressure supplied from the brake pipe 1 at a rate controlled by the size of the choke 122 to the passageway 119 flows therefrom via peripheral annular groove 108 on inshot valve stem 97 and thence through two parallel communications to the emergency reservoir 4 and chamber 53 below diaphragm 48, one of which is via passageways 120, 196 and 198 to the passageway 136 and the other of which is via passageway 121 to the passageway 136, it being understood that fluid under pressure flows from the passageway 136 to the emergency reservoir 4 and the chamber 53 through the path traced in detail above, until the pressure in the emergency reservoir 4 and chamber 53 is increased to the normal full charged pressure carried in the brake pipe extending from car to car through the train.

From the foregoing it is apparent that the diaphragm 145 and the disc-type valve 156 operate as a pilot valve to control the supply of fluid under pressure from the brake pipe to the chamber 165 and that the fluid under pressure thus supplied to the chamber 165 is effective to unseat the flat disc-type valve 188 from the annular valve seat 187 so that fluid under pressure can flow from the brake pipe 1 through one of two charging communications to the emergency reservoir 4 and chamber 53 beneath diaphragm 48 prior to the pressure in the chamber 165 increasing to a value that is sufficient to overcome the friction between the five O-ring seals 178 carried by the valve operating cylinder 177 and the wall of the counterbore 175. Therefore, unseating of the flat disc-type valve 188 to establish the second charging communication between the brake pipe 1 and emergency reservoir 4 is entirely independent of the amount of friction between the O-ring seals 178 and the wall surface of the bore 175. Accordingly, it will be understood that the direct release valve mechanism 28 is very sensitive in its operation and, therefore, subsequent to a brake application, is responsive to a comparatively small increase in brake pipe pressure, for example two or three pounds per square inch, to effect deflection of the diaphragm 166 to unseat flat disc-type valve 188 from annular valve seat 187 to establish a communication through which fluid under pressure may flow from the emergency reservoir 4 to the brake pipe 1 and the chamber 44 above the diaphragm 48 to effect a direct release of the brakes in a manner hereinafter described in detail.

Referring to FIG. 1A of the drawings, it will be seen that a second branch of the passageway 37 in the casing section 38 of the emergency application portion 8 is connected to the chamber 297 in the quick service and emergency pilot valve device 17. As is also shown in FIG. 1A, the passageway 37 is connected by the branch passageway 37a to the chamber 273 which is connected via the choke 272 and passageway 271 to the chamber 266. Also, the chamber 273 is connected by the passageway 405 to the chamber 403 of the back-flow check valve device 22. Therefore, fluid under pressure that is supplied from the brake pipe 1 to the passageway 37 will flow therefrom to the chambers 297, 273, 266 and 403 to charge these chambers to the pressure normally carried in the brake pipe.

It will be further noted from FIG. 1A that the passageway 355 connects the passageway 9 in the pipe bracket portion 5a to the chamber 354 in the vent valve device 18 so that the pressure in the chamber 354 is always the same as the pressure in the brake pipe 1.

The fluid under pressure supplied from the brake pipe 1 to the chamber 297 flows therefrom through the passageway 299 and choke 300 to the chamber 298, and thence through the passageway 328a to the passageway 328 which at one end opens into the quick action chamber 14 and at the opposite end opens into the chamber 324. Consequently, as the chamber 297 is charged from the brake pipe 1, the quick action chamber 14 and the chamber 324 will be simultaneously charged at a rate controlled by the size of the choke 300.

Fluid under pressure supplied to the chamber 297 at the usual normal rate for effecting charging of the train brake pipe quickly establishes a differential of pressure of one and one-half pounds per square inch in the chamber 297 over the pressure in the chamber 298 to effect deflection of the diaphragm 293 downward and unseating of the flat disc-type valve 383 from annular valve seat 388 but this is without effect in initial charging since the pressure in the emergency reservoir 4 is not in excess of brake pipe pressure for at this time the emergency reservoir 4 is being charged from the train brake pipe.

It may also be noted from FIG. 1A that the chamber 298 is connected via passageway 382 and choke 381 to the chamber 380, and by way of the passageway 398 and peripheral annular groove 399 in the piston valve 390, passageway 400 in the casing section 270, passageway 282 in the casing section 38, peripheral annular groove 263 on the valve stem 250 of the continual quick service valve device 16, and passageway 280 to the volume chamber 281. Therefore, the chamber 380 and the volume chamber 281 are both charged to the same pressure as the quick action chamber 14 which, as hereinbefore noted, is charged to the pressure normally carried in the brake pipe 1.

FIG. 1A also shows that the fluid under pressure supplied from the brake pipe 1 to the chamber 297 flows therefrom through the choke 302 and passageway 301 in the casing section 38 to the chamber 306 above the flat disc-type valve 307 so that the chamber 306 is charged to the same pressure as is carried in the brake pipe 1.

Furthermore, it will be seen from FIG. 1A that the chamber 362 in the high pressure valve device 19, which is a part of the emergency application portion 8, is connected by the passageway 363 that extends through the casing sections 340, 339, 270 and 38, and the pipe bracket portion 5a to the passageway 10 therein. Since the passageway 10 is connected by the pipe bearing the same numeral to the auxiliary reservoir 3, it is therefore apparent that the chamber 362 will be charged to the same pressure as is carried in the auxiliary reservoir 3.

After the lapse of a period of time necessary to effect charging of the auxiliary reservoir 3 and emergency reservoir 4, and the various chambers in the brake control valve device 5 on those cars in the train that are provided with a brake control valve device 5 and also charging of the brake equipment on those cars provided with the well-known AB brake control valve device, the pressure of fluid in the brake pipe 1 will be stabilized by the setting of the self-lapping control valve device 411 at a normal value of such as, for example, seventy pounds per square inch preparatory to operation of the brake control valve devices on all the cars in the train to effect a brake application.

During such initial charging of the brake control valve devices 5, each corresponding brake cylinder device 2 will remain vented to the atmosphere via the corresponding pipe and passageway 11, passageways 65 and 66, chamber 63, passageway 67 in, and peripheral annular groove 64 on, the valve stem 46, passageway 68, brake cylinder exhaust choke 69, passageway and pipe 13, and retaining valve 70 which, it will be assumed, is in its non-retaining position. Since each chamber 100 is connected via passageway 101, choke 102 and branch passageway 11a to the corresponding passageway 11, each chamber 100 is also vented to atmosphere.

SERVICE APPLICATION OF THE BRAKES

In effecting a service application of the brakes, initiation of such application will be effected by the engineer moving the handle 444 of the brake valve device 6 from its running position into its application zone to a position corresponding to the degree of brake application desired, whereupon the relay valve device 410 operates in the manner fully described in detail in hereinbefore-mentioned patent No. 2,958,561 to effect a reduction in the pressure in the brake pipe 1 at a service rate. In the respective brake control valve devices 5 on those of the first several cars in the train that are provided with this type of brake control valve device, if some of the first several cars are provided with a brake control valve device 5 rather than an AB brake control valve device, such reduction in brake pipe pressure will occur in the chamber 297 of the quick service and emergency pilot valve device 17. This reduction in the pressure of fluid in the chamber 297 will cause the quick service and emergency pilot valve device 17 and the continual quick service valve device 16 to operate in the manner fully described in detail in the hereinbefore-mentioned Patent 3,160,446 issued December 8, 1964, to Glenn T. McClure, to supply fluid under pressure from the chamber 266 shown in FIG. 1A to the quick service volume 15 to effect a further reduction in brake pipe pressure, or in other words a quick service reduction, which occurs concurrently with the reduction being effected by the engineer's brake valve device 6 on the locomotive.

The fluid under pressure supplied to the quick service volume 15 in the manner described in detail in the above-mentioned copending application will flow from the quick service volume 15 through the passageway 261 and choke 260 to the chamber 258 to cause operation of the continual quick service valve device 16 and the quick service and emergency pilot valve device 17 in the manner described in the above-mentioned copending application. Furthermore, fluid under pressure will flow from the quick service volume 15 via passageway 115, peripheral annular groove 107 on the inshot valve stem 97, and passageway 116 extending through the casing sections 26 and 62 to the chamber 117 above diaphragm 123. Fluid under pressure thus supplied to the chamber 117 is effective to promptly deflect the diaphragm 123 downward against the yielding resistance of the spring 133 and move the interlock valve stem 128 downward from the position in which it is shown in FIG. 1C of the drawings until the diaphragm follower 127 abuts a stop 458 formed on the casing section 26. In this position of the interlock valve stem 128, the peripheral annular groove 135 thereon no longer establishes a communication from the passageway 136 to the passageway 137.

Furthermore, in this position of the interlock valve stem 128, the two O-ring seals 139 carried thereon are now disposed one above and the other below the opening of the passageway 137 at the wall surface of the bottomed bore 131. Therefore, these O-ring seals 139 insure that there can be no leakage of fluid under pressure from the passageway 137, which is connected to the emergency reservoir 4, to the passageway 136, which is connected to the brake pipe 1 in which the pressure is at this time being reduced, until the inshot valve stem 97 is moved upward from the position in which it is shown to a second position in which communication is closed between passageways 119 and 121.

It will be noted that the chamber 117 is open to atmosphere via choke 125. Therefore, the fluid under pressure supplied to the chamber 117 from the quick service volume 15 will be slowly vented to the atmosphere at a rate controlled by the size of the choke 125 so that, subsequent to upward movement of the inshot valve stem 97 from the position in which it is shown in FIG. 1B to its second position in which the peripheral annular groove 107 thereon no longer establishes a communication from the passageway 115 to the passageway 116, the spring 133 will be effective to return the diaphragm 123 and the interlock valve stem 128 to the position in which they are shown in FIG. 1C of the drawings. It should be understood, however, that the size of the choke 125 is such that sufficient pressure is built up in the chamber 117 to insure that the diaphragm 123 is deflected downward to move the interlock valve stem 128 promptly to its cutoff position and maintain it in this position until the inshot valve stem 97 is moved upward from the position in which it is shown in FIG. 1B in a manner hereinafter described to its second position in which communication is closed between passageway 119 and passageway 121 which is connected to passageway 136.

The reduction in brake pipe pressure effected by the engineer moving the handle 444 of the brake valve device 6 from its running position to a position in its application zone corresponding to the degree of brake application desired, and the reduction in brake pipe pressure effected by operation of the emergency pilot valve device 17 and the continual quick service valve device 16 occurs in the chambers 147 and 155 in the direct release valve mechanism 28. As the pressure is thus reduced in the chambers 147 and 155, the spring 162 is rendered effective to correspondingly move the diaphragm follower 150 and cylindrical member 151 in an upward direction. Since the annular valve seat 157 is formed integral with the cylindrical member 151, the disc-type valve 156 likewise will be moved upward with the annular valve seat 157 and away from the annular valve seat 173. Upon movement of the disc-type valve 156 upward from the annular valve seat 173, the chamber 165 above the diaphragm 166 is opened via longitudinal slot 176 on the periphery of piston-like member 172, counterbore 160, bore 158, past annular valve seat 173, bore 174 and counterbore 175 in piston-like member 172, passageway 183 in valve operating cylinder 177, chamber 170 and port 171 in casing section 141 to atmosphere.

As the pressure in the chamber 165 above the diaphragm 166 is vented to atmosphere, as just explained, the spring 194 is rendered effective to correspondingly deflect the diaphragm 166 upward to likewise move the diaphragm follower 167 and piston-like member 172 integral therewith in an upward direction. The amount of friction between the five O-ring seals 178 carried by the valve operating cylinder 177 and the wall surface of the counterbore 175 in the piston-like member 172 is sufficient to insure that the valve operating cylinder 177 and the valve operating stem 190 carried thereby are moved upward with the piston-like member 172 until the enlarged head 193 on the lower end of the valve operating cylinder 177 comes into contact with the shoulder 195. The distance that the valve operating cylinder 177 and valve operating stem 190 move upward prior to the enlarged head contacting the shoulder 195 is enough to move the lower end of the valve operating stem 190 to a position slightly above the annular valve seat 187. Therefore, as the valve operating stem 190 is moved upward to this position, the spring 189 is rendered effective to move the flat disc-type valve 188 upward into seating contact with annular valve seat 187. Seating of disc-type valve 188 on annular valve seat 187 closes communication between passageways 196 and 198 thereby insuring that fluid under pressure cannot flow from the emergency reservoir 4 to the brake pipe 1 subsequent to the return of interlock valve stem 128 by spring 133 to the position shown in FIG. 1C as the result of completely venting fluid under pressure from chamber 117 via choke 125 to atmosphere.

After the enlarged head 193 on the lower end of valve operating stem 177 has moved upward into contact with the shoulder 195, no further upward deflection of the diaphragm 166 by the spring 194 will occur as a result of venting fluid under pressure from the chamber 165 to atmosphere until the pressure in the chamber 165 has been reduced to a value such that the differential force resulting from the pressure in the chamber 165 and the spring 194 is great enough to overcome the friction between the O-ring seals 178 carried by the valve operating cylinder 177 and the wall surface of the counterbore 175 in piston-like member 172. Subsequent reduction in the pressure in the chamber 165 below this value, as a result of a further reduction in brake pipe pressure in chambers 147 and 155, renders the spring 194 effective to deflect the diaphragm 166 upward to move the diaphragm follower 167 and piston-like member 172 correspondingly upward relative to the now stationary valve operating cylinder 177. Therefore, the piston-like member 172 will be moved upward to a position corresponding to the degree of brake pipe pressure reduction effected in the chambers 147 and 155.

The initial withdrawal or reduction of fluid under pressure locally from the brake pipe to the quick service volume on the first car or on those of the first several cars of the train, if these cars are provided with the brake control valve device 5, or the well-known AB control valve device, will cause a sufficient reduction in brake pipe pressure on the immediately succeeding car or cars to cause the respective quick service valve devices on these cars to rapidly propagate such quick service reduction in brake pipe pressure serially through the train from car to car. On each car provided with the brake control valve device 5, by virtue of the value of the spring 105 of the inshot valve device 24, the reduction in brake pipe pressure resulting from filling of the quick service volume 15 and venting to atmosphere through choke 125, will amount to such as seven and three-quarters pounds per square inch, which reduction is effective in the chamber 44 of the service valve device 25 to correspondingly reduce the pressure in this chamber. Therefore, the higher pressure in the chamber 53, which pressure is the same as that in the emergency reservoir 4, will deflect the diaphragm 48 in an upward direction. Since the valve stem 46 and the diaphragm follower 47 are integral, this upward deflection of the diaphragm 48 will move the valve stem 46 upward and cause the upper end of the valve stem 46 to first contact the bottom face of the flat disc-type valve 84 to close communication between the chamber 63 and the atmosphere via passageway 67, peripheral annular groove 64, passageway 68, brake cylinder exhaust choke 69, passageway and pipe 13, and retaining valve 70. As the stem 46 continues to move upward, the flat disc-type valve 84 will be unseated from the annular valve seat 73. By unseating of the flat disc valve 84, fluid under pressure from the auxiliary reservoir 3 is permitted to flow by way of the pipe and passageway 10, service choke 85, and passageway 86, to the chamber 87. Fluid also flows from the passageway 10 at an unrestricted rate through the passageway 42, past the annular valve seat 91 and through the bore 90 to the chamber 87. Fluid under pressure thus supplied from the auxiliary reservoir 3 to the chamber 87 flows from this chamber through the passageway 88 to the chamber 71, thence past the annular valve seat 73 and through the bore 72 to the chamber 63 from which it flows through the passageway 66, passageway 65, and passageway and corresponding pipe 11 to the brake cylinder device 2 to provide a fast build-up of brake cylinder pressure until the pressure supplied from the passageway 11 via the branch passageway 11a, choke 102, and passageway 101 to the chamber 100 is increased sufficiently (for example, approximately ten pounds per square inch) to deflect the diaphragm 92 upward against the yielding resistance of the spring 105 and thereby move the inshot valve stem 97 upward far enough for the spring 113 to move the flat disc-type valve 106 into contact with the annular valve seat 91. After the flat disc-type valve 106 is thus seated on the annular valve seat 91, further build-up of brake cylinder pressure is controlled at a slower rate by flow from the auxiliary reservoir 3 via pipe and passageway 10, service choke 85, passageway 86, chamber 87, passageway 88, chamber 71, past the annular valve seat 73, through bore 72 to chamber 63, and thence through passageways 66 and 65 and passageway and corresponding pipe 11 to the brake cylinder device 2. Thus a fast build-up of brake cylinder pressure is followed by a slower rate of build-up of brake cylinder pressure controlled by the size of the choke 85.

At the time the inshot valve stem 97 is moved to its upper position in response to supply of fluid under pressure to the chamber 100, the peripheral annular groove 107 on surface of the stem 97 is moved to a position in which communication is closed between passageway 115 and passageway 116 since the two O-ring seals 109 on the lower side of the peripheral annular groove 107 are now disposed one above and the other below the opening of the passageway 115 at the wall surface of the bore 103. This terminates initial quick service activity. Therefore, these O-ring seals 109 insure that there can be no leakage of fluid under pressure from the passageway 115 and the quick service volume 15 to the passageway 116 and thence to the chamber 117 which is open via choke 125 to atmosphere subsequent to movement of the inshot valve stem 97 to its upper position.

Also, at the time the inshot valve stem 97 is moved from the position in which it is shown in FIG. 1B of the drawings to its upper position, the peripheral annular groove 108 is moved to a position in which communication is closed between the passageway 119 and the passageway 121. In this upper position of the inshot valve stem 97, the two O-ring seals 110 on the lower side of the annular groove 108 are disposed one above and one below the opening of the passageway 121 at the wall surface of the bore 103 so that these O-ring seals insure that no fluid under pressure can leak from emergency reservoir 4 into the bore 103 and thence along the stem 97 between the periphery thereof and the wall of the bore 103 to the annular groove 107 and thence through the passageways 116 to the chamber 117 which is open via choke 125 to atmosphere as afore stated. Therefore, after the valve stem 97 has moved to its upper position, no fluid pressure can flow to the chamber 117 and the pressure therein will flow to atmosphere through the choke 125 until the pressure in chamber 117 is reduced to atmospheric pressure whereupon the spring 133 will return the interlock valve stem 128 to the position shown in FIG. 1C in which the peripheral annular groove 135 establishes a communication between passageways 136 and 137.

Fluid under pressure supplied to the brake cylinder device 2 in the manner described above increases the pressure in the chamber 63 and is effective to establish a force that acts in a downward direction on the upper side of the diaphragm 59. Upon this force slightly exceeding the force acting upward on the diaphragm 48, as a result of the reduction of pressure in the chamber 44 caused by the brake pipe reduction, the valve stem 46 will be moved downward until the spring 89 acting through the piston 80 seats the flat disc-type valve 84 on the annular valve seat 73. This cuts off flow of fluid under pressure from the auxiliary reservoir 3 to the brake cylinder device 2.

Therefore, after the pressure of fluid in the brake pipe 1 becomes stabilized at a value determined by the position in its application zone to which the engineer moved the handle 444 of the brake valve device 6 on the locomotive, the supply of fluid under pressure from the auxiliary reservoir 3 to the brake cylinder device 2 on each particular car provided with a brake control valve device 5 will be terminated. This seating of the disc valve 84 on the annular valve seat 73 is effective to hold the desired pressure of fluid in passageway 66 and hence in the brake cylinder device 2.

It will be understood that each well-known AB brake control valve device on those cars in the train so equipped will supply fluid under pressure from its corresponding auxiliary reservoir to its corresponding brake cylinder device to a degree in accordance with the reduction in brake pipe pressure effected and then move to a lap po- The degree of brake application on all cars in the train can now be increased by the engineer moving the handle 444 farther into its application zone to a position corresponding to the degree of reduction in train brake pipe pressure desired. The brake control valve devices 5 and the AB control valve devices on the cars in the train will operate in response to this additional reduction in train brake pipe pressure in the manner hereinbefore explained to increase the pressure in the corresponding brake cylinder devices, to a degree in accordance with the reduction in pressure effected in the train brake pipe.

From the foregoing, it will be apparent that any particular degree of brake cylinder pressure may be supplied to each brake cylinder device 2 by operation of the service valve device 25 of the corresponding brake control valve device 5 according to the degree of reduction in brake pipe pressure effected relative to emergency reservoir pressure, either initially or in subsequent graduated steps, up to a maximum brake cylinder pressure such as fifty pounds per square inch as determined by an equalization of the pressure in each auxiliary reservoir 3 with that in the corresponding brake cylinder device 2 and corresponding to a reduction in brake pipe pressure to a full service value of such as fifty pounds per square inch.

DIRECT RELEASE OF THE BRAKES AFTER A SERVICE BRAKE APPLICATION

To effect a direct release of the brakes on the entire train following a service brake application thereon, the engineer will move the handle 444 of the brake valve device 6 directly and quickly from whatever position it occupies in its application zone in the direction of its running position back to this position. When the handle 444 is thus returned to its running position, the cam 445 carried on the cam shaft 443 is effective, through the intermediary of the pusher stem 450, to move the flat disc-type valve 447 against the yielding resistance of the spring 448 out of contact with the annular valve seat 449 and to the position shown in FIG. 1 to open a communication between passageways 454 and 453 via the chambers 452 and 451 in bypass of the choke 437.

Also, when the handle 444 is returned to its running position, the cam 457 carried on the cam shaft 443 effects operation of the self-lapping valve device 411 in the manner described in detail in hereinbefore-mentioned Patent No. 2,958,561 to supply fluid under pressure from the main reservoir 434 to the equalizing reservoir 456 and to the chamber 420 of the relay valve device 410.

Fluid under pressure thus supplied to the chamber 420 will cause the diaphragm-type piston 419 to shift rightward, as viewed in FIG. 1, and, through the intermediary of the operating stem 422, unseat the disc-shaped supply valve 425 for supplying fluid under pressure from main reservoir 434 via pipe and passageway 433 to chamber 427 and thence along the operating stem 422 to the chamber 421 until the pressure in the chamber 421 has increased to substantially the value of equalizing reservoir pressure present in chamber 420, whereupon the diaphragm-type piston 419 will be shifted leftward to a lap position in which the disc-shaped exhaust valve 423 and supply valve 425 are seated on their respective annular valve seats to cut off further flow of fluid under pressure from the main reservoir 434 to the chamber 427.

Fluid under pressure supplied from the main reservoir 434 to the chamber 427 in the manner described above also flows from the chamber 427 via the choke 436 to the chamber 435 and thence via the passageway 454, chambers 452 and 451, and passageways 453 and 438, to the chamber 439 in bypass of the choke 437. Fluid under pressure thus supplied to the chamber 439 effects unseating of the valve 440 of the brake pipe cut-off valve device 412 whereupon fluid under pressure flows to the chamber 441 and thence via the passageway 442 to the train brake pipe that extends from car to car through the train at the hereinbefore-mentioned usual normal rate.

If the first car or several cars in the train are provided with a brake control valve device 5, the fluid under pressure supplied by the brake valve device 6 at the usual normal rate will flow to the brake pipe 1 on each of these cars and thence via pipe and passageway 9, brake pipe strainer 23, and passageway 37 to the chamber 297 above the diaphragm 293 in the quick service and emergency pilot valve device 17. This usual normal rate of supply of fluid under pressure to the chamber 297 is enough in excess of the rate at which fluid under pressure can flow from the chamber 297 via the passageway 299 and the choke 300 to the chamber 298 to quickly establish a differential pressure of approximately one and one-half pounds per square inch in the chamber 297 in excess of the pressure in the chamber 298. This differential of pressure is effective to deflect the diaphragm 293 downward until the boss 295 on the diaphragm follower plate 294 contacts the upper end of the piston valve 390 after which the piston valve will be moved downward simultaneously with further downward deflection of the diaphragm 293, whereupon the stem 392 on the lower end of the piston valve 390 moves the flat disc-type valve 383 of the back-dump check valve device 21 against the yielding resistance of the spring 389 away from the annular valve seat 388 to thereby establish a communication between the chamber 384 and the interior of the counterbore 387. The emergency reservoir 4 is connected via pipe and passageway 12, passageway 369, passageway 378, chamber 375, and passageway 385 to the chamber 384.

Therefore, fluid under pressure will flow from the emergency reservoir 4 via the chamber 384 and the interior of the counterbore 387 to the passageway 408 and thence to the chamber 407. The fluid under pressure thus supplied to the chamber 407 will move the flat disc-type valve 402 against the yielding resistance of the spring 404 away from the annular valve seat 406 to establish a communication between the chamber 407 and the chamber 403. Fluid under pressure in the chamber 407, which is being supplied thereto from the emergency reservoir 4, as just explained, will now flow to the chamber 403 and thence through the passageway 405 to the chamber 273. Fluid under pressure will flow from the chamber 273 via the branch passageway 37a, passageways 37, 36 and 56 to the chamber 44 above diaphragm 48 and also from passageway 37, via brake pipe strainer 23 and pipe and passageway 9, to the brake pipe 1 until the pressure in the emergency reservoir 4, the chambers 44 and 53 and the brake pipe 1 on the first car or several cars provided with the brake control valve device 5 equalize. Upon equalization of pressures on the opposite sides of diaphragm 48, the spring 55 will move the service valve stem 46 downward to the position in which it is shown in FIG. 1C of the drawings. Upon movement of the service valve stem 46 downward to the position shown in FIG. 1C, the upper end of the valve stem 46 is moved away from the seated flat disc-type valve 84 so that the brake cylinder device 2 is now connected via pipe and passageway 11, passageway 65, passageway 66, chamber 63, passageway 67 in the valve stem 46, peripheral annular groove 64 on the valve stem 46, passageway 68, brake cylinder exhaust choke 69, pipe and passageway 13, and retaining valve 70 to atmosphere. Since the chamber 100 is connected via passageway 101, choke 102, and branch passageway 11a to the passageway 11, the chamber 100 will be vented to atmosphere simultaneously with the brake cylinder device 2. Consequently, upon the pressure in the chamber 100 being reduced to, for example, ten pounds per square inch, the spring 105 will be rendered effective to return the inshot valve stem 97 to the position shown in FIG. 1B of the drawings. Therefore, upon equalization of pressure on opposite sides of the diaphragm 48 of the service valve device 25 of the brake control valve device 5 on the first car or several cars in the train which, as has been assumed, are provided with this type of brake control valve device, an accelerated direct release of the brakes is effected on these cars since fluid under pressure is completely released from the corresponding brake cylinder device 2 to atmosphere at a rate controlled by the brake cylinder exhaust choke 69.

The fluid under pressure supplied from the emergency reservoir 4 to the brake pipe 1 on the first car next to the locomotive and provided with a brake control valve device 5 will flow from the brake pipe 1 on this car to the next car farther back in the train from the locomotive. This supply of fluid under pressure to the brake pipe on the next car farther back from the locomotive will hasten the increase in the pressure in the brake pipe on that car and therefore the release operation of the brake control valve device thereon, whether it be of the type such as the brake control valve device 5 shown in FIGS. 1A, 1B and 1C of the drawings or of the type such as the well-known AB control valve device, to release the brakes on this adjacent car more remote from the locomotive. It will be noted, however, if the next car or several cars are equipped with the well-known AB brake control valve device, they will not operate to affect the supply of fluid under pressure from the emergency reservoir to the brake pipe, since the AB control valve devices are not provided with means for supplying fluid under pressure from the emergency reservoir to the brake pipe when releasing the brakes subsequent to a service application. Consequently, a quick release of the brakes will not run through the train from car to car from the locomotive to the last car when effecting a release of the brakes subsequent to a service brake application.

It should be understood that if the first several cars in the train are provided with an AB brake control valve device which is not provided with a valve device for supplying fluid under pressure from the emergency reservoir to the brake pipe upon an increase in brake pipe pressure at the usual normal rate, then the flow of fluid under pressure from the brake pipe 1 to the chamber 297 in the quick service and emergency pilot valve device 17 on those cars in the train that are provided with a brake control valve device 5, but are located farther back in the train than the first several cars that are provided with an AB brake control valve device, is not at a sufficient rapid rate in excess of the rate at which fluid under pressure may flow from the chamber 297 via the choke 300 and passageway 299 to the chamber 298 to establish a differential pressure of approximately one and one-half pounds per square inch in the chamber 297 in excess of the pressure in the chamber 298 to effect operation of each quick service and emergency pilot valve device 17 in the manner hereinbefore described to supply fluid under pressure from the corresponding emergency reservoir 4 to the corresponding chamber 44 and brake pipe 1 to effect an accelerated direct release of the brakes on these cars.

Such fluid under pressure as is supplied to the train brake pipe at the hereinbefore-mentioned usual normal rate will flow to the brake pipe 1 on each car in the train that is provided with a brake control valve device 5 and located farther back in the train than the first car provided with an AB control valve device. The fluid under pressure thus supplied to the brake pipe 1 on each of these cars will flow therefrom, as shown in FIG. 1B of the drawings, through the passageway 9, brake pipe strainer 23, passageways 37 and 36, branch passageway 36a, choke 122, passageway 119, peripheral annular groove 108 on the inshot valve stem 97, which is now in its upper position so that the peripheral annular groove 108 thereon closes communication between passageways 119 and 121 and establishes communication only between passageways 119 and 120, passageway 120, and passageway 196 to the interior of the bore 184, it being understood that the flat disc-type valve 188 is now biased by spring 189 and emergency reservoir pressure in chamber 185 into contact with annular valve seat 187 to close communication between the interior of the bore 184 and the chamber 185.

The fluid under pressure supplied from the brake pipe 1 to the passageway 36, in addition to flowing through the choke 122, flows via passageways 56 and 149 to the chambers 147 and 155 in the direct release valve mechanism 28. As the fluid under pressure thus supplied to the chamber 147 increases the pressure therein, this increase in pressure is immediately effective to deflect the diaphragm 145 downward against the yielding resistance of spring 162 to move the annular valve seat 157 downward away from the disc-type valve 156 to effect the supply of fluid under pressure from the chamber 155 to the chamber 165 in the manner hereinbefore explained.

The fluid under pressure thus supplied to the chamber 165 is effective to deflect the diaphragm 166 downward against the yielding resistance of spring 194 to effect unseating of the flat disc-type valve 188 from the annular valve seat 187 in the manner also hereinbefore explained. When the flat disc-type valve 188 is thus unseated from the annular valve seat 187, a communication is established between the chamber 185 and the interior of bore 184 whereupon fluid under pressure will flow from the emergency reservoir 4 via pipe and passageway 12, passageways 209 and 207, peripheral annular groove 204 on the spool-type valve 202, passageways 206, 205 and 137, peripheral annular groove 135 on the interlock valve stem 128 which is now in the position shown in FIG. 1C as the result of venting of all fluid under pressure from the chamber 117 via choke 125, passageways 136, 121 and 198, chamber 185, past the annular valve seat 187 to the interior of bore 184 and thence through passageways 196 and 120, peripheral annular groove 108 on inshot valve stem 97 which at this time occupies its upper position, passageway 119, choke 122, and branch passageway 36a to passageway 36. Fluid under pressure thus supplied from the emergency reservoir 4 to the passageway 36 flows therefrom via passageway 56 to the chamber 44 above the diaphragm 48 of the service valve device 25 and also via passageway 37, brake pipe strainer 23 and passageway and corresponding pipe 9 to the brake pipe 1. The fluid under pressure present in the chamber 53 below diaphragm 48 is at the same pressure as that in the emergency reservoir 4 since this chamber is connected thereto as hereinbefore explained. Therefore, the fluid under pressure now being supplied from the emergency reservoir 4 to the chamber 44 above the diaphragm 48, and to the brake pipe 1, will cause the pressures in the emergency reservoir 4, on opposite sides of the diaphragm 48 and in the brake pipe 1 to quickly equalize at a rate determined by the size of the choke 122. Upon equalization of pressures on the opposite sides of the diaphragm 48, the service valve device 25 of the brake control valve device 5 on each car in the train that is located farther back from the locomotive than the first car or several cars that are provided with an AB brake control valve device will operate in response to this equalization of pressure in the manner hereinbefore described to effect a direct and complete release of fluid under pressure from the corresponding brake cylinder device 2.

It will be apparent from what has been said above that upon increasing the pressure in the train brake pipe subsequent to a service brake application, the direct release mechanism 28 on each car in the train that is provided with a brake control valve device 5 operates on a slight increase in brake pipe pressure, such as two or three pounds per square inch, above the reduced brake pipe pressure to connect the emergency reservoir 4 via the choke 122 to the passageway 56 and the chamber 44 to cause the service valve device 25 to operate to effect a direct and complete release of fluid under pressure from the brake cylinder device 2 on each car in the train that is equipped with a brake control valve device 5.

As the supply of fluid under pressure to the train brake pipe is continued by the brake valve device 6 located on the locomotive, the brake control valve devices 5 on those cars equipped with this type of brake control valve device, and those other cars in the train equipped with the well-known AB brake control valve device will all operate to effect a direct release of the brakes on each car in the train, after which the emergency and auxiliary reservoirs on all the cars will be recharged to the normal fully charged pressure which may be for example, seventy pounds per square inch.

EMERGENCY APPLICATION OF THE BRAKES

In effecting an emergency application of the brakes, the handle 444 of the engineer's brake valve device 6 on the locomotive will be moved to its emergency position to cause an emergency rate of reduction in the pressure in the train pipe extending from the locomotive back through all the cars in the train.

On those cars in the train equipped with the brake control valve device 5 shown in FIGS. 1A, 1B and 1C of the drawings, this reduction in brake pipe pressure at an emergency rate will cause the service application valve portion 25 to operate in the manner hereinbefore described in detail to supply fluid under pressure from the corresponding auxiliary reservoir 3 to the corresponding brake cylinder device 2.

The emergency application portion 8 of each of these brake control valve devices 5 operates in response to this rapid reduction in brake pipe pressure in the manner described in detail in the hereinbefore-mentioned copending application to completely vent fluid under pressure from the quick action chamber 14, to operate the vent valve device 18 to vent fluid under pressure from the brake pipe 1 to atmosphere at a rapid rate and to cause the high pressure piston 371 to move plunger 360 of high pressure valve device 19 downward to unseat the flat disc-type valve 367 from the annular valve seat 364 whereupon the emergency reservoir pressure present in the chamber 365 will flow to the chamber 362 and thence through the passageway 363 to the passageway 10 in the pipe bracket portion 5a so that fluid under pressure from both the emergency reservoir 4 and auxiliary reservoir 3 is supplied to the brake cylinder device 2 through the service valve device 25 in the manner hereinbefore described for effecting a supply of fluid under pressure from the auxiliary reservoir 3 to the brake cylinder device 2. With both the emergency reservoir 4 and the auxiliary reservoir 3 connected to the brake cylinder device 2, the resulting equalization pressure will be higher than that obtained between the auxiliary reservoir 3 and the brake cylinder device 2 when a service application of the brakes is made. Consequently, a higher braking force is obtained upon effecting an emergency brake application than when a service brake application is made.

The well-known AB control valve devices on those cars in the train so equipped will operate in the usual manner in response to a reduction in the pressure in the brake pipe at an emergency rate to effect an emergency brake application on these cars.

DIRECT RELEASE OF THE BRAKES AFTER AN EMERGENCY BRAKE APPLICATION

To effect a direct release of the brakes on all cars in the train subsequent to an emergency application of the brakes on all the cars, the engineer will move the handle 444 of the brake valve device 6 directly and quickly from its emergency position to its running position. When the handle 444 is thus returned to its running position, the flat disc-type valve 447 is unseated from the annular valve seat 449 in the manner hereinbefore explained in detail to open a communication between the passageways 454 and 453 in bypass of the choke 437.

Also, when the handle 444 is returned to its running position, the self-lapping valve device 411 and the relay valve device 410 operate in the manner hereinbefore described to effect the supply of fluid under pressure from the main reservoir 434 in bypass of the choke 437 to the train brake pipe that extends from car to car through the train at the hereinbefore-mentioned usual normal rate.

As explained in detail in the hereinbefore-mentioned United States Patent 3,160,446 issued December 8, 1964 to Glenn T. McClure, when an emergency brake application is made, fluid under pressure is completely vented from the quick action volume 14 and the chambers 297 and 298. Therefore, when fluid under pressure is subsequently supplied to the train brake pipe at the usual normal rate, it will flow at this rate from the brake pipe 1 on those cars in the train that are provided with a brake control valve device 5 regardless of their position in the train via passageway 9, brake pipe strainer 23, and passageway 37 to the chamber 297 in the quick service and emergency pilot valve device 17. This normal rate of supply of fluid under pressure to the chamber 297 is enough in excess of the rate at which fluid under pressure can flow from the chamber 297 via the passageway 299 and choke 300 to the chamber 298 to quickly establish a differential of approximately one and one-half pounds per square inch in the chamber 297 in excess of the pressure in the chamber 298. This differential of pressure is effective to promptly deflect the diaphragm 293 downward until the boss 295 on the diaphragm follower plate 294 contacts the upper end of the piston valve 390, after which the piston valve will be moved downward simultaneously with further downward deflection of the diaphragm 293, whereupon the stem 392 on the lower end of the piston valve 390 moves the flat disc-type valve 383 of the back-dump check valve device 21 against the yielding resistance of the spring 389 away from the annular valve seat 388 to thereby establish a communication between the chamber 384 and the interior of the counterbore 387. The emergency reservoir 4 is connected via pipe and passageway 12, passageway 369, passageway 378, chamber 375, and passageway 385 to the chamber 384. Therefore, if the fluid under pressure in the emergency reservoir 4 has not been released to atmosphere by operation of the manually operated brake cylinder release valve device 29 in a manner hereinafter described in detail, the fluid under pressure remaining in the emergency reservoir 4 at a reduced pressure after an emergency brake application will now flow to the chamber 407 via the counterbore 387 and the passageway 408. The fluid under pressure thus supplied to the chamber 407 from the emergency reservoir 4 will, assuming that the pressure remaining in the emergency reservoir 4 is greater than the now increasing pressure in the brake pipe 1 and consequently in the chamber 403, move the flat disc-type valve 402 against the yielding resistance of the spring 404 away from the annular valve seat 406 to establish a communication between the chamber 407 and the chamber 403. Fluid under pressure in the chamber 407, which is being supplied thereto from the emergency reservoir 4, as just explained, will now flow to the chamber 403 and thence through the passageway 405 to the chamber 273 from whence it will flow via the branch passageway 37a, passageway 37, brake pipe strainer 23, pipe and passageway 9 to the brake pipe 1.

The fluid under pressure supplied from the emergency reservoir 4 to the passageway 37, in addition to flowing to the brake pipe 1, also flows at an unrestricted rate via passageways 36 and 56 to the chamber 44 above the diaphragm 48 of the service valve device 25 so that the pressures in the chambers 53 and 44 and in brake pipe 1 become quickly equalized. Upon equalization of pressures in the chambers 53 and 44, and thus on the opposite sides of the diaphragm 48, the service valve device 25 will operate in the manner hereinbefore described in detail to effect a direct and complete release of fluid under pressure from the brake cylinder device 2. Therefore, upon effecting a release of the brakes subsequent to an emergency brake application, the fluid under pressure, if there be any, remaining in the emergency reservoir is dumped back into the chamber 44 to effect a direct release of the brakes and also into the brake pipe 1 to cause an accelerated recharge of the train brake pipe.

When, upon effecting a release subsequent to an emergency brake application, brake pipe pressure is increased sufficiently on the brake pipe side of the emergency piston of each AB brake control valve device on those cars in the train that are provided with this type of brake control valve device, each emergency piston moves its corresponding emergency slide valve to a position to connect the brake cylinder device and the auxiliary reservoir on the respective car to the brake pipe so that fluid under pressure flows from the brake cylinder and auxiliary reservoir to the brake pipe until these pressures are within about ten pounds per square inch of equalization. This flow of fluid under pressure from the brake cylinder and auxiliary reservoir on each car in the train that is provided with an AB type brake control valve device provides a quick initial build-up of brake pipe pressure. This build-up of brake pipe pressure together with the build-up of brake pipe pressure as a result of the fluid under pressure supplied to the brake pipe from the emergency reservoir on each car in the train that is provided with a brake control valve device 5 results in a sufficient build-up of pressure in the train brake pipe to cause a quick release of the brakes to run serially through the train from car to car from the locomotive to the last car when effecting a release of the brakes subsequent to an emergency brake application.

The fluid under pressure supplied to the passageway 36, when effecting a release, subsequent to an emergency brake application, in addition to flowing to the chamber 44 in the service valve device 25 and the chamber 297 in the quick service and emergency pilot valve device 17, also flows via the passageways 56 and 149 to the chambers 147 and 155 in the direct release valve mechanism 28. This supply of fluid under pressure to the chambers 147 and 155 is effective to operate the direct release valve mechanism in the manner hereinbefore described in detail to unseat the flat disc-type valve 188 from the annular valve seat 187 to establish a communication between the passageways 198 and 196 whereupon the emergency reservoir 4 is connected via choke 122 to the brake pipe 1 and chamber 44 so that fluid under pressure may flow from the emergency reservoir 4 to the brake pipe 1 and chamber 44 at a rate controlled by the size of choke 122. However, the flow of fluid under pressure from the emergency reservoir 4 via the unseated flat disc-type valve 383 of the quick service and emergency pilot valve device 17 to the brake pipe 1 and chamber 44 is at an unrestricted rate since there is no choke in this communication. Consequently, operation of the direct release valve mechanism 28, when effecting a release subsequent to an emergency brake application, does not assist in effecting the direct release of the brakes. However, subsequent to equalization of emergency reservoir pressure and brake pipe pressure and a direct release of the brakes on all cars in the train, the continued supply of fluid under pressure to the train brake pipe by the engineer's brake valve device 6 on the locomotive at the hereinbefore-mentioned usual normal rate will fully recharge the emergency reservoir 4 on those cars in the train that are provided with a brake control valve device 5 via brake pipe 1, pipe and passageway 9, brake pipe strainer 23, passageways 37 and 36, branch passageway 36a, choke 122, passageway 119, peripheral annular groove 108 on inshot valve stem 97 which remains in its upper position until brake cylinder pressure in chamber 100 is reduced to, for example, ten pounds per square inch, passageways 120 and 196, interior of bore 184, chamber 185, passageways 198 and 121, peripheral annular groove 135 on interlock valve stem 128, passageways 137, 205 and 206, peripheral annular groove 204 on spool-type valve 202, passageways 207 and 209, and passageway 12 which is connected by the pipe bearing the same numeral to the emergency reservoir 4. Also, the continued supply of fluid under pressure to the train brake pipe will fully recharge the auxiliary reservoir 3 via the auxiliary reservoir charging check valve device 30 in the manner hereinbefore described in detail.

Upon the pressure in the train brake pipe reaching the normal fully charged pressure, which, as has been hereinbefore stated, may be seventy pounds per square inch, the relay valve device 410 of the brake valve device 6 on the locomotive will be effective to automatically maintain this pressure in the train brake pipe against leakage therefrom. Consequently, after releasing the brakes and recharging the train brake pipe and reservoirs on each car, the engineer can effect a service or an emergency brake application as desired.

(B) COMBINED ACCELERATED DIRECT RELEASE AND GRADUATED RELEASE OPERATION

Let it be supposed that at some future time, such as 10 or 15 years hence, the brake control valve device 5 shown in FIGS. 1, 1A and 1B of the drawings has superseded or replaced the well-known AB brake control valve device on all freight cars owned by the American railroads. When the brake control valve device 5 has thus completely replaced the well-known AB brake control valve device on all freight cars owned by the American railroads, the owners of these cars can, with comparative ease and with very little expense, convert these brake control valve devices 5 from a direct release type of brake control valve device to a combined accelerated direct release and graduated release type of brake control valve device.

First, the direct release valve mechanism 28 is removed from the bolting face 27 of the casing section 26. Next, a blanking plate 459 shown in FIG. 2 is secured to the bolting face 27 of the casing section 26 by any suitable means (not shown). As shown in FIG. 2, the blanking plate 459 closes that end of each of the passageways 198, 196 and 149 that opens at the surface of the bolting face 27 on the lower side of the casing section 26. Therefore, with the direct release valve mechanism 28 removed and the ends of each of the passageways 198, 196 and 149 that open at the surface of the bolting face 27 closed, no fluid under pressure can flow from the emergency reservoir 4 to the brake pipe 1 upon instigating an increase in brake pipe pressure when effecting a release of the brakes, subsequent to effecting a brake application, until the inshot valve stem 97 has returned to the position in which it is shown in FIG. 1A. Since the inshot valve stem 97 is maintained in its upper position by brake cylinder pressure present in the chamber 100, the inshot valve stem 97 will not be returned to the position in which it is shown until the fluid under pressure present in the chamber 100 below the diaphragm 92, which is the same as brake cylinder pressure, has been reduced to, for example, approximately ten pounds per square inch. Consequently, no dump-back of fluid under pressure from the emergency reservoir 4 to the brake pipe 1 and the chamber 44 of the service valve device 25 can occur until brake cylinder pressure has been reduced to this value to provide for recharge of the brake pipe and a complete direct release of the brakes by operation of the service valve device 25 in response to equalization of pressures on the opposite side of the diaphragm 48 after the pressure in the brake pipe 1 is increased, for example, two or three pounds per square inch, upon initiating a release of the brakes subsequent to a service brake application as was the case prior to removal of the direct release valve mechanism 28. Therefore, removal of the direct release valve mechanism 28 and the addition of the blanking plate 459 in its place effects the change-over of the brake control valve device 5 from a direct release type of a brake control valve device to a combined accelerated direct and graduated release type of brake control valve device which possesses the following advantages.

Freight cars provided with a brake control valve device 5 modified so as to be of the combined accelerated direct and graduated release type would not require a retaining valve 70 since this graduated release type of brake control valve device is automatically operative in response to a reduction in the brake cylinder pressure in the chamber 63 of the service valve device 25 to maintain brake cylinder pressure against leakage. Consequently, the present maintenance cost of retaining valves would be eliminated.

Furthermore, if all the cars in a train are provided with a combined accelerated direct and graduated release type of brake control valve device, the engineer on the locomotive may effect an accelerated direct release of the brakes when traveling in level terrain and when releasing the brakes subsequent to stopping the train, or he may effect graduated applications and graduated releases of the brakes when the train is traveling through mountainous territory to provide a braking force on the train in accordance with the descending grade.

INITIAL CHARGING

Assume initially that all the passageways and chambers in the brake control valve device 5 shown in FIGS. 1, 1A and 1B of the drawings are devoid of fluid under pressure; that the various parts of the brake control device 5 are in the respective positions in which they are shown in the drawings; that all of the cars in a train are equipped with a brake control valve device 5; that the direct release valve device 28 on all the cars in the train has been removed and replaced by the blanking plate 459; and that it is desired to initially charge the brake equipment on all of the cars in the train. To initially charge the train, the engineer will move the handle 444 of the engineer's brake valve 6 on the locomotive to its running position whereupon, in the manner hereinbefore described, fluid under pressure will then be supplied, at the usual normal rate for effecting the charging of the brake equipment, to the train brake pipe that extends from the locomotive back through the cars in the train. The fluid under pressure that is thus supplied to the train brake pipe will therefore be supplied to the brake pipe 1 shown in FIGS. 1A and 1B of the drawings and such fluid under pressure will flow therefrom into the pipe and passageway 9 in the pipe bracket portion 5a of the brake controlling valve device 5 on each car in the train. In each respective brake control valve device 5 on each car in the train, fluid under pressure will flow from the passageway 9 in the pipe bracket portion 5a through the brake pipe strainer 23 to the passageway 37 in the casing section 38. One branch of the pasageway 37 registers with the passageway 36 in the pipe bracket portion 5a, which passageway 36 is connected via the choke 35 to the passageway 34 which leads to the lower side of the disc-type valve 31 of the auxiliary reservoir charging check valve 30. Therefore, fluid under pressure supplied from the brake pipe 1 to the passageway 34 will unseat the flat disc-type valve 31 from the annular valve seat 33 against the yielding resistance of the biasing spring 32 whereupon the auxiliary reservoir 3 will be charged with fluid under presure from the brake pipe 1 in the manner hereinbefore described in detail. Likewise, the chambers 82 and 71 are charged to the pressure carried in the auxiliary reservoir 3 in the manner hereinbefore described in detail.

Fluid under pressure thus supplied from the brake pipe 1 to the passageway 36 in the pipe bracket portion 5a will also flow to the passageway 56 in the casing section 26, which passageway 56 opens into the chamber 44 above the diaphragm 48 so that the pressure in the chamber 44 is increased as the pressure in the brake pipe 1 increases until the pressure in the brake pipe 1 is fully charged to its normal value.

Fluid under pressure supplied to the passageway 56 also flows through the branch passageway 56a in the casing section 26 and the passageway 238 in the casing section 199 of the manually operated brake cylinder release valve device 29 to the chamber 237 above the diaphragm 235. As hereinbefore stated, the spring 243 is of such value that the diaphragm 235 is not deflected downward to move the spool-type valve 202 to its lowermost position until the pressure in the chamber 237 exceeds thirty pounds per square inch.

It will be understood that the inshot valve stem 97 occupies the position in which it is shown in FIG. 1B of the drawings. Therefore, the fluid under pressure that is supplied from the brake pipe 1 to the passageway 36 in the pipe bracket portion 5a flows via the branch passageway 36a, choke 122, passageway 119 and peripheral annular groove 108 on the inshot valve 97 to the passageways 120 and 121. Fluid under pressure thus supplied to the passageway 121 flows therefrom via passageway 136, peripheral annular groove 135 on the interlock valve stem 128, which at this time occupies the position shown in FIG. 1C of the drawings, and the passageway 137 to the chamber 53 below the diaphragm 48 of the service valve device 25. Fluid under pressure also flows from the passageway 137 via passageways 205 and 206, peripheral annular groove 204 on the spool-type valve 202, passageways 207 and 209, and passageway and corresponding pipe 12 to the emergency reservoir 4 so that the pressure in the chamber 53 and the emergency reservoir 4 increases simultaneously as the pressure in the brake pipe 1 and chamber 44 increases.

Fluid under pressure supplied to the passageway 120 cannot flow therefrom since the end of this passageway that opens at the bolting face 27 is closed by the blanking plate 459.

As hereinbefore mentioned, a second branch of the passageway 37 in the casing section 38 of the emergency application portion 8 is connected to the chamber 297 in the quick service and emergency pilot valve device 17. Therefore, as fluid under pressure is supplied from the brake pipe 1 to the passageway 37, fluid under pressure will flow to the chamber 297 to cause operation of the quick service and emergency pilot valve device 17 and the continual quick service valve device 16 in the manner described in detail in the hereinbefore-mentioned copending application to cause the quick action chamber 14 and the volume chamber 281 to be charged to the same pressure as is carried in the brake pipe 1.

After the lapse of a period of time necessary to effect charging of the auxiliary reservoir 3 and the emergency reservoir 4, and the various chambers in the brake control valve device 5 on all the cars in the train, the pressure of fluid in the brake pipe 1 will be stabilized at a normal value of, such as seventy pounds per square inch, preparatory to operation of the brake control valve devices 5, to effect a brake application on all the cars in the train.

During such initial charging of the brake control valve device 5, the brake cylinder device 2 on each car will remain vented to the atmosphere in the manner hereinbefore described in detail.

GRADUATED SERVICE APPLICATION OF THE BRAKES

The brake valve device 6 is so constructed that upon iniital movement of the handle 444 by the engineer out of its running position and to the adjacent end of its service zone, a minimum reduction of seven and three-quarters pounds per square inch will always be effected in the pressure of the fluid under pressure in the train brake pipe, with minimum reduction is sufficient to effect the supply of fluid under pressure to each brake cylinder device 2 on the train until the pressure therein is ten pounds per square inch. Consequently, to effect a graduated service application of the brakes on a train of cars, each of which is provided with a brake control valve device 5 from which the direct release valve mechanism 28 has been removed and replaced by a blanking plate 459, the engineer will move the handle 444 of the brake valve device 6 from its running position to a selected position in its service zone corresponding to the degree of brake application desired to effect a reduction in the pressure of the fluid in the brake pipe at a service rate. Such reduction in brake pipe pressure will occur in chamber 297 of the quick service and emergency pilot valve device 17 of the brake control valve device 5 on each car in the train and cause each quick service and emergency pilot valve device 17 and the corresponding continual quick service valve device 16 to operate in the manner fully described in detail in the hereinbefore-mentioned copending application to supply fluid under pressure from chamber 266, to which the brake pipe 1 is connected as shown in FIGS. 1A and 1B, to the quick service volume 15 to hasten the reduction in brake pipe pressure being effected by the engineer's brake valve device 6 on the locomotive.

A withdrawal or reduction of fluid under pressure locally from the brake pipe 1 to the quick service volume 15 on the first car or on the first several cars in the train effects a sufficient reduction in brake pipe pressure on the immediate adjacent car or cars farther back from the locomotive to cause the respective quick service and emergency pilot valve devices 17 and the continual quick service valve devices 16 on these cars to rapidly propagate such quick service reduction in brake pipe pressure serially through the train from car to car from the locomotive to the last car in the train. By virtue of the value of the spring 105 of the inshot valve device 24 of the brake control valve device 5 on each car, the reduction in brake pipe pressure, resulting from filling of the corresponding quick service volume 15 on each car and the venting of fluid under pressure from the quick service volume 15 to atmosphere through choke 125 until the inshot valve stem 97 moves in response to an increase in brake cylinder pressure to, for example, ten pounds per square inch, from the position shown in FIG. 1B upward to its second position in which communication is closed between passageways 115 and 116, will amount to such as seven and three-quarters pounds per square inch. This reduction in brake pipe pressure is effective to hasten the reduction in train brake pipe pressure being effected by the engineer's operation of brake valve device 6 on the locomotive. Consequently, the reduction in pressure thus effected in the train brake pipe is effective in the chamber 44 of the service valve device 25 of the brake control valve device 5 on each car in the train to cause each service valve device 25 to operate in the manner hereinbefore described to supply fluid under pressure from the auxiliary reservoir 3 to brake cylinder device 2, first at a fast rate and then at a slower rate controlled by the size of the service choke 85.

The fluid under pressure supplied to the passageways 66 and 65 and thence through the passageway and pipe 11 in each brake control valve device 5 to the corresponding brake cylinder device 2 by operation of the service valve device 25 of each brake control valve device 5 also flows from the corresponding passageway 11 through the branch passageway 11a, choke 102, and passageway 101 to the chamber 100 below the diaphragm 92 of the inshot valve device 24 to deflect the diaphragm 92 upward against the yielding resistance of the spring 105 and therefore move the inshot valve stem 97 to its upper position, upon the pressure in the chamber 100 reaching, for example, approximately ten pounds per square inch.

As hereinbefore described in detail, upon movement of the inshot valve stem 97 to its upper position, responsive to the supply of fluid under pressure to the chamber 100, the peripheral annular groove 107 on the inshot valve stem 97 is moved to a position to close communication between the passageway 115 and the passageway 116. Also the peripheral annular groove 108 is moved to a position in which communication is closed between the passageway 119 and the passageway 121. Closing of the communication between passageways 119 and 121 cuts off the emergency reservoir 4 from the brake pipe 1 to prevent back flow from the emergency reservoir to the brake pipe in which the pressure is now being reduced.

The fluid under pressure supplied to each brake cylinder device 2 by operation of the service valve device 25 of the corresponding brake control valve device 5 is effective in the chamber 63 of the corresponding brake control valve device 5 to increase the pressure in the chamber 63 and deflect the diaphragm 59 downward to cause the service valve device 25 to move to a lap position upon the pressure in the chamber 63 increasing to a value proportional to the reduction in brake pipe pressure effected in the chamber 44. When the service valve device 25 is thus moved to lap position, the supply of fluid under pressure from the auxiliary reservoir 3 to the brake cylinder device 2 is cut off. Consequently, it will be understood that each service valve device 25 supplies fluid under pressure to the corresponding brake cylinder device 2 to build up the pressure therein to a degree corresponding to the degree of brake pipe reduction effected by movement of the handle 444 of brake valve device 6 on the locomotive by the engineer to the selected position in its service zone.

After the service valve device 25 has movd to lap position to cut off flow of fluid under pressure from the auxiliary rservoir 3 to the brake cylinder device 2, the engineer may, if he so desires, increase the degree of the brake application in steps by moving the handle 444 of the brake valve device 6 on the locomotive farther into its service zone to corresponding selected positions to effect corresponding further reductions of the pressure in the train pipe and consequently in the brake pipe 1 shown in the drawings. Upon each successive brake pipe reduction of the pressure in the brake pipe 1, the service valve device 25 of the brake control valve device 5 on each car in the train will operate in the manner hereinbefore described in detail to again effect the supply of fluid under pressure from the corresponding auxiliary reservoir 3 to the corresponding brake cylinder device 2 until the pressure in the brake cylinder device 2 is increased to a degree proportional to the total amount of reduction of the pressure effected in the brake pipe 1. It will thus be understood that brakes may be initially applied to effect a minimum brake cylinder pressure of ten pounds per square inch or to effect a brake cylinder pressure in excess of this minimum pressure, and then the engineer, at his discretion, may subsequently increase the degree of the brake application up to a full service brake application by moving the handle 444 of brake valve device 6 farther into its service zone.

ACCELERATED DIRECT RELEASE OF BRAKES SUBSEQUENT TO A SERVICE BRAKE APPLICATION

To effect an accelerated direct release of the brakes subsequent to a service application thereof, the engineer will move the handle 444 of the engineer's brake valve device 6 to its running position to cause the supply of fluid pressure to the train brake pipe at the usual normal rate for effecting the charging of the brake equipment and a direct release of the brakes on the cars in the train. Such fluid under pressure as is thus supplied to the train brake pipe will flow therefrom via brake pipe 1, passageway 9, brake pipe strainer 23, passageways 37 and 36 and choke 122, to the passageway 119 in each brake control valve device 5.

It will be remembered that the inshot valve stem 97 now occupies its upper position in which the peripheral annular groove 108 thereon no longer establishes a communication between passageway 119 and passageway 121 since the two O-ring seals 110 are now disposed one above and the other below the opening of the passageway 121 at the wall surface of the bore 103. Therefore, the emergency reservoir 4 cannot equalize into the brake pipe 1 and the chamber 44 above the diaphragm 48 of the service valve device 25 via the peripheral annular groove 108 to cause the service valve device 25 to operate to effect a direct and complete release of the fluid under pressure from the brake cylinder device 2 upon the initial increase in pressure in the brake pipe 1 of two or three pounds per square inch subsequent to a service brake application.

Fluid under pressure supplied from the brake pipe 1 to the passageway 37 flows at the hereinbefore-mentioned usual normal rate to the chamber 297 in the quick service and emergency pilot valve device 17 and thence via passageway 299 and the choke 300 to the chamber 298 at a rate controlled by the size of the choke 300. Upon the pressure in the chamber 297 exceeding the pressure in the chamber 298, as a result of the supply of fluid under pressure from the brake pipe 1 to the chamber 297 at the hereinbefore-mentioned usual normal rate for effecting the charging of the brake equipment and a direct release of the brakes by, for example, one and one-half pounds per square inch, the diaphragm 293 will be deflected downward against the yielding resistance of the spring 394 to effect, through the intermediary of the piston valve 390 and its stem 392, unseating of the flat disc-type valve 383 against the yielding resistance of the spring 389 from the annular valve seat 388. Upon the unseating of the flat disc valve 383 of the back-dump check valve device 21, a communication is established between the chamber 384 and the interior of the counterbore 387 whereupon fluid under pressure flows unrestricted from the emergency reservoir 4 to the brake pipe 1 and the chamber 44 of the service valve device 25 in the manner heerinbefore described until the pressure in the emergency reservoir 4, the chambers 44 and 53, and the brake pipe 1 equalize. Upon equalization of pressures in the chambers 53 and 44 on the opposite sides of the diaphragm 48, the service valve device 25, which was in lap position, operates in the manner hereinbefore described in detail to effect a complete release of fluid under pressure from the brake cylinder device 2. Since it has been assumed that all the cars in the train are equipped with the brake control valve device 5, it will therefore be understood that the service valve device 25 of the brake control valve device 5 on each car operates to effect a complete release of the brakes on that respective car and also a complete release of fluid under pressure from the corresponding chamber 100 below the inshot valve diaphragm 92 so that the inshot valve stem 97 is returned to the position shown in FIG. 1B of the drawings and the brakes on all the cars in the train are released in response to an increase in the pressure in the train brake pipe at the usual normal rate for effecting charging of the brake equipment and a direct release of the brakes, which usual normal rate is sufficient to quickly establish a one and one-half pound per square inch differential on the diaphragm 293.

Subsequent to an accelerated and complete direct release of a service brake application, the continued supply of fluid under pressure to the brake pipe 1 on each car from the engineer's brake valve device 6 on the locomotive will fully recharge the emergency reservoir 4 on each car in the train via the respective pipe and passageway 9, brake pipe strainer 23, passageways 37 and 36, choke 122, passageway 119, groove 108 on the inshot stem 97, which has returned to the position shown in FIG. 1B of the drawings as a result of the complete release of brake cylinder pressure from the chamber 100 and the brake cylinder device 2, passageways 121 and 136, peripheral annular groove 135 on the interlock valve stem 128, passageways 137, 205 and 206, peripheral annular groove 204 on the spool-type valve 202, passageways 207 and 209 and passageway and corresponding pipe 12.

The supply of fluid under pressure to the brake pipe 1 is effective to recharge the auxiliary reservoir 3 via the auxiliary reservoir charging check valve device 30 in the manner hereinbefore described in detail.

Upon the pressure in the train brake pipe reaching the normal fully charged pressure, which may be, for example, seventy pounds per square inch, the brake valve on the locomotive will be effective to automatically maintain this pressure in the train brake pipe against leakage therefrom. Consequently, after releasing the brakes and recharging the train brake pipe, the engineer can effect a service or an emergency brake application as desired.

GRADUATED RELEASE OF BRAKES TO ANY DEGREE

To effect the first step in a graduated release of the brakes to any degree desired and in any number of desired steps on all the cars in the train subsequent to a partial or full service brake application, the engineer will move the handle 444 of the brake valve device 6 from whatever position it occupies in its service zone in the direction of its running position to a selected position in the service zone corresponding to the higher degree of pressure desired in the train brake pipe and therefore to the reduction in pressure to be effected in the brake cylinder devices 2 on all the cars in the train.

As the handle 444 of the brake valve device 6 is thus moved from whatever position it occupied in its service zone in the direction of its running position to the selected position in its service zone, the cam 457 carried by the cam shaft 443 is effective to cause operation of the self-lapping control valve device 411 of the brake valve device 6 to supply fluid under pressure from the main reservoir 434 to the chamber 420 of the relay valve device 410 and to the equalizing reservoir 456 in the manner described in the hereinbefore-mentioned Patent No. 2,958,561. Fluid under pressure thus supplied to the chamber 420 of the relay valve device 410 operates this relay valve device in the manner described in Patent No. 2,958,561 to effect the supply of fluid under pressure from the main reservoir 434 to the chamber 427 in this relay valve device. Fluid under pressure thus supplied to the chamber 427 flows therefrom via the choke 436 to the chamber 435 and thence via the choke 437 to the passageway 438 since the flat disc-type valve 447 is now biased against the annular valve seat 449 by the spring 448 to close the bypass around the choke 437. Fluid under pressure supplied to the passageway 438 at a rate controlled by the size of the choke 437, which rate is less than the hereinbefore-mentioned normal rate, flows to the chamber 439 where it effects unseating of the valve 440 so that thereafter fluid under pressure flows from the chamber 439 via the chamber 441 and passageway 442 to the train brake pipe at this restricted rate. This supply of fluid under pressure to the train brake pipe at a restricted rate will flow to the brake pipe 1 on each car in the train and thence via pipe and passageway 9, brake pipe strainer 23 and passageway 37 to the chamber 297 above the diaphragm 293 of the quick service and emergency pilot valve device 17. This restricted rate of supply of fluid under pressure to the chamber 297 is less than the rate required to establish a differential of one and one-half pounds per square inch on the diaphragm 293 to effect deflection of this diaphragm against the yielding resistance of spring 394. Consequently, fluid under pressure will flow from the chamber 297 via passageway 299 and choke 300 to the chamber 298 without deflecting the diaphragm 293 to effect unseating of the flat disc-type valve 383 to connect the emergency reservoir 4 to the chamber 44 in the service valve device 25 and to the brake pipe 1. Fluid under pressure supplied to the chamber 298 will flow therefrom via branch passageway 328a and passageway 328 to the quick action chamber 14 and to the chamber 324 above flat disc-type valve 325 to recharge these chambers to the pressure normally carried in the train brake pipe. Fluid under pressure also flows from chamber 298 via passageway 398 in piston valve 390, peripheral annular groove 399 on this piston valve, passageways 400 and 282, peripheral annular grooves 263 on valve stem 250 and passageway 280 to the volume chamber 281 to recharge this chamber to the pressure carried in the train brake pipe.

Fluid under pressure supplied to the passageway 37 also flows therefrom via passageway 36, branch passageway 36a, and choke 122 to the passageway 119. It will be remembered that the peripheral annular groove 108 on the inshot valve stem 97 is now in a position in which the passageway 119 is cut off from the passageway 121 since the brake cylinder pressure in the chamber 100 is in excess of, for example, ten pounds per square inch.

Since the passageway 119 is thus cut off from the passageway 121, fluid under pressure cannot flow from the emergency reservoir 4 to the brake pipe and to the chamber 44 to cause an equalization of pressures on opposite sides of the diaphragm 48, which equalization, if effected, would cause the service valve device 25 to operate to completely release the fluid under pressure from the brake cylinder device 2. Since fluid under pressure cannot flow from the emergency reservoir 4 to the chamber 44 of the service valve device 25, the only pressure supplied to the chamber 44 is that from the brake pipe 1 via pipe and passageway 9, brake pipe strainer 23, and passageways 37, 36 and 56. Consequently, fluid under pressure will build up in the chamber 44 as the engineer on the locomotive moves the handle 444 of brake valve device 6 to the selected position in the service zone. Upon the handle 444 of the brake valve device 6 reaching the selected position, the relay valve device 410 operates to cut off flow of fluid under pressure to the train brake pipe and thence to the brake pipe 1 and chamber 44 on each respective car in the train.

It will be remembered that when a brake application was effected, fluid under pressure was supplied to the chamber 63 until the force of this fluid under pressure acting downward on the diaphragm 59 balanced the upward force, due to the difference in the pressure in the chamber 53 and the chamber 44, acting upward on the diaphragm 48 and valve stem 46. Therefore, the pressure in the chamber 44 is increased by the supply of fluid under pressure thereto from the brake pipe 1, this increase in the pressure in the chamber 44 will be effective to deflect the diaphragm 48 downward and thereby move the upper end of the valve stem 46 away from the lower side of the annular valve 84 which at this time is biased into contact with the annular valve seat 73 by the spring 89 acting through the piston 80. As the upper end of the valve stem 46 is thus moved downward away from the lower side of the flat disc-type valve 84, the brake cylinder device 2 is vented to atmosphere via pipe and passageway 11, passageways 65 and 66, chamber 63, passageway 67 in the valve stem 46, peripheral annular groove 64, passageway 68, brake cylinder exhaust choke 69, passageway and pipe 13, and the retaining valve 70 which, it may be assumed, is in a non-retaining position or has been removed since it is not necessary after conversion of the brake control valve devices 5 to graduated release-type of control valve devices. Likewise, chamber 100 is vented to atmosphere via passageway 101, choke 102, branch passageway 11a and thence via the passageways above traced for the brake cylinder device 2. Fluid under pressure will thus flow from the brake cylinder device 2 and the chambers 100 and 63 to the atmosphere until the pressure in the chamber 63 is reduced to such a value that the downward pressure acting on the diaphragm 59 is slightly less than the difference in pressure in the chambers 53 and 44 acting upward on the diaphragm 48 so that this upward force is effective to move the stem 46 upward until the upper end of the stem 46 again contacts the bottom of the flat annular valve 84 to cut off flow of fluid under pressure from the brake cylinder device 2 and to chambers 100 and 63 to the atmosphere. It is therefore apparent that as the pressure in the chamber 44 of the service valve device 25 of the brake control valve device 5 on each car in the train increases in response to the pressure supplied thereto from the brake valve device 6 on the locomotive via the train brake pipe, each service valve device 25 will operate to reduce the pressure in the corresponding brake cylinder device 2 and chambers 100 and 63 to a degree proportional to the increase in the pressure in the train brake pipe effected by movement of the handle 444 of the brake valve device 6 from the position it occupied in its service zone in the direction of its running position to the selected position in its service zone corresponding to the degree of train brake pipe pressure desired.

To effect the second step, and each succeeding step, of a graduated release of the brakes, the engineer will move the handle 444 of the brake valve device 6 from the first selected position it occupies in its service zone in the direction of its running position to another selected position in the service zone corresponding to the higher degree of pressure desired in the train brake pipe and therefore the reduced pressure to be obtained in the brake cylinder devices 2 on all the cars in the train.

As the handle 444 of the brake valve device 6 is thus moved in the direction of its running position to another selected position in its service zone, the pressure in the train brake pipe will be increased in accordance with the amount of arcuate movement of the handle 444 toward its running position whereupon the service valve devices 25 of the brake control valve devices 5 on all the cars in the train operate in the manner explained above to reduce the pressure in the correspnoding brake cylinder devices 2 and the chambers 100 and 63 to a degree proportional to the increase in the pressure effected in the train brake pipe.

In view of the above, it will be apparent that the engineer may, by moving the handle 444 of the brake valve device 6 in steps toward its running position, effect in successive steps a reduction of the pressure in the chambers 100 and 63 and in the brake cylinder devices 2 on all cars in the train until this pressure is reduced to a low value which is still sufficient to maintain the inshot valve stem 97 in its upper position.

When the engineer desires to effect the final step in the release of the brakes, and therefore a complete release of fluid under pressure from the chambers 100 and 63 and the brake cylinder devices 2 on all the cars in the train, he will move the handle 444 of the brake valve device 6 on the locomotive to its running position to effect opening of the hereinbefore-mentioned cam operated flat disc-type valve 447 to cause the supply of fluid under pressure to the train brake pipe at the hereinbefore-mentioned usual normal rate in bypass of the choke 437 for effecting the charigng of the brake equipment and a direct release of the brakes by operation of the quick service and emergency pilot valve device 17 on each car in the train in the manner now to be described.

The fluid under pressure that is now supplied to the brake pipe 1 at the usual normal rate for effecting the charging of the brake equipment and a direct release of the brakes flows via pipe and passageway 9, brake pipe strainer 23, and passageway 37 to the chamber 297 in the quick service and emergency pilot valve device 17 of the brake control valve device 5 on each car in the train. Fluid under pressure thus supplied to the chamber 297 at the usual normal rate quickly establishes the one and one-half pounds per square inch differential of pressure on the opposite sides of the diaphragm 293 (FIG. 1A) required to deflect this diaphragm downward to effect unseating of the flat disc valve 383 against the yielding resistance of the spring 389 from the annular valve seat 388. When the flat disc valve 383 is thus unseated, fluid under pressure will flow from the emergency reservoir 4 at an unrestricted rate via passageways hereinbefore described in detail to the brake pipe 1 and the chamber 44 of the service valve device 25. Therefore, the quick service and emergency pilot valve device 17 on each car in the train operates to cause the corresponding service valve device 25 to effect, as the last step in the release of the brakes, an accelerated direct release of the brakes that rapidly runs through the train from the locomotive to the last car.

Reduction of the pressure in each of the chambers 100 to below, for example, approximately ten pounds per square inch renders the corresponding spring 105 effective to deflect the corresponding diaphragm 92 downward so that the inshot valve stem 97 secured thereto is returned to the position in which it is shown in FIG. 1B of the drawings. When the inshot valve stem 97 of the brake control valve device 5 on each car in the train is thus returned to the position shown in FIG. 1B of the drawings, the peripheral annular groove 108 thereon establishes a communication between the passageway 119 and passageway 121, and the peripheral annular groove 107 establishes a communication between the passageway 115 and the passageway 116. When the peripheral annular groove 108 establishes a communication between the passageway 119 and the passageway 121, fluid under pressure will flow from the brake pipe 1 to the emergency reservoir 4 to effect the final charging thereof up to the normal pressure carried in the train brake pipe.

One end of the passageway 36 is connected via passageway 56 to the chamber 44 above diaphragm 48 of the service valve device 25 and the opposite end is connected via passageway 37, brake pipe strainer 23 and passageway and corresponding pipe 9 to the brake pipe 1. Therefore, when the inshot valve stem 97 is returned to the position shown in FIG. 1B, as a result of reducing the brake cylinder pressure in chamber 100 to, for example, approximately ten pounds per square inch, the pressure in the emergency reservoir 4 would be connected via the choke 122 to the chamber 44 of the service valve device 25 and the brake pipe 1. However, the service valve device 25 of the brake control valve device 5 on each car in the train has already operated in response to this equalization of pressures on opposite sides of the diaphragm 48 to effect a complete release of fluid under pressure from the corresponding brake cylinder devices 2 so that the brakes on the train are completely released. Consequently, movement of inshot stem 97 to the position shown in FIG. 1B is only effective to provide a communication through which the emergency reservoir 4 is fully charged from the train brake pipe as the pressure therein continues to increase subsequent to a complete release of the brakes on the train.

After the brakes on all the cars have been released, fluid under pressure will flow from the brake valve device 6 on the locomotive, the handle 444 of which is now in running position, to the train pipe at the usual normal rate and thence to the auxiliary reservoir 3 and the emergency reservoir 4 via passageways hereinbefore described in detail to fully charge these reservoirs to the normal full charge value of train brake pipe pressure which, as has been hereinbefore stated, may be, for example, seventy pounds per square inch.

From the foregoing, it is apparent that the engineer, by manipulating the handle 444 of brake valve device 6 on the locomotive, can, by a series of successive steps, partly and then finally fully restore the pressure in the train brake pipe to correspondingly effect in steps a partial graduated and then finally a complete direct release of the brakes on the train.

It will be understood that, subsequent to effecting a full service brake application, if the engineer desires to effect an accelerated direct release of the brakes on the train rather than a graduated release of the brakes in steps as just explained, he may do so by moving the handle 444 of the brake valve device 6 directly from its full service position to its running position without stopping in the service zone. When the handle 444 of the brake valve device 6 reaches its running position, the hereinbefore-mentioned cam operated flat disc-type valve 447 is opened to provide a bypass around the choke 437 in the brake pipe supply passageway 438 so that fluid under pressure will flow to the train brake pipe at the hereinbefore-mentioned normal rate for effecting charging of the brake equipment and a complete direct release of the brakes. This rate of supply of fluid under pressure to the brake pipe 1 and thence to the chamber 297 in the quick service and emergency pilot valve device 17 of the brake control valve device 5 on each car in the train will cause operation of the quick service and emergency pilot valve devices 17 of the brake control valve devices 5 on all the cars to effect, in the manner hereinbefore described in detail, a direct accelerated release of the brakes on the train.

It should be understood that, subsequent to a service brake application that is less than a full service application, this brake application may be released in the same manner as described above for effecting the release of a full service application.

From the above, it is apparent that the engineer, at his discretion and in accordance with the terrain through which the train is traveling, may, by proper manipulation of the handle 444 of the brake valve device 6 on the locomotive, effect either a graduated release of the train brakes in a series of several successive steps followed by an accelerated direct release as the final step in the series or directly and immediately an accelerated direct brake release.

EMERGENCY APPLICATION OF THE BRAKES

To effect an emergency application of the brakes, the handle 444 of the brake valve device 6 on the locomotive will be moved to an emergency position to cause a rapid reduction at an emergency rate in the pressure in the train pipe extending from the locomotive back through the several cars in the train. The brake control valve devices 5 on all the cars in the train will operate in the manner hereinbefore described to effect an emergency application of the brakes on the train and hence it is deemed unnecessary to repeat a detailed description of the operation of the various parts of the brake control valve device 5.

RELEASE OF THE BRAKES AFTER AN EMERGENCY BRAKE APPLICATION

To effect a release of the brakes, subsequent to effecting an emergency brake application, the engineer will move the handle 444 of the brake valve device 6 on the locomotive from its emergency position to its running position to effect the supply of fluid under pressure to the train brake pipe at the usual normal rate for effecting the charging of the brake equipment and an accelerated direct release of the brakes on all the cars in the train. The fluid under pressure thus supplied to the train brake pipe will flow from the brake pipe 1 on each car to the chamber 297 in the quick service and emergency pilot valve device 17 of the brake control valve device 5 on each car to cause each quick service and emergency pilot valve device 17 to operate in the manner hereinbefore described in detail to supply fluid under pressure from the corresponding emergency reservoir 4 to the train brake pipe and to the chamber 44 of the corresponding service valve device 25 which will then operate in response to equalization of the pressures on the opposite sides of the diaphragm 48 to effect a complete release of fluid under pressure from the corresponding brake cylinder device 2 and therefore a complete accelerated direct release of the brakes on the train.

MANUAL OPERATION OF THE MANUALLY OPERATED BRAKE CYLINDER RELEASE VALVE DEVICE

It will be remembered, as hereinbefore stated, that fluid under pressure supplied to the brake pipe 1 flows to the chamber 237 in the manually operated brake cylinder release valve device 29, and when brake pipe pressure is in excess of thirty pounds per square inch, the diaphragm 235 is deflected downward against the yielding resistance of the spring 243 until the spool-type valve 202 is moved to its lowermost position in which the peripheral annular groove 204 thereon closes communication between the passageway 207 thereon closes communication between the way 208 also in this casing section. Therefore, as long as the pressure in the chamber 237 is in excess of thirty pounds per square inch, movement of the spool-type valve 210 in an upward direction by a trainman or a malicious person exerting a pull on a pull rod connected to the clevis 231 to move the peripheral annular groove 211 on the spool-type valve 210 to a position to establish a communication between the passageway 208 and the passageway 233 is ineffective to supply fluid under pressure to the chamber 234 below the diaphragm 235 which fluid under pressure, if supplied to the chamber 234, would effect equalization of pressure on the opposite sides of this diaphragm to render the spring 243 effective to move the diaphragm 235 and the spool-type valve 202 upward to a position in which they are shown in FIG. 1B of the drawings so that fluid under pressure would be vented from chamber 53 beneath diaphragm 48 to atmosphere via passageways 137, 205 and 206, peripheral annular groove 204, passageway 208, peripheral annular groove 211, passageway 233, branch passageway 233a, peripheral annular groove 203, choke 245, and passageway and port 246 to atmosphere to effect a direct and complete release of the brakes on the car.

When a railway freight car is detached from a train for humping operations, the brake pipe is completely vented to atmosphere. Consequently, when humping a car, the pressure in the chamber 237 of the brake cylinder release valve device 29 will be at atmospheric pressure and the spool-type valve 202 will occupy the position in which it is shown in FIG. 1B of the drawings in which the peripheral annular groove 204 establishes a communication between the passageway 207 and the passageway 208.

Furthermore, completely venting the brake pipe to atmosphere, at the time a car is detached from a train for humping operations, is effective to cause the brake control valve device 5 to effect an emergency application of the brakes on the detached car. When an emergency brake application is thus effected, the chamber 44 in the service valve device 25 is completely vented to the atmosphere whereas the chamber 53 below the diaphragm 48 remains charged with fluid under pressure from the emergency reservoir 4 via pipe and passageway 12, passageways 209 and 207, peripheral annular groove 204, passageways 206, 205 and 137. Therefore, to effect a complete direct release of the emergency application of the brakes on the detached car, it will be necessary to effect equalization of pressures on opposite sides of the diaphragm 48 of the service valve device 25 of the brake control valve device 5. A trainman may effect a complete direct release of the emergency application of the brakes on the detached car by exerting a pull on one of the pull rods secured to the clevis 231 connected to the manually operated release valve stem 228 so as to effect tilting of the manually operated release valve stem 228 about the periphery of its flange 227 so that the central boss 226 is effective to move the spool-type valve 210 upward only far enough for the peripheral annular groove 211 on the spool-type valve 210 to establish a communication between passageways 208 and 233. Since the chamber 237 is now at atmospheric pressure, the spool-type valve 202 will occupy the position in which it is shown in FIG. 1B of the drawings. Therefore, fluid under pressure will now flow from the emergency reservoir 4 via pipe and passageway 12, passageway 209 and 207, peripheral annular groove 204, passageway 208, peripheral annular groove 211 and passageway 233 to chamber 234 to reflect diaphragm 235 upward to move the spool-type valve 202 upward to its uppermost position in which the lower O-ring seal 247 is above the port at which the passageway 206 opens at the wall surface of the counterbore 200.

With the lower O-ring seal 247 thus disposed above the port at which the passageway 206 opens at the wall surface of the bore 200, the chamber 53 below the diaphragm 48 of the service valve device 25 will be connected via passageways 137, 205 and 206, the interior of the counterbore 200 below the lower O-ring seal 247, branch passageways 238a and 238, branch passageway 56a and passageway 56 to chamber 44 above the diaphragm 48. Therefore, when the spool-type valve 202 is moved to its uppermost position as a result of supplying fluid under pressure to chamber 234, fluid under pressure on opposite sides of the diaphragm 48 will equalize to cause the service valve device 25 to be operated by spring 55 to effect a direct and complete release of the brakes on the detached car.

Also, when the spool-type valve 202 is moved to its uppermost position, the O-ring seal 247 intermediate the peripheral annular grooves 203 and 204 is disposed above the opening of the branch passageway 233a at the wall surface of the counterbore 200 and below the choke 245 whereby the peripheral annular groove 204 on the spool-type valve 202 establishes a communication between the passageway 207 and the branch passageway 233a so that fluid under pressure is supplied from the emergency reservoir 4 to the chamber 234 to maintain the spool valve 202 in its uppermost position. The O-ring seal 247 above the upper end of peripheral annular groove 203 prevents flow of fluid under presure from the chamber 234 along the periphery of the spool-type valve 202 to the peripheral annular groove 203 and thence to atmosphere through the choke 245 and passageway and port 246. From the above it is apparent that the trainman only has to exert a momentary pull on one of the pull rods attached to the clevis 231 to effect movement of the spool-type valve 202 to its upper position in which fluid under pressure from the emergency reservoir 4 is supplied to the chamber 234 so that this pressure is effective on the lower side of the diaphragm 235 to maintain the spool valve 202 in its uppermost position in which the chamber 53 below the diaphragm 48 of the service valve device 25 is connected to the chamber 44 above the diaphragm 48 to cause the service valve device 25 to effect a direct and complete release of the brakes on the car as a result of equalizing the pressures on opposite sides of the diaphragm.

It will be noted that fluid under pressure may be partly or completely released from the emergency reservoir 4 at any time irrespective of the pressure in the chamber 237 by exerting a pull on one of the pull rods to tilt the manually operated release valve stem 228 far enough to cause the spool-type valve 210 to move up a sufficient distance for the portion 212 of reduced diameter on the upper end of the spool-type valve 210 to move the flat disc-type valve 220 against the yielding resistance of the spring 221 upward away from the annular valve seat 219 so that the emergency reservoir pressure present in the chamber 217 can flow past the annular valve seat 219 and thence via counterbore 213 and pasageway and port 214 to atmosphere until the presure in the emergency reservoir 4 is reduced to any desired value, or completely vented to atmosphere if so desired by the trainman.

In view of the above, it is apparent that the manually operated brake cylinder release valve device 29 is always manually operable to vent fluid under pressure from the emergency reservoir 4 if desired, and is also manually operative, as when humping a car in a railway yard at which time no fluid under pressure is present in the chamber 237, to effect equalization of pressures in the chambers 53 and 44 of the service valve device 25 to cause the operation thereof to effect a complete and direct release of the brakes on the detached car without releasing to atmosphere the fluid under pressure remaining in the emergency reservoir 4 subsequent to effecting an emergency application of the brakes.

Having now described the invention, what I claim as new and desire to secure by Letters Patent, is:

1. A manually operated brake valve device comprising:
   (a) a casing having a passageway therein, via which to supply or release fluid under pressure to and from a brake pipe,
   (b) a cam shaft rotatably mounted in said casing,
   (c) a handle mounted on said cam shaft for effecting rotation of said cam shaft, said handle having a service zone and being rotatable to a release position at one end of said service zone,
   (d) a fluid pressure operated relay valve means for supplying fluid under pressure to the passageway in said sectionalized casing,
   (e) a first cam carried on said cam shaft,
   (f) self-lapping control valve means operated by said first cam for controlling the degree of fluid pressure supplied to said fluid pressure operated relay valve means to effect the operation thereof,
   (g) two chokes in series for controlling the rate of flow of fluid under pressure through the passageway in said casing,
   (h) a communication connected in by-pass relation to one of said chokes,
   (i) cam-operated valve means for controlling flow of fluid under pressure through said by-pass communication, and
   (j) a second cam carried on said camshaft for operating said cam-operated valve means to position opening said by-pass communication upon movement of said handle to its release position.

2. In a fluid pressure brake control system for a railway train, in combination:
   (a) a brake pipe in which fluid pressure is increased to a normally charged selected pressure for causing a release of brakes and decreased for causing an application of brakes,
   (b) a brake valve device for controlling variations in the pressure in said brake pipe, said brake valve device comprising:
      (i) means for effecting the charging of said brake pipe at two different rates,
      (ii) a service zone,
      (iii) a release position at one end of said service zone, and
      (iv) a handle movable progressively in said zone in a direction toward said release position to operate said means for effecting charging of said brake pipe at the lesser of said two rates, said handle being movable to said release position to operate said means for effecting the charging of said brake pipe at the greater of said two rates, and
   (c) a brake control valve device comprising, in combination:
      (i) a service valve mechanism responsive to reduction in the pressure in said brake pipe to effect graduated application of brakes according to the degree of reduction in brake pipe pressure below its normally charged pressure and responsive to the degree of charging of said brake pipe at the lesser of said two rates to effect a corresponding graduated release of brakes, and
      (ii) means responsive to the charging of said brake pipe at the greater of said two rates to cause said service valve mechanism to operate to effect a direct release of brakes.

3. In a fluid pressure brake control system for railway trains, in combination:
   (a) a brake pipe in which fluid pressure is increased to a normally charged selected pressure for causing a release of brakes and decreased for causing an application of brakes,
   (b) a brake valve device for controlling a reduction in the pressure in said brake pipe and for controlling the charging of said brake pipe and including means for effecting the charging of said brake pipe at two different rates, and
   (c) a brake control valve device comprising, in combination:
      (i) a service valve mechanism responsive to reduction in the pressure in said brake pipe to effect graduated application of brakes according to the degree of reduction in brake pipe pressure below its normally charged pressure and responsive to the degree of charging of said brake pipe at the lesser of said two rates to effect a corresponding graduated release of brakes,
      (ii) a direct release valve mechanism operatively responsive to the charging of said brake pipe at any rate to cause said service valve mechanism to effect a direct release of the brakes, and
      (iii) means operatively responsive to the charging of said brake pipe at only the greater of said two rates, when the said direct release valve mechanism is rendered non-effective, to cause said service valve mechanism to operate to effect an accelerated direct release of the brakes.

4. A fluid pressure controlled railway car brake apparatus comprising, in combination:
   (a) a normally charged brake pipe,
   (b) a normally charged auxiliary reservoir,
   (c) a normally charged emergency reservoir,
   (d) check valve means via which said auxiliary reservoir is charged from said brake pipe,
   (e) a service valve device comprising
      (i) an annular valve seat,
      (ii) a flat disc-type valve,
      (iii) biasing means normally biasing said flat disc-type valve into seating contact with said annular valve seat, to cut off flow from said reservoirs,
      (iv) a hollow valve stem coaxially arranged with respect to said annular valve seat,
      (v) a first movable abutment subject on one side to the pressure of fluid in said brake pipe and subject on the opposite side to the pressure of fluid in said emergency reservoir, said first movable abutment being connected to one end of said hollow valve stem to effect movement thereof in one direction to cause the opposite end of said hollow valve stem to unseat said flat disc-type valve against yielding resistance of said biasing means in response to a reduction in brake pipe pressure on said one side to cause the flow of fluid under pressure from said reservoirs to effect an application of the brakes on the vehicle, and
      (vi) a second movable abutment subject on one side to the fluid under pressure supplied past said flat disc-type valve while unseated and subject on the opposite side to atmospheric pressure, said second movable abutment being connected to said hollow valve stem adjacent the opposite end thereof to effect movement of said hollow valve stem in a direction opposite said one direction in response to the force of fluid under pressure acting thereon slightly exceeding the fluid pressure forces acting on said first movable abutment to render said biasing means effective to move said flat disc-type valve into seating contact with said annular valve seat to cut off flow of fluid under pressure from said reservoirs and terminate the application of the brakes on the vehicle, said first movable abutment being responsive to a subsequent increase in brake pipe pressure on said one side thereof to effect further movement of said hollow stem in the direction opposite said one direction to move said opposite end away from said flat disc-type valve to establish a venting communication via said hollow stem whereby the fluid under pressure supplied for effecting said application of the brakes is released, and (f) a fluid pressure operated quick service and emergency pilot valve device operative in response to the charging of said brake pipe at a fast rate, subsequent to an application of the brakes on the vehicle, to effect the supply of fluid under pressure from said emergency reservoir to said brake pipe and said one side of said first movable abutment to effect equalization of pressures on the opposite sides of said first movable abutment whereby to cause said service valve device to operate to effect a direct release of the brakes on the vehicle.

5. A fluid pressure controlled railway car brake apparatus comprising, in combination:
(a) a normally charged brake pipe,
(b) a normally charged auxiliary reservoir,
(c) a normally charged emergency reservoir,
(d) check valve means via which said auxiliary reservoir is charged from said brake pipe,
(e) a brake cylinder device for effecting an application of the brakes on the vehicle,
(f) a service valve device comprising,
  (i) an annular valve seat,
  (ii) a flat disc-type valve for controlling flow of fluid under pressure from said reservoirs to said brake cylinder device,
  (iii) biasing means normally biasing said flat disc-type valve into seating contact with said annular valve seat to close communication between said reservoirs and said brake cylinder device,
  (iv) a hollow valve stem coaxially arranged with respect to said annular valve seat,
  (v) a first movable abutment subject on one side to the pressure of fluid in said brake pipe and subject on the opposite side to the pressure of fluid in said emergency reservoir, said first movable abutment being connected to one end of said hollow valve stem to effect movement thereof in one direction in response to a reduction in the pressure in said brake pipe on said one side to cause the opposite end of said hollow valve stem to unseat said flat disc-type valve against the yielding resistance of said biasing means to establish a communication via which fluid under pressure flows from said reservoirs to said brake cylinder device, and
  (vi) a second movable abutment subject on one side to the pressure in said brake cylinder device and subject on the opposite side to atmospheric pressure, said second movable abutment being connected to said hollow valve stem adjacent the opposite end thereof to effect movement of said hollow valve stem in a direction opposite said one direction in response to the force of the pressure in said brake cylinder device acting thereon slightly exceeding the fluid pressure forces acting on said first movable abutment to render said biasing means effective to move said flat disc-type valve into seating contact with said annular valve seat to close the communication between said reservoirs and said brake cylinder device and terminate the application of the brakes on the vehicle, said first movable abutment being responsive to a subsequent increase in brake pipe pressure on said one side thereof to effect further movement of said hollow stem in the direction opposite said one direction to move said opposite end away from said flat disc-type valve to establish a venting communication via said hollow stem whereby said brake cylinder device is open to atmosphere to effect a release of the brakes on the vehicle, and (g) a fluid pressure operated quick service and emergency pilot valve device operative in response to the charging of said brake pipe at a fast rate, subsequent to an application of the brakes on the vehicle, to effect the supply of fluid under pressure from said emergency reservoir to said brake pipe and said one side of said first movable abutment to effect equalization of pressures on the opposite sides of said first movable abutment whereby to cause said service valve device to operate to effect a direct and complete release of fluid under pressure from said brake cylinder device.

6. A fluid pressure controlled railway car brake apparatus, as claimed in claim 5, further characterized in that said fluid pressure controlled brake control valve device comprises a direct release valve mechanism operative subsequent to an application of the brakes on the vehicle in response to a slight increase in brake pipe pressure above any existing reduced brake pipe pressure at a rate less than said fast rate to effect the supply of fluid under pressure from said emergency reservoir to said brake pipe and said one side of said first movable abutment whereby to cause said service valve device to operate to effect a direct and complete release of fluid under pressure from said brake cylinder device, and in that said direct release valve mechanism effects the supply of fluid under pressure from said emergency reservoir to said brake pipe and said one side of said first movable abutment independently of the inherent friction in said direct release valve mechanism.

7. A fluid pressure controlled railway car brake apparatus for vehicles, comprising, in combination:
(a) a normally charged brake pipe,
(b) a normally charged auxiliary reservoir,
(c) a normally charged emergency reservoir,
(d) check valve means via which said axuiliary reservoir is charged from said brake pipe,
(e) a brake cylinder device for effecting an application of the brakes on the vehicle,
(f) a service valve device of the graduated application and graduated release type responsive to varying degrees of reduction in brake pipe pressure relative to the opposing constant emergency resevoir pressure for effecting operation of said service valve device to establish in said brake cylinder device corresponding degrees of pressure, and responsive to varying degrees of increase of pressure in said brake pipe subsequent to a brake application to cause said service valve device to operate to effect corresponding reductions of the pressure in said brake cylinder device,
(g) a quick service volume,
(h) a fluid pressure operated continual quick service valve device operative to effect the supply of fluid under pressure from said brake pipe to said quick service volume,
(i) a fluid pressure operated quick service and emergency pilot valve device always operative in response to a reduction in brake pipe pressure at any rate to effect the supply of fluid under pressure from said brake pipe to said fluid pressure operated continual quick service valve device to cause the operation thereof,
(j) a fluid pressure operated interlock valve device for controlling a communication between said emergency reservoir and said brake pipe, said fluid pressure operated interlock valve device being operative by fluid under pressure supplied to said quick service volume to close said communication between said emergency reservoir and said brake pipe to cut off flow therebetween,
(k) two parallel communications through which fluid under pressure may flow from said brake pipe to the communication controlled by said fluid pressure operated interlock valve device, (l) a brake pipe pressure operated direct release valve mechanism operable, subsequent to an application of the brakes on the vehicle, in response to a slight increase in brake pipe pressure at any rate to open one of said two parallel communications, and (m) a brake cylinder pressure operated inshot valve device operable upon brake cylinder pressure increasing to a chosen degree to simultaneously close communication between said quick service volume and said fluid pressure operated interlock valve device, and between said brake pipe and the other of said two parallel communications.

8. A fluid pressure controlled railway car brake apparatus, as claimed in claim 7, further characterized by choke means effective, subsequent to operation of said brake cylinder pressure operated inshot valve device, to vent to atmosphere at a chosen rate the fluid under pressure previously supplied from said quick service volume to said fluid pressure operated interlock valve device.

9. A fluid pressure controlled railway car brake apparatus, as claimed in claim 7, further characterized in that said fluid pressure operated interlock valve device has a restricted opening therein for venting to atmosphere the fluid under pressure supplied thereto from said quick service volume prior to operation of said inshot valve device, and further including biasing means operative, subsequent to venting the fluid under pressure previously supplied from said quick service volume to said fluid pressure operated interlock valve device, to cause said fluid pressure operated interlock valve device to reopen said communication between said emergency reservoir and said brake pipe whereby fluid under pressure flows from said emergency reservoir to said brake pipe, in response to operation of said brake pipe pressure operated direct release valve mechanism to open said one of said two parallel communications, to cause said service valve device to effect a direct and complete release of fluid under pressure from said brake cylinder device to atmosphere.

10. A fluid pressure controlled railway car brake apparatus, as claimed in claim 7, further characterized in that said brake pipe pressure operated direct release valve mechanism comprises an on-off type of valve for effecting opening and closing of said one of said two parallel communications, and a friction clutch mechanism whereby a force derived from the fluid under pressure supplied from said brake pipe to said direct release valve mechanism is effective to transmit movement to said on-off type valve for effecting the operation thereof.

11. A fluid pressure controlled railway car brake apparatus, as claimed in claim 7, further characterized in that said brake pipe pressure operated direct release valve mechanism comprises an on-off type of valve for effecting opening and closing of said one of said two parallel communications, a fluid pressure operated friction clutch mechanism having a driving and a driven element for transmitting movement to said on-off type of valve to cause the operation thereof, and a brake pipe pressure operated valve means for effecting the supply of fluid under pressure from said brake pipe to said fluid pressure operated clutch mechanism to effect the operation thereof to first move said on-off type of valve to its open position and subsequently to overcome the friction of said fluid pressure operated clutch whereby the driving element of said fluid pressure operated clutch mechanism is rendered movable relative to said on-off type of valve.

12. A fluid pressure controlled railway car brake apparatus, as claimed in claim 7, further characterized by a brake cylinder release valve device movable to three positions, and in that said brake cylinder release valve device is movable to an intermediate position to effect charging of said emergency reservoir, is movable in one direction from its intermediate position to a second position in which it prevents a malicious release of fluid under pressure from said emergency reservoir and is movable in an opposite direction to a third position to cause said service valve device to effect a direct and complete release of fluid under pressure from said brake cylinder device.

13. A fluid pressure controlled railway car brake apparatus, as claimed in claim 7, further characterized by a three-position fluid pressure operated brake cylinder release valve device subjected to brake pipe pressure and operated from the intermediate one of its three positions to a second one of its positions by brake pipe pressure, upon said brake pipe pressure exceeding a chosen value, in which second position it prevents a malicious release of fluid under pressure from said emergency reservoir.

14. A fluid pressure controlled railway car brake apparatus, as claimed in claim 13, further characterized in that said three-position fluid pressure operated brake cylinder release valve device comprises a manually operated valve mechanism for effecting the supply of fluid under pressure from said emergency reservoir to said three-position fluid pressure operated brake cylinder release valve device to effect the operation thereof from the intermediate one of its three-positions to a third one of its positions in which it causes said service valve device to effect a complete and direct release of fluid under pressure from said brake cylinder device.

15. A fluid pressure controlled railway car brake apparatus, as claimed in claim 14, further characterized in that the manually operative valve mechanism of said three-position operated brake cylinder release valve device is manually movable to one position for effecting the supply of fluid under pressure from said emergency reservoir to said three-position fluid pressure operated brake cylinder release valve device to effect the operation thereof from the intermediate one of its three-positions to a third one of its positions and is movable to another position for effecting a release of fluid under pressure from said emergency reservoir to atmosphere.

16. A fluid pressure controlled railway car brake apparatus, as claimed in claim 7, further characterized in that said brake pipe pressure operated direct release valve mechanism comprises:

(a) a casing having two passageways therein,
(b) valve means operable to an open position to establish a communication between the two passageways in said casing,
(c) a first biasing means for biasing said valve means to a closed position to close communication between the two passageways in said casing,
(d) a plunger movable in one direction to move said valve means against the yielding resistance of said first biasing means to its open position and movable in the opposite direction to render said first biasing means effective to move said valve means to its closed position,
(e) two stops carried by said casing, each operative to limit movement of said plunger in a respective one of said two directions,
(f) a movable abutment,
(g) a second biasing means for biasing said movable abutment in said opposite direction,
(h) a friction clutch connecting said movable abutment and said plunger, and
(i) brake pipe pressure operated valve means operative in response to a slight increase in brake pipe pressure to effect the supply of fluid under pressure from said brake pipe to one side of said movable abutment to deflect said abutment in said one direction against the yielding resistance of said second biasing means to a degree proportional to the increase in brake pipe pressure, to move said plunger in said one direction into contact with one of said stops to effect opening of said valve means, said friction clutch being responsive to the fluid pressure force effective on said movable abutment exceeding the frictional force thereof to render ineffective the connection between said movable abutment and said plunger whereby subsequent supply of fluid under pressure from said brake pipe to said one side of said movable abutment further deflects said movable abutment in said one direction against the yielding resistance of said second biasing means notwithstanding that said plunger is rendered immovable by said one stop.

17. A fluid pressure controlled railway car brake apparatus, as claimed in claim 7, further characterized by a combined three-position manually operable brake cylinder and reservoir release valve device comprising:
  (a) a normally seated valve effective when unseated to always establish flow of fluid under pressure from said emergency and auxiliary reservoirs to atmosphere,
  (b) a movable abutment subject on one side to the pressure in said brake pipe,
  (c) two springs, disposed respectively on opposite sides of said movable abutment, for, in the absence of pressure in said brake pipe, biasing said movable abutment to a normal position,
  (d) a passageway,
  (e) valve means operably connected to said movable abutment for, in the normal position of said movable abutment and also in a second position thereof, in which said movable abutment is subject on said one side to said certain normal pressure in said brake pipe, establishing a communication between said emergency reservoir and said service valve device, said valve means in said first position establishing a communication between said emergency reservoir and said passageway and closing said communication in said second position, and
  (f) a manually operable valve device operable out of a normal position to a second position in which it establishes a first communication between said passageway and said opposite side of said movable abutment whereby only in the absence of pressure in said brake pipe on said one side of said movable abutment fluid under pressure flows from said emergency reservoir to said opposite side to cause said movable abutment to move said valve means to a third position to establish a second communication between said emergency reservoir and said opposite side of said movable abutment in by-pass of said first communication and also to establish a communication to cause equalization of the opposing pressures controlling operation of said service valve device whereby said service valve device operates to effect a complete release of fluid under pressure from said brake cylinder device, said manually operable valve device being also manually operable out of said normal position to a third position, while said valve means is in its normal position, to effect unseating of said normally seated valve whereby fluid under pressure in said emergency reservoir and the corresponding pressure active on the service valve device can be completely vented to atmosphere to cause said service valve device to operate to effect a complete release of fluid under pressure from said brake cylinder device.

18. A fluid pressure controlled railway car brake apparatus, as claimed in claim 7, further characterized by a combined three-position manually operable brake cylinder and emergency reservoir release valve device comprising:
  (a) a normally seated valve effective when unseated to always establish flow of fluid under pressure from said emergency reservoir to atmosphere,
  (b) a movable abutment subject on one side to the pressure in said brake pipe,
  (c) two springs, disposed respectively on opposite sides of said movable abutment, for, in the absence of pressure in said brake pipe, biasing said movable abutment to a normal position,
  (d) a passageway,
  (e) valve means operably connected to said movable abutment for, in the normal position of said movable abutment and also in a second position thereof, in which said movable abutment is subject on said one side to said certain normal pressure in said brake pipe, establishing a communication between said emergency reservoir and said service valve device, said valve means in said first position establishing a communication between said emergency reservoir and said passageway and closing said communication in said second position, and
  (f) a manually operable valve device operable out of a normal position to a second position in which it establishes a first communication between said passageway and said opposite side of said movable abutment whereby only in the absence of pressure in said brake pipe on said one side of said movable abutment fluid under pressure flows from said emergency reservoir to said opposite side to cause said movable abutment to move said valve means to a third position to establish a second communication between said emergency reservoir and said opposite side of said movable abutment in by-pass of said first communication and also to establish a communication to cause equalization of the opposing pressures controlling operation of said service valve device whereby said service valve device operates to effect a complete release of fluid under pressure from said brake cylinder device, said manually operable valve device being also manually operable out of said normal position to a third position to effect unseating of said normally seated valve to thereby cause fluid under pressure in said emergency reservoir to be completely vented to atmosphere.

19. A fluid pressure controlled railway car brake apparatus, as claimed in claim 7, further characterized by a combined three-position manually operable brake cylinder and emergency reservoir release valve device comprising:
  (a) a normally seated valve effective when unseated to always establish flow of fluid under pressure from said emergency reservoir to atmosphere,
  (b) a movable abutment subject on one side to the pressure in said brake pipe,
  (c) two springs, disposed respectively on opposite sides of said movable abutment, for in the absence of pressure in said brake pipe, biasing said movable abutment to a normal position,
  (d) a passageway,
  (e) valve means operably connected to said movable abutment for, in the normal position thereof establishing a restricted communication between the opposite side of said movable abutment and atmosphere and an unrestricted communication between said emergency reservoir and said passageway, and
  (f) a manually operable valve device operable out of a normal position to a second position in which it establishes a first communication between said emergency reservoir and said passageway whereby, while said valve means is in its normal position, fluid under pressure flows from said emergency reservoir to said opposite side of said movable abutment to cause said movable abutment to move said valve means to a third position to close said restricted communication between the opposite side of said movable abutment and atmosphere and to establish a self-maintaining communication between said emergency reservoir and said opposite side of said movable abutment independently of said manually operable valve device and said passageway, and also to establish a communication for effecting equalization of the opposing pressures controlling operation of said service valve device whereby said service valve device operates to effect a complete release of fluid under pressure from said brake cylinder device, said manually operable valve device being also manually operable out of said normal position to a third position to effect unseating of said normally seated valve to cause complete venting of fluid under pressure from said emergency reservoir to atmosphere independently of said valve means.

References Cited by the Examiner

UNITED STATES PATENTS 2,926,965　3/60　Wilson et al. _____ 303—36

FOREIGN PATENTS 771,983　4/57　Great Britain.

EUGENE G. BOTZ, *Primary Examiner.*